(12) United States Patent
Young et al.

(10) Patent No.: US 10,000,704 B2
(45) Date of Patent: Jun. 19, 2018

(54) SYSTEMS AND METHODS FOR CONTROLLING, MONITORING, AND OPERATING REMOTE OIL AND GAS FIELD EQUIPMENT OVER A DATA NETWORK WITH APPLICATIONS TO RAW NATURAL GAS PROCESSING AND FLARE GAS CAPTURE

(71) Applicant: Pioneer Energy Inc., Lakewood, CO (US)

(72) Inventors: Andrew Young, Wheat Ridge, CO (US); Matthew Lewis, Lakewood, CO (US); Gevorg Sargsyan, Lakewood, CO (US); Kevin Hotton, Arvada, CO (US); Robert M Zubrin, Golden, CO (US)

(73) Assignee: Pioneer Energy Inc., Lakewood, CO (US)

( * ) Notice: Subject to any disclaimer, the term of this patent is extended or adjusted under 35 U.S.C. 154(b) by 0 days. days.

(21) Appl. No.: 15/630,093

(22) Filed: Jun. 22, 2017

(65) Prior Publication Data

US 2017/0292077 A1 Oct. 12, 2017

Related U.S. Application Data

(60) Division of application No. 14/835,673, filed on Aug. 25, 2015, now Pat. No. 9,719,024, which is a
(Continued)

(51) Int. Cl.
*C10G 5/06* (2006.01)
*F25J 3/02* (2006.01)
(Continued)

(52) U.S. Cl.
CPC .............. *C10G 5/06* (2013.01); *C10L 3/10* (2013.01); *C10L 3/101* (2013.01); *C10L 3/106* (2013.01);
(Continued)

(58) Field of Classification Search
CPC ........ F25J 3/0209; F25J 3/0238; F25J 3/0242; F25J 220/02; F25J 2200/70;
(Continued)

(56) References Cited

U.S. PATENT DOCUMENTS 3,110,889 A 11/1963 Mazzola et al.
3,254,496 A 6/1966 Roche et al.
(Continued)

FOREIGN PATENT DOCUMENTS

| WO | 2005059459 A1 | 6/2005 |
| WO | 2013022529 A1 | 2/2013 |
| WO | 2013037012 A1 | 3/2013 |

OTHER PUBLICATIONS

GTUIT Company, formerly known as G2G Solutions, "Flare services from GTUIT," GTUIT website, Accessed on Nov. 10, 2013, available at http://gtuit.com/services/.
(Continued)

*Primary Examiner* — Shogo Sasaki
(74) *Attorney, Agent, or Firm* — John T Henri; Daniar Hussain

(57) ABSTRACT

An intelligent controls system for remotely monitoring and controlling a chemical process is disclosed. The system comprises a piece of remote field equipment for performing the chemical process, a user device, a server, and program codes to perform the steps of establishing an equipment-server and a client-server connection, receiving a set of chemical process input parameters and a set of desired chemical process output parameters, controlling a set of
(Continued)

chemical process control parameters to achieve the desired chemical process output parameters, and providing an interface to allow an operator to manually control and/or manually override the set of chemical process control parameters. The controls system allows any piece of remote field equipment for performing complex chemical processing to be monitored, controlled, and operated remotely. A large array of distributed field equipment situated around the world can all be controlled primarily through a single interface provided in a central control center.

20 Claims, 21 Drawing Sheets

Related U.S. Application Data continuation-in-part of application No. PCT/US2014/042437, filed on Jun. 14, 2014, which is a continuation of application No. 14/086,031, filed on Nov. 21, 2013.

(60) Provisional application No. 61/836,220, filed on Jun. 18, 2013.

(51) Int. Cl.
    C10L 3/10 (2006.01)
    G05B 15/02 (2006.01)
    H04W 76/02 (2009.01)

(52) U.S. Cl.
    CPC ........... F25J 3/0209 (2013.01); F25J 3/0233 (2013.01); F25J 3/0238 (2013.01); F25J 3/0242 (2013.01); G05B 15/02 (2013.01); H04W 76/02 (2013.01); H04W 76/10 (2018.02); C10L 2290/30 (2013.01); C10L 2290/46 (2013.01); C10L 2290/567 (2013.01); C10L 2290/58 (2013.01); C10L 2290/60 (2013.01); F25J 2200/02 (2013.01); F25J 2200/70 (2013.01); F25J 2205/04 (2013.01); F25J 2205/60 (2013.01); F25J 2205/66 (2013.01); F25J 2205/70 (2013.01); F25J 2215/62 (2013.01); F25J 2220/68 (2013.01); F25J 2230/22 (2013.01); F25J 2230/30 (2013.01); F25J 2240/80 (2013.01); F25J 2260/60 (2013.01); F25J 2270/12 (2013.01); F25J 2270/18 (2013.01); F25J 2270/60 (2013.01); F25J 2270/66 (2013.01); F25J 2290/42 (2013.01); F25J 2290/70 (2013.01)

(58) Field of Classification Search
    CPC .. F25J 2205/04; F25J 2205/60; F25J 2205/66; F25J 2205/70; F25J 2215/62; F25J 2220/68; F25J 2230/22; F25J 2230/30; F25J 2240/80; F25J 2260/60; H04W 76/02; G05B 15/02; C10G 5/06
    See application file for complete search history.

(56) References Cited

U.S. PATENT DOCUMENTS

| | | |
|---|---|---|
| 3,354,663 A | 11/1967 | Hendrix et al. |
| 3,763,658 A | 10/1973 | Gaumer et al. |
| 3,786,454 A | 1/1974 | Lissner et al. |
| 3,996,030 A | 12/1976 | Scheibel |
| 4,016,603 A | 4/1977 | Ottesen |
| 4,404,008 A | 9/1983 | Rentler et al. |
| 4,456,971 A | 6/1984 | Fukuda |
| 4,830,757 A * | 5/1989 | Lynch ............... G01N 33/18 210/104 |
| 4,857,078 A | 8/1989 | Watler |
| 5,992,175 A | 11/1999 | Chen et al. |
| 6,105,390 A | 8/2000 | Bingham et al. |
| 6,182,469 B1 | 2/2001 | Campbell et al. |
| 6,250,105 B1 | 4/2001 | Kimble |
| 6,356,205 B1 * | 3/2002 | Salvo ............... G01N 33/18 210/143 |
| 6,370,448 B1 * | 4/2002 | Eryurek ............ G05B 19/0421 700/19 |
| 6,553,784 B2 | 4/2003 | Lu |
| 7,017,506 B2 | 3/2006 | Wijngaarden et al. |
| 7,041,156 B2 | 5/2006 | Bras et al. |
| RE39,826 E | 9/2007 | Lu |
| 7,594,942 B2 | 9/2009 | Polderman |
| 7,713,497 B2 | 5/2010 | Mak |
| 8,156,758 B2 | 4/2012 | Denton et al. |
| 8,293,186 B2 | 10/2012 | Pawlak et al. |
| 2001/0005812 A1 * | 6/2001 | Brookshire ............... B09B 1/00 702/6 |
| 2001/0053992 A1 * | 12/2001 | Eto ................ G06Q 10/06 705/7.23 |
| 2003/0037567 A1 | 2/2003 | Lu |
| 2006/0076076 A1 | 4/2006 | Darling et al. |
| 2007/0021513 A1 | 1/2007 | Agee et al. |
| 2007/0130991 A1 | 6/2007 | Shipchandler et al. |
| 2007/0163965 A1 * | 7/2007 | Wolfe ................ C02F 1/008 210/739 |
| 2008/0127726 A1 * | 6/2008 | Elkins ............... B09B 1/00 73/152.42 |
| 2009/0031756 A1 | 2/2009 | Betting et al. |
| 2009/0277218 A1 | 11/2009 | Kevenaar et al. |
| 2010/0011663 A1 | 1/2010 | Coyle |
| 2010/0204924 A1 * | 8/2010 | Wolfe ................ C02F 1/008 702/25 |
| 2010/0281775 A1 | 11/2010 | Logue |
| 2010/0305759 A1 * | 12/2010 | Paragot ............... G06Q 50/22 700/271 |
| 2011/0174016 A1 | 7/2011 | Carnell et al. |
| 2012/0096895 A1 | 4/2012 | Patel et al. |
| 2012/0192580 A1 | 8/2012 | Santos |
| 2012/0279235 A1 | 11/2012 | Santos |
| 2013/0061632 A1 | 3/2013 | Brostow et al. |
| 2013/0186133 A1 | 7/2013 | Ploeger et al. |

OTHER PUBLICATIONS

Chad Wocken, et al., "End-use Technology Study—An Assessment of Alternative uses for Associated Gas," Apr. 2013, Energy and Environmental Research Center, ND, USA.
Gas Technologies LLC, "Gas Techno Syngas Process," Gas Technologies Website, Accessed on Nov. 10, 2013, available at http://www.gastechno.com/gastechno-process-technology.html.
Sep-Pro Systems, "Flare Gas Solutions," Sep-Pro Systems website, Accessed on Nov. 10, 2013, available at http://www.sepprosystems.com/Flare_Gas_Solutions.html.
Recapture Solutions LLC, "Flare Gas Capture," Recapture Solutions website, Accessed on Nov. 10, 2013 available at http://www.recapturesolutions.com/services/gas-flaring-recovery.php.
Bayshore International, "Flare Gas Recovery Systems," Bayshore international website, Accessed on Nov. 10, 2013, available http://bayshoreinternationalusa.com/flare_gas_recovery_systems.
Flexenergy, "Flare Reduction," Flexenergy website, Accessed on Nov. 10, 2013, available at http://www.flexenergy.com/flexenergy_flare_reduction.html.
Zeeco Inc., "Flare Gas Recovery," Zeeco website, Accessed on Nov. 10, 2013, available at http://www.zeeco.com/flares/flares_vapor_fgr.php.
John Zink Company, "Flare Gas Recovery Systems," John Zink website, Accessed on Nov. 10, 2013, available at http://www.johnzink.com/products/flare-gas-recovery/.
Gas Natural Recovery, "Flare Systems," Gas Natural Recovery website, Accessed on Nov. 10, 2013, available at http://gasnaturalrecovery.com/flare_systems.html.

(56) References Cited

OTHER PUBLICATIONS

Clarke Energy, "Associated Petroleum Gas/Flare Gas," Clarke Energy website, Accessed on Nov. 10, 2013, available at http://www.clarke-energy.com/gas-type/associated/.
Blaise Energy Inc., "Flare Gas Solutions from Blaise Energy," Blaise Energy website, Accessed on Nov. 10, 2013, available at http://www.blaiseenergy.com/solutions.html.
BX Energy, "Natural Gas & Liquids Dense Phase Transport Solutions," BX Energy website, Accessed on Nov. 10, 2013, available at http://bxenergy.com/.
American Society of Heating, Refrigeration, and Air-Conditioning Engineers (ASHRAE), "Ultralow-temperature Refrigeration," 2002 ASHRAE Refrigeration Handbook, Chapter 39, 2002, USA.
North Dakota Department of Mineral Resources, Presentation, Bismarck, ND, U.S., 2012. Available at http://www.oilgas.nd.gov.

\* cited by examiner

100

1100

2000

SYSTEMS AND METHODS FOR CONTROLLING, MONITORING, AND OPERATING REMOTE OIL AND GAS FIELD EQUIPMENT OVER A DATA NETWORK WITH APPLICATIONS TO RAW NATURAL GAS PROCESSING AND FLARE GAS CAPTURE

REFERENCE TO RELATED APPLICATIONS

This application is a division of and claims priority from U.S. Ser. No. 14/835,673, filed on Aug. 25, 2015, now U.S. Pat. No. 9,719,024, entitled "Systems And Methods For Controlling, Monitoring, And Operating Remote Oil And Gas Field Equipment Over A Data Network With Applications To Raw Natural Gas Processing And Flare Gas Capture," which itself is a Continuation-In-Part ("bypass CIP") and claims the benefit of earlier-filed International Application No. PCT/US2014/042437, filed Jun. 14, 2014 and entitled "Systems And Methods For Separating Alkane Gases With Applications To Raw Natural Gas Processing And Flare Gas Capture", which itself claims priority from U.S. Ser. No. 14/086,031, filed on Nov. 21, 2013, entitled "Systems And Methods For Separating Alkane Gases With Applications To Raw Natural Gas Processing And Flare Gas Capture," as well as claims priority from U.S. Ser. No. 61/836,220, filed on Jun. 18, 2013, entitled "Mobile Alkane Gas Separator," the entirety of all of which are hereby incorporated by reference herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

The present invention relates to systems and methods for remotely controlling, monitoring, and operating oil and gas field equipment over a data network, such as the Internet. The present invention also relates to enabling the utilization of raw natural gas, such as flare gas, stranded gas, associated gas, and so on, for power generation and liquids capture. More specifically, this invention relates to controlling a mobile system for separating raw natural gas into a high-quality methane gas stream, an ethane-rich gas stream, and a natural gas liquids stream.

BACKGROUND OF THE INVENTION

The statements in this section merely provide background information related to the present disclosure and may not constitute prior art.

Currently, managing, monitoring, and controlling remote oil and gas field equipment is a time consuming and cumbersome process. Systems must be controlled and monitored by multiple on-site personnel, and require significant labor, time, and cost. The problem is even more significant for large, distributed installations of multiple machines distributed across multiple locations, sometimes all over the world. The problem becomes even more complicated with operations in remote locations, far from personnel and located in places that are difficult or expensive to reach.

Background relative to one example of application of the present invention to oil and gas equipment is now described. Currently liquids-rich raw natural gas is being flared in large quantities at numerous locations by oil producers. This activity entails significant loss of income that could be earned by selling the flared natural gas liquids. Still more financial losses are entailed by failing to make use of the methane content of the flared gas to generate power. As a result, such oil producers have to buy their electric power from the grid, or even worse, generate it themselves at significant cost (typically USD$ 0.40/kWh) through the use of on-site diesel generators consuming expensive fuel. Furthermore, the large-scale flaring of natural gas has raised environmental issues that could cause state and/or federal regulators to take action to fine, shutdown, or highly regulate their operations.

The United States oil and gas industry annually flared approximately 7.1 billion cubic meters (bcm), or 250 billion cubic feet (bcf) in 2011 (Source: Global Gas Flaring Reduction Partnership, *Estimated Flared Volumes from Satellite Data,* 2007-2011, 2013), and the situation has only gotten worse in 2014. "Flaring will escalate as oil producers approach the milestone of 1 million barrels a day from the Bakken formation, a 360-million-year-old shale bed two miles underground. About 10,100 wells produced 29 million barrels of oil in January 2014, according to the North Dakota Industrial Commission. Drillers flared 340 million cubic feet (mmcf), or 34 percent, of the 1 billion cubic feet of natural gas produced per day in January 2014, about twice as much as the 184 million cubic feet burned per day in 2011, said Marcus Stewart, an analyst at Denver-based Bentek Energy. 'The lost revenue adds up to $1.4 million each day,' said Stewart. Energy executives say economic realities force them to start producing oil from wells before infrastructure is in place to haul away less-valuable natural gas. Bakken oil fetched $98.14 on Apr. 4, 2014 while natural gas for May 2014 delivery fell to $4.44 per MMBTU on the New York Mercantile Exchange the same day. 'We absolutely don't want to flare the gas, that's lost revenue,' said Russell Rankin, a regional manager for Norway-based Statoil. 'But if we drill a $10 million well, we've got lots of investors and they can't wait to get that revenue back,' said Rankin" (Source: Jennifer Oldham, *A Landscape of Fire Rises Over North Dakota's Gas Fields,* Bloomberg News, Apr. 7, 2014)

Canada also has significant flare gas resources. It is estimated that Canada flared 2.4 billion m$^3$ per year in 2011 (Source: Global Gas Flaring Reduction Partnership, *Estimated Flared Volumes from Satellite Data,* 2007-2011, 2013.) It is estimated that the Canadian province of Alberta alone flared 868 million m$^3$ and vented another 333 million m$^3$ in 2007. (Source: Bott, R D., *Flaring Questions and Answers,* 2nd ed., Canadian Centre for Energy Information, 2007.) A similar situation holds around the world, with significant quantities of gas flared in Russia, Nigeria, and other parts of the world.

Despite the recent oil price drop in 2015, due to a glut of oil from fracking flooding the world markets, flaring of stranded gas continues to be a problem in the U.S., Canada, and around the world. Therefore, there exists an important need for a solution to address the problem of utilizing raw natural gas to the maximum extent and to minimize or eliminate flaring completely.

However, often the locations of such flares and stranded gas are remote and far from human operations. This makes controlling, monitoring, and managing such systems extremely complicated and expensive.

Accordingly, as recognized by the present inventors, what are needed are a novel method, apparatus, and system for controlling remote oil and gas field systems.

Therefore, it would be an advancement in the state of the art to provide an apparatus, system, and method for cost-effectively controlling, monitoring, and managing remote oil and gas field systems, allowing such systems to be widely deployed to geographically remote locations around the world. It would also be an advancement in the state of the art to provide systems and methods to allow such systems to be cost-effectively installed, deployed, and commissioned, from a central control operations center located in a central location, capable of managing many such widely distributed systems.

It is against this background that various embodiments of the present invention were developed.

BRIEF SUMMARY OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematic, use case, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

One aspect of the MAGS control system is used to ensure the correct specifications of both dry methane gas (above a desired minimum methane number) and NGLs (below a desired maximum vapor pressure) from any supplied raw natural gas source.

In one embodiment, this is achieved by controlling three key system parameters: a) inlet gas flow rate, b) system operating pressure, and c) separator-reboiler temperature set point. Certain parameters are input to the control system to give desired dry methane and specific NGL specifications. In one embodiment, these input parameters include: 1) heat content (or equivalently, composition) of the input gas stream, 2) volume of the input gas stream, 3) desired methane number of the A-gas (dry methane stream), and 4) desired vapor pressure of the NGLs Y-grade liquid stream (C-stream). The heat content and volume of the input gas, the desired methane number of the A-gas, and the desired vapor pressure of the NGLs can be expressed in either gross units (such as heat content, vapor pressure, etc.) or as concentration of the individual C1-C12+ constituents of the stream. In some embodiments, since the B-stream, comprising high quantities of ethane, is consumed internally for power generation utilizing a suitably tuned engine, the composition of this B-gas can be allowed to vary widely and does not need to be controlled to any specific degree. However, if the B-gas was being utilized for some specific purpose, it too can be controlled for ethane content.

The heat content and volume flow rate of the input gas stream is determined by the input gas source field characteristics, and generally cannot be controlled. These parameters generally vary from well to well, as well as from time to time on the same well, making the controls approach necessary to achieve desired output stream characteristics.

In one embodiment, in order to achieve the desired minimum methane number, the MAGS system controls an inlet gas flow rate of the input gas, and a system operating pressure going into the MAGS refrigeration/separation subsystem. To control the inlet flow rate of the gas into the MAGS, a flow transmitter meters the gas inlet flow rate and a controller (called a VFD), controls the MAGS natural gas compressor to regulate gas inflow into the MAGS. To control the system operating pressure, a vapor outlet valve on the stripping column is used to achieve the operating pressure setpoint. That is, the inlet gas flow-rate and the operating pressure determine the methane number of the dry gas stream (A-gas).

In one embodiment, in order to achieve the desired maximum NGLs vapor pressure, a reboiler temperature setpoint and the same operating pressure setpoint are controlled. The reboiler temperature setpoint is controlled by a reboiler system control unit, and the operating pressure setpoint is controlled using the pressure control valve of the stripping column as before. That is, the reboiler temperature setpoint and the operating pressure determine the vapor pressure of the NGL liquids stream (C-liquids).

In one embodiment, the result of the above physical relationships is a multi-variate expression relating the output parameters [a) inlet gas flow rate, b) system operating pressure, and c) separator-reboiler temperature set point] as a function of the input parameters [1) heat content (or equivalently, composition) of the input gas stream, 2) volume of the input gas stream, 3) desired methane number of the A-gas (dry methane stream), and 4) desired vapor pressure of the NGLs Y-grade liquid stream (C-stream)]. This mathematical relationship can be used for both simulation and for control loop code. The simulation output can be used to select an inlet flow rate, a system operating pressure, and a reboiler temperature setpoint, given the characteristics of the well (a heat content of the input gas stream, and a volume of the input gas stream), and the desired output stream characteristics (the desired methane number of the dry gas, and the desired vapor pressure of the NGL liquids).

In one embodiment, the reboiler control unit has temperature sensors wired into the reboiler, and responds to a setpoint. For example, at a setpoint of 40° C., the reboiler control unit will monitor the temperature sensors on the reboiler, increase or decrease power output as needed, and utilize an internal solid state relay to control heater(s) in the reboiler, and turns the heater(s) in the reboiler on or off.

According to one embodiment of the control system, there are four (4) input parameters to the control loop, and three (3) output parameters to the control loop. The first two input parameters, namely heat content and volume flow rate of the raw natural gas, are determined by the properties of the well. The second two input parameters, namely the desired methane number (minimum desired methane % in the dry gas) and the desired vapor pressure (maximum desired vapor pressure in the NGLs) are determined by the end-user or operator, and is based on the required specifications of the use-case for the dry gas (for example, whether electricity generation, CNG production, etc.) and the NGLs (for example, NGL fractionator requirements, etc.). Finally, the three output parameters, namely the inlet flow rate, the system operating pressure, and the separator temperature setpoint are the output parameters of the control loop that control the MAGS system to perform the required separation to achieve the end-user or operator desired parameters for the given well properties. In one embodiment, the inlet flow rate output parameter controls the inlet valve and/or the compressors' speed to control the inlet flow rate into the MAGS to the control system's setpoint. The system operating pressure output parameter controls the pressure control valve (in one embodiment, situated on the outlet to the stripping column) to control the system operating pressure to the control system's setpoint. The separator temperature setpoint output parameter controls the temperature setpoint of the separation subsystem to control the separator operating temperature to the control system's setpoint. In one embodiment, the separator temperature setpoint is a reboiler temperature setpoint on a reboiler in the separation subsystem. In one embodiment, the reboiler temperature setpoint is controlled by a black box reboiler controller.

In short, in one embodiment, there is a set of input parameters that are determined by the well, a set of input parameters that are determined by the operator/end-user/application, and a set of output parameters that control the MAGS or other piece of field equipment given the two sets of input parameters.

Other aspects of the MAGS Control System allow any piece of oil and gas equipment of whatever nature to be remotely controlled, monitored, and managed utilizing a graphical user interface (GUI) displayed on any end-user device whatsoever.

Accordingly, embodiments of the present invention include a method, process, system, apparatus, and/or non-transitory digital storage medium storing executable program code, which when executed by a hardware processor, causes the hardware processor to perform a process of controlling separation of a raw natural gas stream into at least two useable streams comprising a dry natural gas stream (NG) having a desired minimum methane number and a natural gas liquids stream (NGLs) having a desired maximum vapor pressure. The method, process, system, apparatus, and/or the program code include steps comprising: (1) controlling an inlet flow rate of raw natural gas stream to track a predetermined flow rate; (2) controlling a system operating pressure to track a predetermined system operating pressure; and (3) controlling a temperature setpoint of a separation subsystem to track a predetermined temperature setpoint, wherein the inlet flow rate, the system operating pressure, and the temperature setpoint are controlled to maintain the desired minimum methane number and the desired maximum vapor pressure, and wherein the inlet flow rate, the system operating pressure, and the temperature setpoint are determined by a heat content of the raw natural gas stream, a volume flow rate of the raw natural gas stream, the desired minimum methane number, and the desired maximum vapor pressure.

Other embodiments of the present invention include, wherein the inlet flow rate is controlled by controlling an inlet control valve or a compressor speed on one or more compressors.

Other embodiments of the present invention include, wherein the inlet flow rate is between about 120 mcf per day to about 1200 mcf per day.

Other embodiments of the present invention include, wherein the system operating pressure is controlled by controlling a pressure control valve in the separation subsystem.

Other embodiments of the present invention include, wherein the system operating pressure is between about 6 bar to about 35 bar.

Other embodiments of the present invention include, wherein the temperature setpoint of the separation subsystem is a reboiler temperature setpoint of a reboiler in the separation subsystem.

Other embodiments of the present invention include, wherein the reboiler temperature setpoint is controlled by a reboiler controller.

Other embodiments of the present invention include, wherein the reboiler temperature setpoint is between about 0 degrees C. to about 120 degrees C.

Other embodiments of the present invention include, wherein a composition of a third stream, comprising an ethane-rich stream, is allowed to vary in composition.

Other embodiments of the present invention include, wherein the desired minimum methane number of the dry natural gas stream corresponds to a methane content selected from the group consisting of 60% methane, 65% methane, 70% methane, 75% methane, 80% methane, 85% methane, 90% methane, and 95% methane.

Other embodiments of the present invention include, wherein the desired maximum vapor pressure of the NGLs stream is no more than 17 bar at 38° C.

Other embodiments of the present invention include, wherein the desired maximum vapor pressure of the NGLs stream is between about 5 bar to about 20 bar at 38° C., and more preferably between about 14 bar and about 17 bar at 38° C.

Other embodiments of the present invention include, wherein the heat content of the raw natural gas stream is between about 1100 BTU to about 1800 BTU.

Other embodiments of the present invention include, wherein the volume flow rate of the raw natural gas stream is between about 100 mcf per day to about 5000 mcf per day.

Yet other embodiments of the present invention include a method, process, apparatus, and/or a system for remotely monitoring and controlling a chemical process, the system comprising a piece of remote field equipment for performing the chemical process; a user device; a server comprising a hardware processor, a memory, and a non-transitory digital storage medium storing executable program code; a communications-link between said user device and said server; and a plurality of program code embodied on said non-transitory digital storage medium, said plurality of program code which when executed causes said hardware processor to execute a process performing the steps of: (1) establishing an equipment-server connection between said piece of remote field equipment and said server; (2) establishing a client-server connection between said user device and said server; (3) providing an interface to allow a user to display a plurality of parameters on said user device; (4) receiving a set of input chemical process parameters corresponding to parameters of an input chemical stream; (5) receiving a set of desired chemical process output parameters corresponding to desired parameters of an output chemical stream; (6) controlling a set of chemical process control parameters to achieve the desired chemical process output parameters given the input chemical process parameters and the desired chemical process output parameters; and (7) providing an interface to allow an operator to manually control and/or manually override the set of chemical process control parameters.

Other embodiments of the present invention include, wherein the chemical process is processing a raw natural gas stream into two output product streams.

Other embodiments of the present invention include further steps to: controlling an inlet flow rate of the raw natural gas stream to a track a predetermined flow rate; controlling a system operating pressure to track a predetermined system operating pressure; and controlling a temperature setpoint of a separation subsystem to track a predetermined temperature setpoint, wherein the inlet flow rate, the system operating pressure, and the temperature setpoint are controlled to maintain a minimum methane number of a dry gas output stream and a maximum vapor pressure a natural gas liquids stream (NGLs), and wherein the inlet flow rate, the system operating pressure, and the temperature setpoint are determined by a heat content and a well flow rate of the raw natural gas stream.

Yet other embodiments of the present invention include a method, process, apparatus, and/or a system for controlling separation of a raw natural gas stream into at least two useable streams comprising a dry natural gas stream (NG) having a minimum methane number and a natural gas liquids stream (NGLs) having a maximum vapor pressure, the system comprising one or more compressors adapted to compress the raw natural gas stream; a refrigeration subsystem adapted to lower a temperature of the compressed natural gas stream; a separation subsystem adapted to separate the compressed and refrigerated natural gas stream into the at least two product streams comprising the dry natural gas stream that is at least 65% methane, and the natural gas liquids stream (NGLs) having a vapor pressure of no more than 17 bar at 38° C.; and a control subsystem for controlling an inlet flow rate of the raw natural gas stream, a system operating pressure, and a temperature setpoint of the separation subsystem.

Other embodiments of the present invention include, wherein a third stream, comprising an ethane-rich stream, is allowed to vary in composition.

Other embodiments of the present invention include a power generation subsystem tuned to run on the ethane-rich stream adapted to provide electricity to run the system.

Other embodiments of the present invention include, wherein the natural gas liquids stream has a vapor pressure of no more than 14 bar at 38° C.

Other embodiments of the present invention include a chassis for holding the system for field deployment, said chassis mountable to a trailer, a truck, a train, a boat, a floating platform, or an airplane.

Other embodiments of the present invention include a dehydration subsystem to dehydrate the raw natural gas before compression.

Other embodiments of the present invention include, wherein the dehydration subsystem removes a trace humidity from the natural gas stream to achieve an aqueous dew point below at least −40° C. to −80° C.

Other embodiments of the present invention include, wherein the refrigeration subsystem further comprises a high-stage refrigeration loop for lowering a temperature of the dehydrated, compressed natural gas stream; and a low-stage refrigeration loop for further lowering the temperature of the dehydrated, compressed natural gas stream, wherein the low-stage refrigeration loop is an autocascade loop having mixed refrigerants.

Other embodiments of the present invention include, wherein the refrigeration subsystem cools the compressed natural gas stream to a temperature range of −40° C. to −80° C., sufficient to achieve NGLs separation in a single separation column.

Other embodiments of the present invention include, wherein the refrigeration subsystem cools the compressed natural gas stream to a temperature range of −50° C. to −60° C.

Other embodiments of the present invention include, wherein the one or more compressors compress the raw natural gas stream to a pressure range of 6 to 35 bar.

Other embodiments of the present invention include a sulfur removal module adapted to reduce a sulfur content of the raw natural gas stream entering the system positioned upstream of the one or more compressors.

Other embodiments of the present invention include a CNG compressor for compressing the dry natural gas stream to compressed natural gas (CNG) at a pressure of at least 105 bar (1500 psig).

Another embodiment of the present invention is a method, system, apparatus, and a non-transitory digital storage medium for storing executable program code, which when executed by a hardware processor, causes the hardware processor to perform a process of controlling separation of a raw natural gas stream into at least two useable streams comprising a dry natural gas stream (NG) having a desired minimum methane number and a natural gas liquids stream (NGLs) having a desired maximum vapor pressure, the program code causing the processor to perform steps comprising controlling one or more process parameters, the one or more process parameters selected from the group consisting of an inlet flow rate of a raw natural gas stream, a system operating pressure, and a temperature setpoint of a separation subsystem, wherein the one or more process parameters are controlled to maintain the desired minimum methane number and the desired maximum vapor pressure.

Yet another embodiment of the present invention is an apparatus for automating, monitoring, and controlling remote chemical processing hardware systems at geographically stranded sources of natural gas, comprising a plurality of remote hardware systems adapted to be responsive to electromagnetic signals resulting in control of a plurality of process parameters; a plurality of electronic communications infrastructures connecting the apparatus, subsystems, components, and personnel; and a human-machine interface (HMI) adapted to allow supervisory intervention and specification of operating points, wherein a plurality of computationally determined ideal operating points is utilized to produce products which meet client specifications from an inlet feedstock of varying conditions. In some embodiments, the electronic communications infrastructures utilize a communication protocol selected from the group consisting of Modbus, CANbus, TCP/IP, UDP, 3G, 4G, LTE, coaxial, IEEE 802.11a/b/g/n, IEEE 802.15.4, Bluetooth, VPN, IPsec, ISAKMP, near-field communication, Fieldbus, 900 MHz radio, and combinations thereof.

Other features, utilities, and advantages of the various embodiments of the invention will be apparent from the following more particular description of various embodiments of the present invention.

BRIEF DESCRIPTION OF THE DRAWINGS

The invention will be understood by the following detailed description in conjunction with the accompanying drawings, wherein like reference numerals designate like structural elements, in which.

DETAILED DESCRIPTION OF THE INVENTION

Definitions

Figure 1:
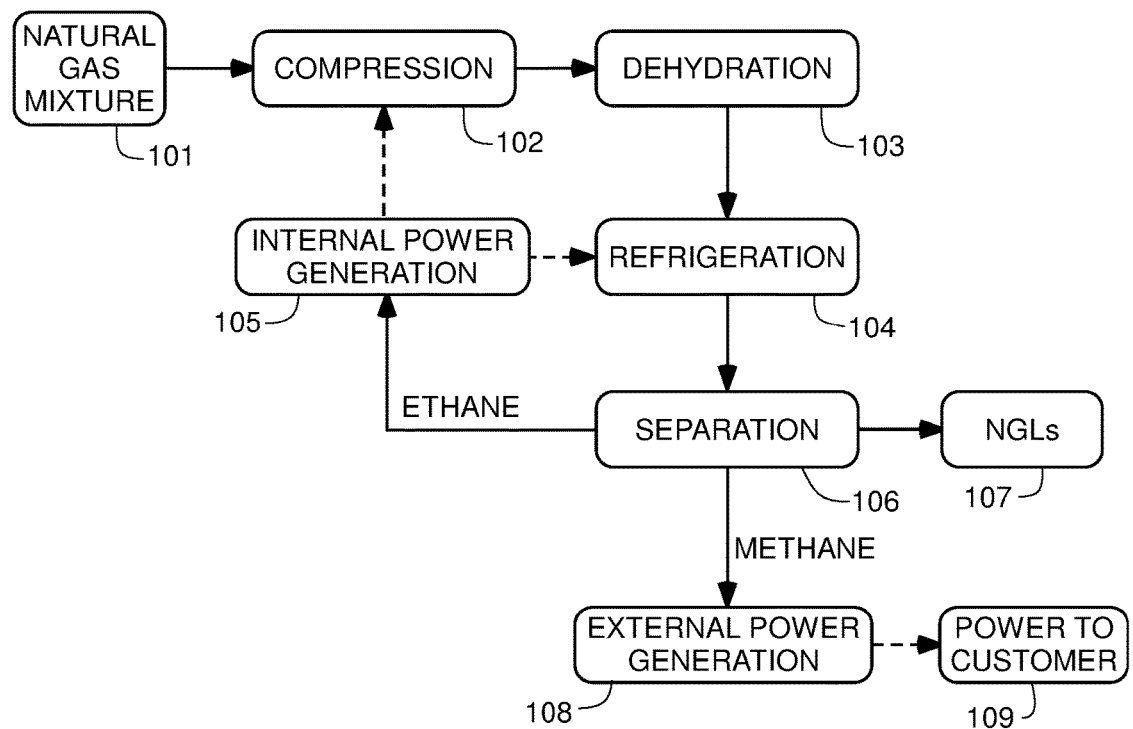
FIG. 1 shows a block diagram of one embodiment of a Mobile Alkane Gas Separator (MAGS).

The following terms and corresponding definitions are merely presented for illustrative purposes only, to aid the reader in understanding the invention, and are not to be read as limiting the scope of the present invention as claimed in any way. The terms may be used in the form of nouns, verbs or adjectives, and in plural or singular form.

Throughout this disclosure MAGS, full scale apparatus, or any reference to a single full-scale module, will refer to an apparatus module that can process 200-1,250 mcf (thousand cubic feet) of raw natural gas per day. Assuming a typical Bakken gas composition illustrated in Table 1, the MAGS unit operating on 200 mcf per day of input would produce approximately 1700 gallons of natural gas liquids (~46 mcf of gas equivalent, ~23% of the total volume of flare gas), ~100-120 mcf of lean methane (~58% of the total volume of flare gas), and ~25-40 mcf of an ethane-rich stream (~19% of the total volume of flare gas). Multiple modules can be combined for higher gas flow rates. These product flow estimates are based on a sample assay of a sample flare gas provided from a sample well by a major Bakken oil company, and are provided for explanation purposes only, and are not intended to be limiting the scope of the present invention in any way. Different input raw gas compositions would produce different quantities of products.

The symbols cf, CF, scf, and SCF shall all stand for standard cubic feet ($ft^3$). The symbols mcf, MCF, and kcf will all stand for a thousand standard cubic feet (1,000 scf). The symbols MMCF, MMcf, and mmcf will all stand for a million standard cubic feet (1,000,000 scf or 1,000 mcf). The word day shall mean "a day of operations," which shall be a 24-hour day, but could also be an 8-hour day, a 12-hour day, or some other amount of operational time. 1 scf=0.02832 standard $m^3$=28.32 L.

Natural gas at the wellhead is commonly a mixture of methane (C1) with other hydrocarbons, including ethane (C2), propane (C3), butane (C4), pentane (C5), and hexane and higher (C6+). Wellhead natural gas also contains other compounds such as water vapor ($H_2O$), hydrogen sulfide ($H_2S$), carbon dioxide ($CO_2$), oxygen ($O_2$), and nitrogen ($N_2$). Also known as raw natural gas.

Associated gas is natural gas produced as a by-product of oil drilling, either conventional or unconventional extraction (such as hydraulic fracking for tight oil). Also known as raw natural gas.

Flare gas is natural gas, usually associated gas, that is flared (burned for no useful purpose) because natural gas pipelines are not in place when the oil well is drilled. Also known as raw natural gas.

Stranded gas is natural gas, usually associated gas that is flared, that cannot be brought to market either because it is off-shore or too far from natural gas pipelines/infrastructure. Also known as raw natural gas.

As used herein, the phrase raw natural gas shall be interchangeable with, and could mean, all of the following: unprocessed natural gas, associated gas, flare gas, and/or stranded gas, and is meant to encompass all such raw natural gas sources.

Wet gas is natural gas that contains a high proportion of C2+ components (typically more than 10%). Wet gas is frequently also saturated with water vapor. This is an approximate definition often used by those skilled in the art.

Dry gas is natural gas with typically less than 5% C3+ components, or typically less than 10% C2+ components. This is an approximate definition often used by those skilled in the art.

Natural gas liquids (NGLs) are C3+ components, including propane and heavier hydrocarbons, and may include small amounts of methane and ethane. Other definitions sometimes include ethane as an NGL (natural gas liquid).

Y-grade is an informal standard used to specify NGL requirements. One common definition for Y-grade is a hydrocarbon mixture having essentially no methane and a low ethane content, typically having a vapor pressure of no more than 17.2 bar/250 psia at 38° C./100° F. Y-grade is not necessarily limited to 17.2 bar/250 psi, but refers to a hydrocarbon mixture that has essentially no methane and a low fraction of ethane, and accordingly a vapor pressure that is lower than raw wellhead gas. Each fractionator that purchases NGLs has different Y-grade requirements. In some embodiments, Y-grade is 10-17 bar/150-250 psig vapor pressure. In others, Y-grade may be as high as 41 bar/600 psig vapor pressure. Standard propane tanks are typically rated for pressures of approximately 14-17 bar/200-250 psig at 38° C., so depending on context, Y-grade may refer to a vapor pressure of a mixture that is safe to transport in propane tanks.

LPG is an acronym for Liquefied Petroleum Gas, which is generally a term for pressurized, processed gas mixtures of C3+ components, most commonly primarily propane and butane.

CNG is an acronym for Compressed Natural Gas, which is typically mostly methane (C1) compressed to a pressure above approximately 105 bar/1,500 psig, although higher or lower pressures are also possible.

LNG is an acronym for Liquefied Natural Gas, which is typically mostly methane (C1) at a pressure and a temperature in which it is a liquid phase.

Joule-Thomson Effect, sometimes referred to simply as "J-T effect," describes the temperature change of a fluid when it passes through a pressure valve or orifice while kept insulated from the environment so that no heat is exchanged. At room temperature, all gases (except hydrogen, helium, and neon) cool upon expansion by the Joule-Thomson effect.

A-gas, A-stream, or dry gas stream refers to the lean methane stream produced in some embodiments of the present invention, having a high-methane content, typically a methane number greater than 65, and typically at least 70% methane, and more preferably at least 75%, and with a sufficiently low energy content (BTU/mcf) to be useable in unmodified natural gas engines. This gas may sometimes be referred to as sales gas, or lean methane gas, depending on context, as this is the gas provided or sold to the customer's natural gas gensets for power generation.

B-gas, B-stream, or ethane-rich stream refers to the ethane-rich stream produced in some embodiments of the present invention, having a high ethane content, typically 20-60% ethane (with the remainder methane and other hydrocarbon mixtures), and typically used by the ethane-tuned engine for powering the system. The specification and requirements of the B-stream are the most flexible, since the ethane-tuned engine can be tuned to operate on a wide range of ethane levels. This gas may sometimes be referred to as ethane-rich or ethane-enriched gas.

C-liquid, C-stream, or NGLs stream refers to the natural gas liquids (NGLs) stream produced in some embodiments of the present invention, having a vapor pressure that meets a Y-grade standard for transport in existing pressure vessels or trailers. This stream may sometimes be referred to simply as the natural gas liquids (NGLs) stream.

A distillation column is used to separate a fluid mixture into its constituent parts based on differences in the volatility of components in a boiling liquid mixture. Distillation is a physical separation process and not a chemical reaction. A stripping column is the bottom half of a distillation column and involves a reboiler. The top portion above the inlet is referred to as a fractionating column and involves an overhead condenser.

A refrigerator is a mechanical device used to reduce a temperature of a process fluid, such as a process gas, to a lower temperature through heat exchange with a low temperature fluid, known as a "refrigerant."

A cascade refrigerator, or simply "cascade," utilizes two or more refrigeration "stages" in series to achieve a lower temperature than that achievable in a single stage. The first stage is of a higher temperature and is known as the "high stage," and the second stage is of a lower temperature and is known as the "low stage."

An autocascade refrigerator, or simply "autocascade," utilizes two or more refrigerants in a single stage to achieve a lower temperature than that achievable in a single stage of a cascade refrigerator, by utilizing refrigerants of varying boiling points.

Desired methane number or minimum methane number ("MN") is a MAGS control system parameter which is related to the minimum percentage of methane in the dry methane stream (A-gas) produced by the MAGS system. The California Air Resources Board (CARB) defines the methane number as a function of the motor octane number ("MON"). The MON, in turn, is a function of the hydrogen to carbon ratio of the fuel ("H/C"). The H/C ratio is related to the methane composition of the fuel, but is not necessarily identical to the methane composition. In one embodiment, $MON=-406.14+508.04*(H/C)-173.55*(H/C)^2+20.17*(H/C)^3$, and $MN=1.624*MON-119.1$. In short, the methane number ("MN") is a function of the methane composition of the fuel mixture, relative to higher alkanes in the fuel mixture.

Desired vapor pressure or maximum vapor pressure ("VP") is a MAGS control system parameter corresponding to the maximum vapor pressure of the natural gas liquids (NGLs) stream (C-stream), which is directly related to its storage pressure in a propane or other Y-grade tank. Standard propane tanks are typically rated for NGL pressures of approximately 14-17 bar/200-250 psig total internal tank pressure at 38° C., so for example, the Y-gas standard may be a vapor pressure of a NGLs mixture that is safe to transport in propane tanks at up to 38° C. (ambient temperature on a very hot day).

MAGS control system or simply control system is a control scheme that can ensure production of dry methane of a minimum methane number and can ensure the production of NGLs of maximum vapor pressure from any supplied input gas source. In one embodiment, this is done by controlling three key system parameters: system pressure, inlet gas flow rate, and reboiler temperature setpoint. In some embodiments, the Control System can also refer to any remote control system for any oil and gas field equipment, not limited to use with the MAGS.

Communications network is a collection of terminal nodes, links, and any intermediate nodes that are connected so as to enable telecommunication between the terminals. The Internet is a widely used communications network.

Physical medium and storage medium refer to an article of manufacture in which computer program code may be stored, said program code later to be executed by a computer having at least one hardware or physical processor, such as a server.

Data repository refers to a central place, such as a database, where data is stored and maintained. It is also a logical (and sometimes physical) partitioning of data where multiple databases which apply to specific applications or sets of applications reside.

Interface, user interface, or graphical user interface (GUI) is a user interface (UI) in a display of a computer screen, where a user of a computer system can provide input. A touch interface is an interface where a user can provide an input by using a finger or stylus.

Server is a computer comprising a processor and a memory that is used by the system to provide the software program code implementing the invention to multiple client devices over a communications network.

User-device, client device, mobile device, computing device, or user-operated computer is a computer with a display, input options, a processor and a memory, often in the form of a laptop, desktop, tablet, smartphone, or the like, that is used by users of the system to access the services of the present invention.

Client-server connection, telecommunications link, or client-server environment is a connection between a server and a user-device via a communications network.

Computing appliance includes both a server and a user-device.

Rule refers to any instruction provided by the methods and the systems of the present invention in the process of implementing the present invention. A rule comprises computer programs or codes, and/or algorithms.

Algorithm is a set of instructions to be followed in calculations or data processing, especially by a computer. In a computer implemented method or system, the term algorithm may be used interchangeably with the terms "rules" or "instructions," to refer to a sequence of steps to be carried out by a computer processor following instructions encoded in memory.

One embodiment or an embodiment means that a particular feature, structure, or characteristic described in connection with the embodiment is included in at least one embodiment of the invention. The appearance of the phrases "in one embodiment" in various places in the specification is not necessarily all referring to the same embodiment, nor is a separate or alternative embodiment mutually exclusive of other embodiments. Various features are described which may be exhibited by some embodiments and not others.

Overview of the Mobile Alkane Gas Separator (MAGS)

The following description is merely exemplary in nature and is in no way intended to limit the scope of the present disclosure, application, or uses.

First, a description of the system being controlled, the MAGS itself, is described. The MAGS system design presented in the present application solves the problems with both existing pipeline-based solutions as well as existing mobile systems. The present system can accomplish both goals of lean methane production and transportable NGLs separation simultaneously, an accomplishment that was not possible with the prior mobile systems. The presently disclosed invention produces both lean methane and simultaneously produces useable and transportable NGLs with a vapor pressure low enough to be transportable in propane tanks (Y-grade).

One unique aspect of the MAGS system is its modularity, and it is possible to add a CNG compressor without changing any elements of the design of the MAGS itself. Therefore, the MAGS system can operate to produce either dry, low-pressure methane gas, or can be easily configured with an extra add-on CNG compression module to produce high-pressure CNG, without any significant modifications to the rest of the MAGS system. The A-gas is produced at 10 bar (140 psi), so it is possible to use a 3-stage compressor going all the way to about 3000 psi, or a powerful 2-stage compressor, in contrast to the prior art, which would require at least 4 stages of compression to achieve CNG directly from raw low-pressure field gas. Therefore, some embodiments of the present invention eliminate 1-3 stages of compression, depending on the desired CNG pressure. Typical CNG transportation trailers can vary in pressure from 1500-3200 psi, or could potentially be higher or lower pressure, depending on the material characteristics of the CNG transport containers and government safety regulations.

In one of several innovations, the inventors have realized as a result of substantial experimental work that an ideal temperature and pressure range of the stream that leaves the refrigeration unit and goes into the separation unit (described in greater detail below in relation to FIG. 7) can be achieved. The inventors have also developed a unique refrigeration subsystem design and a unique overall system design, resulting in a system that can achieve high-quality separation in a field environment using a mobile processing plant. By utilizing a unique cascade/autocascade refrigeration system to achieve an ideal temperature range, the inventors have also been able to reduce the operating pressure of the entire system, as well as reduce the cost and complexity of the entire system. The result is a portable natural gas processing plant that can simultaneously achieve both lean methane separation as well as NGLs capture meeting Y-grade specification. This has not been achieved previously by mobile systems in a field environment.

Accordingly, the inventors have invented an approach to separate a raw natural gas stream into three (3) ideal streams, in a mobile system, and have realized that all three (3) streams can be used without any waste whatsoever.

The inventors have invented a process in which the raw natural gas is reduced to a temperate of about −40° C. to −80° C., and more preferably −50° C. to −60° C., depending upon the flare gas composition. The pressure is preferably in a range of approximately 5.5 bar (80 psig) to approximately 34.5 bar (500 psig), and even more preferably approximately 7-21 bar (100-300 psig).

One of several ways to achieve such a low temperature range in a mobile unit is to utilize a unique refrigeration unit also invented by the present inventors. The unique cascade/autocascade refrigeration unit utilizes a cascade refrigeration stage in series with an autocascade refrigeration stage, in a compact, portable chassis for delivery to the field site. However, the present invention is not limited to utilizing the specific refrigeration unit shown and described.

Accordingly, one embodiment of the present invention is a system for separating methane and natural gas liquids from a raw natural gas stream, comprising a chassis or skid adapted to hold the system for field deployment; a compressor for compressing the raw natural gas stream; a dehydrator for removing water from the raw natural gas stream; a refrigerator for lowering a temperature of the natural gas stream to an ideal temperature range, preferably approximately −40° C. to −80° C., and even more preferably −50° C. to −60° C., and possibly −20° C. to −100° C., depending upon the flare gas composition; and a separation subsystem adapted to separate the natural gas stream into three product streams consisting essentially of a methane stream of at least 70% methane (and preferably at least 80-85% methane, and more preferably at least 90% methane), an ethane-rich stream comprising typically 20-60% ethane, as well as methane and possibly other residual hydrocarbons, and a natural gas liquids stream having a vapor pressure of no more than 17.2 bar (250 psia) at 38° C./100° F. (and preferably no more than 15.5 bar (225 psia), and even more preferably no more than 13.8 bar/200 psia). The methane stream is of sufficient purity and sufficiently lean to be useable in existing natural gas engines without modifications. The natural gas liquids stream is of sufficiently low vapor pressure to be transportable in standard propane pressure vessels (Y-grade). One common definition for Y-grade is a gas mixture having a vapor pressure of no more than 17.2 bar/250 psia at 38° C./100° F. In one preferred embodiment of the present invention, the ethane-rich stream is utilized within the system itself to power operations.

Yet another embodiment of the present invention is the system described above, further comprising a power generator tuned to run on ethane-rich gas adapted to provide the electricity to run the compressor, the refrigerator, and other system components, utilizing the ethane-rich stream as its energy source.

Yet another embodiment of the present invention is the system described above, wherein the compressor compresses the raw natural gas stream to a pressure of no more than approximately 21 bar/300 psig. Yet another embodiment of the present invention is the system described above, wherein the chassis is mounted on a trailer having one or more wheels.

Yet another embodiment of the present invention is the system described above, wherein the refrigerator further comprises a high-stage refrigeration loop having at least one heat exchanger for lowering a temperature of the dehydrated flare gas; and a low-stage refrigeration loop having at least one heat exchanger for further lowering the temperature of the dehydrated flare gas. Yet another embodiment of the present invention is the system described above, wherein the low-stage refrigeration loop is an autocascade loop having mixed refrigerants. Yet another embodiment of the present invention is the system described above, wherein the mixed refrigerants are hydrocarbons.

Yet another embodiment of the present invention is the system described above, wherein the dehydrator employs desiccant beds, preferably zeolite beds. Yet another embodiment of the present invention is the system described above, wherein two desiccant beds are employed in alternation, wherein heat required to dry the two beds is derived from waste heat from a power generator that drives the compressor and the refrigerator.

Yet another embodiment of the present invention is the system described above, wherein the separation subsystem comprises a stripping column Yet another embodiment of the present invention is the system described above, wherein the separation subsystem comprises a distillation column. Yet another embodiment of the present invention is the system described above, wherein the separation subsystem comprises one or more flash tanks. Yet another embodiment of the present invention is the system described above, wherein the separation subsystem further comprises one or more cyclones to separate liquids from gasses.

Yet another embodiment of the present invention is the system described above, wherein the refrigerator cools the natural gas stream to a temperature range of −40° C. to −80° C.

Another embodiment of the present invention is a method for purifying natural gas, comprising the following steps: (1) bringing a mobile alkane gas separator system to an oil field flaring associated gas; (2) compressing a raw associated natural gas stream utilizing a compressor; (3) removing water from the raw natural gas stream utilizing a dehydrator; (4) lowering a temperature of the natural gas stream utilizing a refrigerator loop; and (5) separating the natural gas stream into three product streams consisting essentially of a methane stream of at least 70% methane (and preferably at least 80-85% methane, and more preferably at least 90% methane), an ethane-rich stream comprising ethane (typically 20-60% ethane), methane, and possibly other residual hydrocarbons, and a natural gas liquids stream having a vapor pressure of no more than 17.2 bar/250 psia at 38° C./100° F. (and preferably no more than 15.5 bar/225 psia, and even more preferably no more than 13.8 bar/200 psia). The methane stream is of sufficient purity and sufficiently lean to be useable in existing natural gas engines without modifications. The natural gas liquids stream is of sufficiently low vapor pressure to be transportable in standard propane pressure vessels (Y-grade).

Yet another embodiment of the present invention is the method described above, further comprising a generation step for generating power by utilizing a power generator tuned to run on ethane-rich gas to provide electricity to run the alkane gas separator, utilizing the ethane-rich stream as its energy source.

Yet another embodiment of the present invention is the method described above, wherein the refrigeration step utilizes an autocascade refrigerator having mixed hydrocarbon refrigerants. Yet another embodiment of the present invention is the method described above, wherein the refrigeration step cools the natural gas stream to a temperature range of −40° C. to −80° C. Yet another embodiment of the present invention includes two, three, or more stages of refrigeration. Yet another embodiment of the present invention is the method described above, wherein the dehydration step employs desiccant beds. Yet another embodiment of the present invention is the method described above, wherein two desiccant beds are employed in alternation, wherein heat required to dry the two beds is derived from waste heat from a power generator. Yet another embodiment of the present invention includes the method described above, wherein the desiccant beds are zeolite beds.

It is highly disadvantageous—both from a financial and an environmental perspective—to flare valuable natural gas liquids that could be sold at great profit. It is even more disadvantageous to spend large amounts of money on diesel fuel for power generation, and at the same time flare methane that could be doing the same job. The problem is that liquids-rich raw natural gas cannot be used in generators and cannot be transported by truck. The inventors recognized that what is needed is a mobile system that can go to a well-site that is currently flaring gas, and separate the raw natural gas into methane that can be used to generate power (or for other purposes), and liquids that can be transported for sale. It is to meet this unmet need that the inventors have developed the Mobile Alkane Gas Separator (MAGS) System.

In the MAGS, raw natural gas is first compressed and then dehydrated. The dry, compressed gas is then refrigerated down to optimally cold temperatures, causing the high molecular weight natural gas components to liquefy. A two-phase separator (such as a stripping column) is then employed to separate the natural gas mixture into three streams. One stream, composed almost entirely of methane with a small amount of ethane, is sent off to power generators to provide electricity for either local use or sale to the grid. Another, composed primarily of ethane and methane (ethane-rich stream), is sent to the MAGS internal power generator to support its own operation. The third, composed of natural gas liquids including propane, butane, pentane, and hexane, as well as higher hydrocarbons, is stored as a liquid so that it can be transported to market for sale.

Therefore, the MAGS solves a long-felt, unsolved need to nearly entirely eliminate flaring by dividing the raw natural gas into three streams, and providing a use for all three streams. This allows oil operators to take flaring to an absolute minimum.

The innovative design of the MAGS according to the principles of the present invention utilizes efficient gas separation using a novel cascade/autocascade refrigeration subsystem. This design allows for compact and cost-effective separation of raw natural gas at the site of an oil field. The natural gas liquids are transported by truck and sold, while the ethane-rich stream is used to power the system itself. Meanwhile, the methane stream is lean, and can be utilized for power generation, high-pressure conversion to CNG which can be used in vehicle applications or transported to remote sites, chemical conversion to liquids such as methanol, dimethyl ether, and higher hydrocarbon liquid fuels, or liquefied into LNG, or for other purposes.

The unique design of the MAGS produces a system that can be sized to fit within the dimensions of a regular semi-trailer. Trailers are limited by U.S. Department of Transportation (DOT) regulations to a size of 13.5 feet by 8.5 feet, and a maximum length of 53 feet. The MAGS-200, which can process 200 mcf/day of flare gas, fits onto a trailer sized 13.5 feet by 8.5 feet, with a length of 40 feet. A larger unit can be manufactured that processes up to approximately 300-500 mcf/day and still fit within the 53 foot length DOT limit. The trailer weighs less than the 60,000 lbs. DOT limit, at approximately 30,000 lbs. in one embodiment of the present invention.

Natural gas at the wellhead is commonly a mixture of methane (C1) with other hydrocarbons, including ethane (C2), propane (C3), butane (C4), pentane (C5), and hexane and higher (C6+). Wellhead natural gas also contains other compounds such as water vapor ($H_2O$), hydrogen sulfide ($H_2S$), carbon dioxide ($CO_2$), oxygen ($O_2$), and nitrogen ($N_2$).

Unmodified natural gas engines are designed to receive preferred methane content of at least 90%, depending on engine manufacturer, corresponding to a methane number of approximately 80. Unmodified natural gas engines can tolerate a methane content of 70%, and more preferably at least 75%, and with higher hydrocarbons (C3+) of no more than 10-15%, depending on engine manufacturer, corresponding to a methane number of approximately 65. Although natural gas engines can be converted to operate with methane contents below these ranges, this requires modification of the engine controls, a de-rating of the engine, and could void the engine warranty. Therefore, engine operators are reluctant to modify their existing natural gas engines. The present invention obviates the need to modify engines since it produces a lean methane stream useable on unmodified gas engines.

The process described in this patent application has been demonstrated to achieve a methane content in the methane stream of at least 87%, depending on the feedstock. If the raw natural gas stream is 70% methane, the process can achieve over 90% methane. If the raw natural gas stream is 60% methane, then the process can achieve 87% methane. If the raw natural gas stream is lower in methane content, then the process can achieve at least 70% methane content in the methane stream, which is sufficient to meet the minimum requirements of unmodified gas engines.

The processes described in this patent application have been demonstrated to achieve Y-grade NGLs of approximately 17 bar/250 psi maximum vapor pressure at 38° C./100° F. As noted in the definitions, Y-grade is not necessarily limited to 17 bar/250 psi, but refers to a hydrocarbon mixture that has essentially no methane and a low fraction of ethane. Each fractionator has different Y-grade product specifications (pressures and quality parameters of product) and ways of receiving the Y-grade (e.g., pipeline connections or tank car loading capabilities). If a pipeline receiving the NGL stream can accept 41 bar/600 psi, then 41 bar/600 psi vapor pressure would be acceptable in some embodiments of the present invention. The existing propane tanks are rated for 14-17 bar/200-250 psia, depending on the transportation company, and most often 16 bar/225 psia. Therefore, a preferred embodiment of the present invention would achieve the vapor pressure required for transport in propane tanks. The lowest possible NGLs vapor pressure is preferable; however, the lowest achievable vapor pressure in practice is the same vapor pressure as propane, or ~13 bar/~190 psig, if propane is the predominant NGLs (and possibly lower if it is not present in abundance), since propane has the highest vapor pressure of the NGLs. The lowest vapor pressure possible is desirable because the ethane content brings low value as ethane has a lower price (~$0.30/gal) than either propane or butane, while taking up shipment weight in the transport container. Therefore, economics are improved when ethane content is reduced.

After the methane and NGL streams, the remaining ethane-rich stream is used internally for powering a specially-tuned ethane engine that powers the entire system. This is in contrast to standard refineries which typically convert the extracted ethane to ethylene for use in chemical synthesis. If too much ethane-rich gas volume is present in the raw natural gas stream, then in one embodiment of the invention, the remaining ethane-rich gas that is not needed for power generation may be flared. Alternatively, the remaining ethane-rich gas may be mixed with the methane stream (A-gas), and the methane stream would still meet engine specifications because there would only be a small amount of the ethane-rich gas left over. If there is not enough ethane-rich gas volume to provide sufficient power to the system, then in one embodiment, some of the methane stream will also be utilized to provide sufficient power for system operations. There are no specific requirements on the ethane-rich gas stream for powering the internal power generator according to one embodiment of the present invention (0-100% ethane is acceptable for the processes described here). The reason this can be achieved is because the onboard engine can be modified and tuned to accept any ethane content. In one preferred embodiment of the present invention, the MAGS power generator is a dual-fuel methane-propane gas engine, which is tuned to run on a variable ethane content, since ethane is intermediate between methane and propane in its energy content. In some embodiments, the ethane may be converted to more valuable chemicals such as ethanol, butanol, and so on.

Potential Economics

One of many illustrative scenarios is presented here to demonstrate the potential profitability of the MAGS system. In this scenario, all of the $CH_4$ produced is used for electricity production. Other configurations in which the $CH_4$ is utilized for other purposes is also possible. This economic analysis is illustrative of the invention only and is not meant to limit the scope of the present invention.

In one embodiment, a MAGS-200 field unit processes 200 mcf of raw natural gas per day. Assuming a feed of a NGL-rich composition typical of many Bakken sites as shown in Table 1, such a MAGS-200 unit can refine such a raw feed into enough methane to produce about 450 kWh of electrical power and about 1700 gallons of natural gas liquids per day. The output produced by such a MAGS-200 unit would vary with the gas input composition.

At current prices, the natural gas liquids produced by a MAGS-200 unit running on such a raw gas feed would have a market value of about $1700 per day, which discounted for transport costs could produce $1000 per day in revenue. If used to replace grid power, the electricity would be worth another $1000 per day, while if used to replace diesel-generated power, $4000 per day in savings could be achieved. The total value delivered by the MAGS-200 unit could thus range from about $730,000 to $1,800,000 per year. Assuming a unit value 4 times that of its annual generated profit, such a unit could therefore have a commercial value between $3 million and $7 million. The revenue from such a MAGS-200 unit would vary with the input gas composition, and would be higher for a gas well with a higher NGLs content.

Overview Schematics

The present invention in its various embodiments provides highly efficient and economic solutions to address important unmet needs to recover and use valuable liquid-rich natural gas. In one embodiment, the Mobile Alkane Gas Separator (MAGS) is a mobile system that can go to the well and separate the raw natural gas into methane that can be used to generate power and liquids that can be transported for sale.

FIG. 1 shows a schematic diagram 100 of one embodiment of a process employed by the MAGS according to the principles of present invention. Raw natural gas 101 is first compressed, as shown in module 102. The natural gas is then dehydrated to remove any water content, as shown in module 103. The dry, compressed gas is then refrigerated, causing the high molecular weight natural gas components to liquefy, as shown in module 104. A two-phase separator (such as a stripping column) is then employed to separate the natural gas mixture into three streams, as shown in module 106. One stream, composed almost entirely of methane with a small amount of ethane, is sent off to external power generators 108 to provide electricity for either local use or sale to the grid 109. Another stream, composed primarily of ethane and methane (ethane-rich stream), is sent to the MAGS internal power generator 105 to support its own operation. The third stream, composed of natural gas liquids 107, including propane, butane, pentane, hexane, and higher is stored as a liquid so that it can be transported to market for sale.

Figure 2:
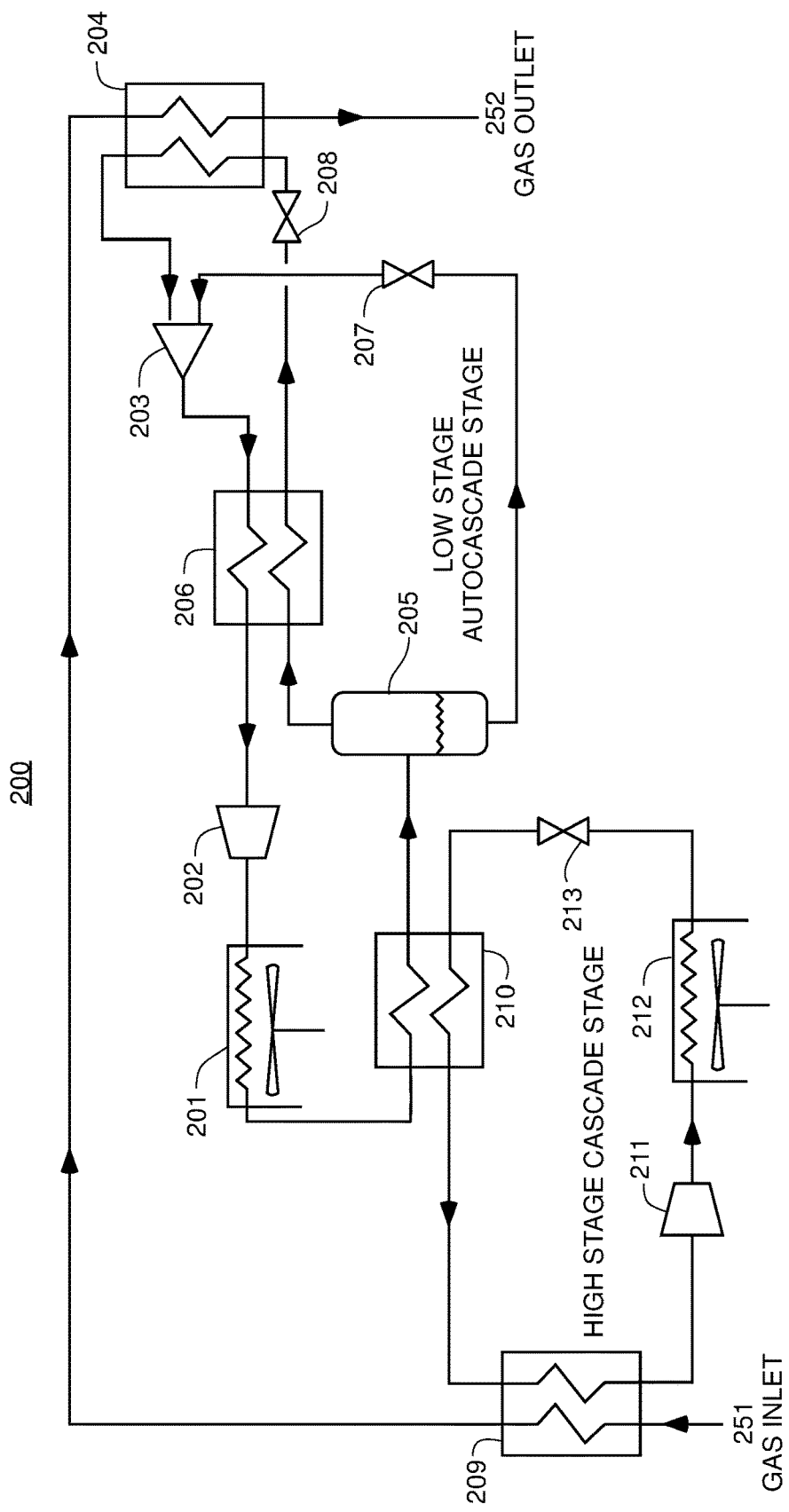
FIG. 2 shows a block diagram of one embodiment of a cascade/autocascade refrigeration cycle useable in one embodiment of the MAGS.

FIG. 2 shows a block diagram of one embodiment of a cascade/autocascade refrigeration cycle useable in one embodiment of the MAGS according to one preferred embodiment of the present invention. As shown in FIG. 2, the design includes a high stage cascade loop and a low stage autocascade loop arranged and interconnected as shown in FIG. 2. The cascade loop utilizes a single refrigerant, while the autocascade loop utilizes two or more refrigerants. In one preferred embodiment of the present invention, the refrigerants are hydrocarbons. In one preferred embodiment of the present invention, the high stage cascade loop utilizes propylene (also known as propene or methylethylene, $C_3H_6$), with a boiling point of $-47.6°$ C. In one embodiment of the present invention, the low stage autocascade loop utilizes two or more hydrocarbons. In a most preferred embodiment of the present invention, the low stage autocascade loop utilizes three hydrocarbons comprising: (1) n-butane, having a boiling point of $0.5°$ C.; (2) propylene, as in the cascade loop having a boiling point of $-47.6°$ C.; and (3) ethylene (also known as ethene, $C_2H_4$), having a boiling point of $-103.8°$ C. Alternative embodiments of the present invention utilize other hydrocarbon refrigerants, while other alternative embodiments utilize other refrigerants, including non-hydrocarbon refrigerants.

After initial compression and dehydration, as well as initial chilling (not shown in FIG. 2), flare gas enters at flare gas inlet 251 and passes through the high-stage cascade loop (high temperature) at a first flare gas heat exchanger 209 (where flare gas is cooled from approximately $25°$ C. to approximately $6°$ C.), and then passes through the low-stage autocascade loop (low temperature) at a second flare gas heat exchanger 204 (where the flare gas is further cooled down to an exit temperature of approx. $-57°$ C.). The refrigerated flare gas then exits the autocascade loop after the second flare gas heat exchanger 204 at flare gas outlet 252 and proceeds to phase separation (not shown in FIG. 2) as described later. Note that various incidental components, such as filters, etc. that have no contribution to the thermodynamic cycle are not shown in FIG. 2 for ease of presentation.

The operation of the cascade/autocascade refrigeration cycles will now be described, starting with the high-stage cascade loop, and secondly the low-stage autocascade loop. Finally, the temperatures and pressures of the flare gas and the refrigerants will be described at each point in the process. The interstage heat exchanger/condenser 210 (also referred to as the auxiliary condenser) connects the high-stage cascade loop with the low-stage autocascade loop. Aside from the interstage heat exchanger 210, the phase separator 205 forms the central core of the system, in which the three hydrocarbon refrigerants of the autocascade loop are phase separated (n-butane and propylene being liquid dominated, and ethylene being vapor dominated in the phase separator 205).

In the high-stage cascade loop, refrigerant (propylene in this example) passes through the first compressor 211, where it is compressed and gains heat (heat of compression), after which it passes through an air-blown condenser 212 which removes some of the heat of compression. The refrigerant then passes through expansion valve 213, where it is cooled substantially via the Joule-Thompson effect. Then, the cold refrigerant from the high-stage cascade loop exchanges heat with the refrigerants in the low-stage autocascade loop via interstage condenser/heat exchanger 210, after which it exchanges heat with the flare gas in the first heat exchanger 209, completing the cycle.

In the low-stage autocascade loop, the multi-component, high-pressure refrigerant is first cooled in the interstage condenser/heat exchanger 210, and then passes to phase separator 205, in which the multi-component refrigerant is separated into its liquid phase (bottom) and vapor phase (top). In the phase separator 205, the n-butane and propylene is liquid, having a higher boiling point, while the ethylene is vapor, having a lower boiling point. The liquid portion (n-butane and propylene in this example) passes to a second expansion valve 207, where it expands and cools before entering static mixer 203 (which will be discussed later). Meanwhile, the vapor portion (ethylene in this example) passes through an autocascade heat exchanger 206, where it exchanges heat with the cold refrigerant from static mixer 203, and condenses into a liquid state. The now liquid ethylene portion then passes through a third expansion valve 208, where it further loses heat via the Joule-Thompson effect Immediately after expansion valve 208 is the lowest temperature point of the system, as low as $-60°$ C. in some embodiments (possibly $-20°$ C. to $-100°$ C.). Finally, the lowest temperature refrigerant passes through a second flare gas heat exchanger 204, where it cools the flare gas before a flare gas outlet 252. After passing through the second flare gas heat exchanger 204, the ethylene refrigerant mixes with the other two refrigerants (n-butane and prolylene) in static mixer 203. After passing through autocascade heat exchanger 206, the three refrigerants are then re-compressed via a second compressor 202, where the refrigerant gains significant heat (via heat of compression). A portion of the heat is removed via the second air-blown condenser/heat exchanger 201, after which it enters interstage condenser/heat exchanger 210, where it is further cooled, completing the autocascade cycle.

The temperatures and pressures of the flare gas and the refrigerants will now be described at each point in the process. These temperatures and pressures are illustrative of but one embodiment of the present invention, and are not intended to limit the scope of the present refrigeration subsystem. Flare gas enters the flare gas inlet 251 at a pressure of ~14 bar/~200 psi and temperature of ~25° C. After passing through the first flare gas heat exchanger 209, there is a slight pressure drop of 0.1-0.2 bar/2-3 psi, and the flare gas temperature is reduced to ~6° C.

In the high-stage cascade loop, after compressor 211, the propylene refrigerant enters at a temperature of ~0° C. and a pressure of ~3.5 bar, and leaves the compressor 211 at a pressure of ~17 bar and a temperature of ~100° C., due to the heat of compression. After the first air-blown heat exchanger 212, the temperature of the propylene refrigerant is reduced to ~37° C., with a slight pressure drop to ~16.8 bar. At the expansion valve 213, all of the propylene is a liquid, and after the expansion valve 213, the propylene is a mixture comprising about 70% liquid and 30% vapor by mass. After the expansion valve 213, the pressure of the propylene refrigerant has dropped to ~4 bar, and the temperature is reduced to about −12° C. due to the Joule-Thompson effect. An interesting effect happens when the propylene passes through the interstage condenser 210, where the pressure drops slightly to ~3.7 bar, and the temperature actually drops slightly to −14° C., due to two countervailing forces—the heat exchange with the autocascade stage and the single-component boiling which occurs in the interstage condenser 210—which implies that the propylene follows its saturation temperature. After the interstage condenser 210, the propylene still has a little bit of liquid left (5% liquid, 95% vapor). When the propylene passes through the first flare gas heat exchanger 209, it is warmed up to its starting temperature of 0° C., and with a slight pressure drop to ~3.5 bar, hence completing the cycle.

In the low-stage autocascade loop, entering the phase separator 205, the temperature of the refrigerants is about −2° C. at ~17.2 bar. The liquid phase (n-butane and propylene) drops to the bottom of the phase separator 205, and passes the expansion valve 207, where the temperature is dropped from about −2° C. to about −41° C., as a result of Joule-Thompson cooling as the pressure is dropped from ~17.2 bar to ~4.2 bar after the expansion valve 207, which leads to static mixer 203. The vapor phase (ethylene) passes through the autocascade condenser/heat exchanger 206, where the temperature of the ethylene refrigerant drops from about −2° C. to about −27° C., with a slight pressure drop to ~17 bar as there is a slight pressure drop through the condenser 206. The entire ethylene refrigerant is liquid as it enters the expansion valve 208. At the expansion valve, the ethylene experiences a pressure drop from ~17 bar to 4.4 bar, resulting in a temperature drop of the ethylene refrigerant from about −27° C. to about −68° C., which is the coldest point of the refrigeration system.

As a result, the flare gas, which comes in at about 6° C. into the second flare gas heat exchanger 204, experiences a temperature drop to about −57° C., as a result of exchanging heat with the optimally cold (−68° C.) ethylene refrigerant, whose temperature rises to −38° C. The resulting flare gas leaves the system from flare gas outlet 252 at about ~57° C. and a pressure of ~12.4 bar.

The liquid phase (n-butane and propylene) refrigerant from expansion valve 207 and ethylene refrigerant from heat exchanger 204 are combined in static mixer 203, where the temperatures are approximately matched, at about −41° C., and −38° C., respectively. After the static mixer 203, the mixed refrigerant has a temperature of approximately −40° C. In the autocascade condenser/heat exchanger 206 the temperature of the refrigerant rises to about −20° C., as it exchanges heat with the ethylene vapor phase from the phase separator 205, with a slight pressure drop to ~3.8 bar across the autocascade condenser 206. The ethylene refrigerant is liquefied in the autocascade condenser 206. Penultimately, the second compressor 202 compresses the mixed refrigerant from ~3.8 bar to ~17.7 bar, resulting in a temperature increase to 90° C. as a result of the heat of compression. The air-blown heat exchanger 201 reduces the temperature to ~40° C., with negligible pressure drop (still at 17.7 bar). At this point in the process, all of the refrigerants are in gas phase in the air-blown heat exchanger 201. Finally, the refrigerant goes through interstage condenser/heat exchanger 210, where its temperature is dropped from ~40° C. to about −2° C., with a slight pressure drop to ~17.2 bar, completing the thermodynamic cycle.

At the interstage condenser 210, there is approximately a 50% liquid, 50% gas composition of the mixed refrigerants. At each expansion valve 213, 207, and 208, there is ~100% liquid inlet, with an outlet of ~75% liquid, but with a significant pressure drop (and associated Joule-Thompson cooling). These temperature and pressure estimates are illustrative of but one embodiment of the present invention, and are not to be interpreted as limiting the scope of the present invention. Furthermore, as will be discussed in greater detail later, this hybrid cascade/autocascade refrigeration design is but one embodiment of the present invention, and other refrigeration subsystem designs are also within the scope of the present invention.

It should be noted that the thermodynamic temperatures presented here include a correction term for the semi-hermetic electric motor encasements, which power the compressors and add heat to the refrigerant independent of the heat of compression. Since electric motors are not 100% efficient and generate some heat, and the motors are cooled as refrigerant moves through the compressor, contributing to compressor discharge temperature. Therefore, the thermodynamic temperatures presented above after each compressor include both the heat of compression as well as the additional motor heat.

Figure 3:
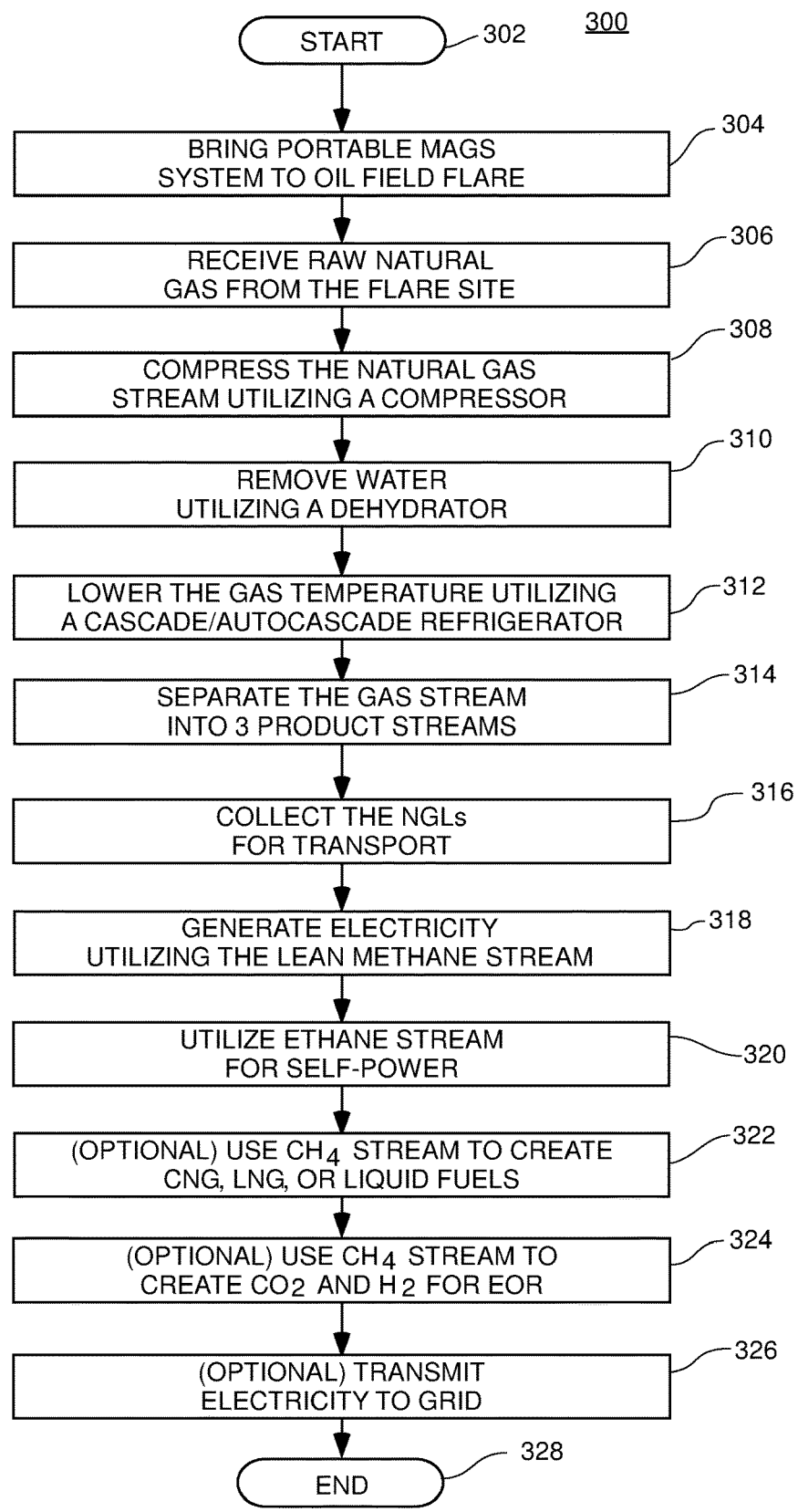
FIG. 3 shows a flowchart of a process for separating alkane gases according to one embodiment of the present invention.

FIG. 3 shows a flowchart of a process 300 for separating alkane gases according to one embodiment of the present invention. An embodiment of the present invention is a method for reducing flaring shown in process 300, which starts in step 302. First, a portable alkane gas separator system (MAGS) is brought to an oil field that is flaring associated gas, as shown in step 304. Raw natural gas is received from the flare site, as shown in step 306. The raw associated natural gas stream is compressed utilizing a compressor, as shown in step 308. Water is removed from the raw natural gas stream utilizing a dehydrator, as shown in step 310. Next, a temperature of the raw natural gas stream is lowered utilizing a refrigerator cascade/autocascade loop, as shown in step 312. Next, as shown in step 314, the raw natural gas stream is separated into three product streams consisting essentially of a methane stream of at least 70% methane (and preferably at least 80-85% methane, and more preferably at least 90% methane), an ethane-rich stream comprising ethane (typically 20-60% ethane), and a natural gas liquids stream having a vapor pressure of no more than 17 bar/250 psia at 38° C./100° F. (and preferably no more than 16 bar/225 psia, and even more preferably no more than 14 bar/200 psia). In step 316, the natural gas liquids stream is of sufficiently low vapor pressure to be transportable in standard propane pressure vessels (Y-grade), where it is collected for transport. In step 318, the methane stream is of sufficient purity and sufficiently lean to be useable in existing natural gas engines without modification, where it is utilized for electricity generation. In step 320, the ethane-rich stream is utilized within the system itself to power system operations. As shown in optional step 322, in some embodiments, the lean methane stream may be utilized to make CNG (via compression), LNG (via liquefaction), or liquid fuels (methanol, dimethyl ether, butanol, etc.). As shown in optional step 324, the lean methane stream may be utilized with superheated steam to make $CO_2$ and $H_2$ via a steam reforming reaction, with the $CO_2$ useable for enhanced oil recovery ($CO_2$-EOR), and the $H_2$ useable to make electricity or for other purposes, such as chemical upgrading of the oil produced. As shown in optional step 326, the electricity may be transmitted to the grid for sale. The process 300 ends in step 328.

Figure 4:
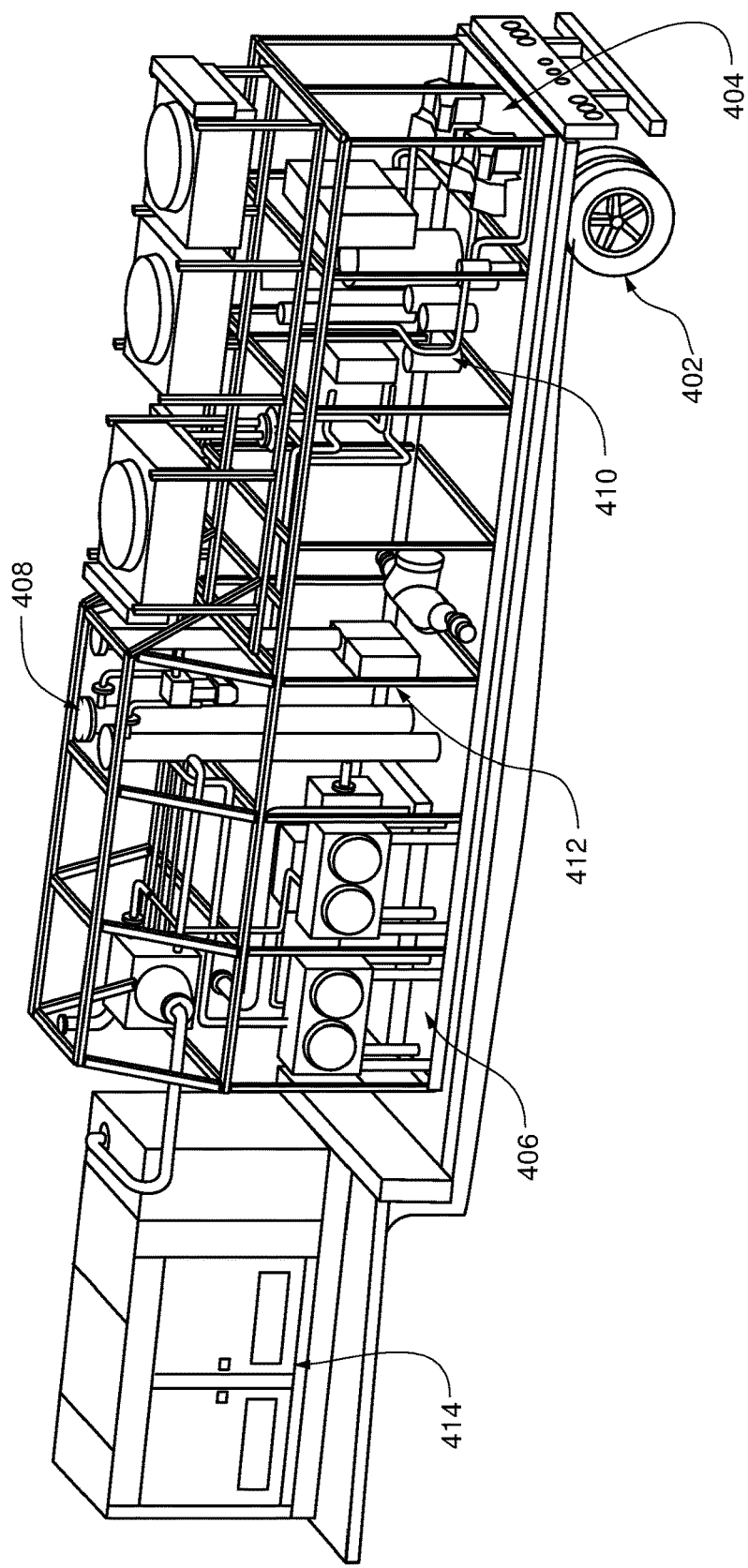
FIG. 4 shows a perspective view of one embodiment of the MAGS.

FIG. 4 shows a side perspective view 400 of one embodiment of the mobile alkane gas separator (MAGS) according to one embodiment of the present invention. As shown, the system is designed to fit inside the height and width envelope of a standard drop-deck semi-trailer, allowing enhanced mobility to various field sites. The system is mounted on a chassis or skid 404 with one or more wheels 402 for easy transportation to and from the oil field. Raw natural gas is compressed by compression module 406. The natural gas is then dehydrated to remove any water content by dehydration module 408. The dry, compressed gas is then refrigerated, causing the high molecular weight natural gas components to liquefy, by refrigeration module 410. A two-phase separator (such as a stripping column) 412 is then employed to separate the natural gas mixture into three streams. One stream, composed almost entirely of methane with a small amount of ethane, is sent off to external power generators (not shown) to provide electricity for either local use or sale to the grid. Another stream, composed primarily of ethane (ethane-rich stream), is sent to the MAGS internal power generator 414 to support its own operation. The third stream, composed of natural gas liquids (not shown), is stored as a liquid so that it can be transported to market for sale.

Figure 5:
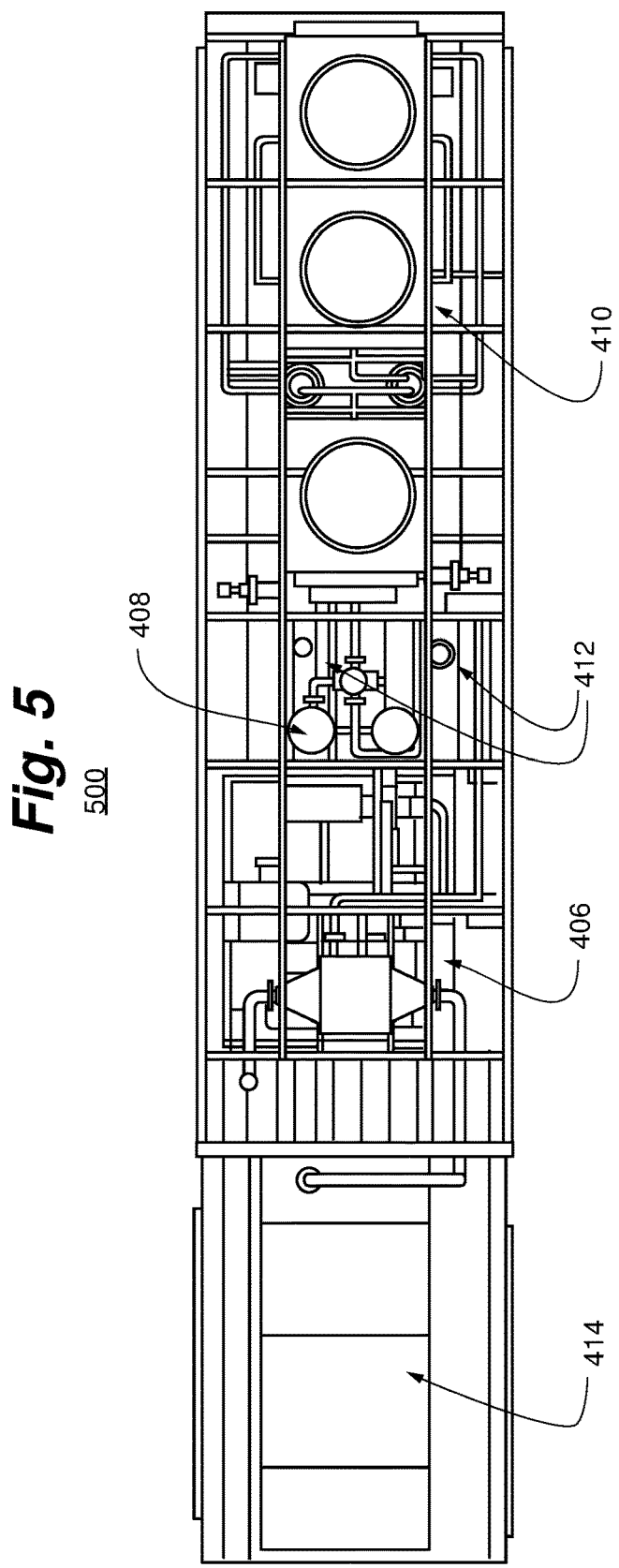
FIG. 5 shows a top view of one embodiment of the MAGS.

FIG. 5 shows a top view 500 of one embodiment of the mobile alkane gas separator (MAGS) according to one embodiment of the present invention, with similar modules labeled as in FIG. 4.

Figure 6:
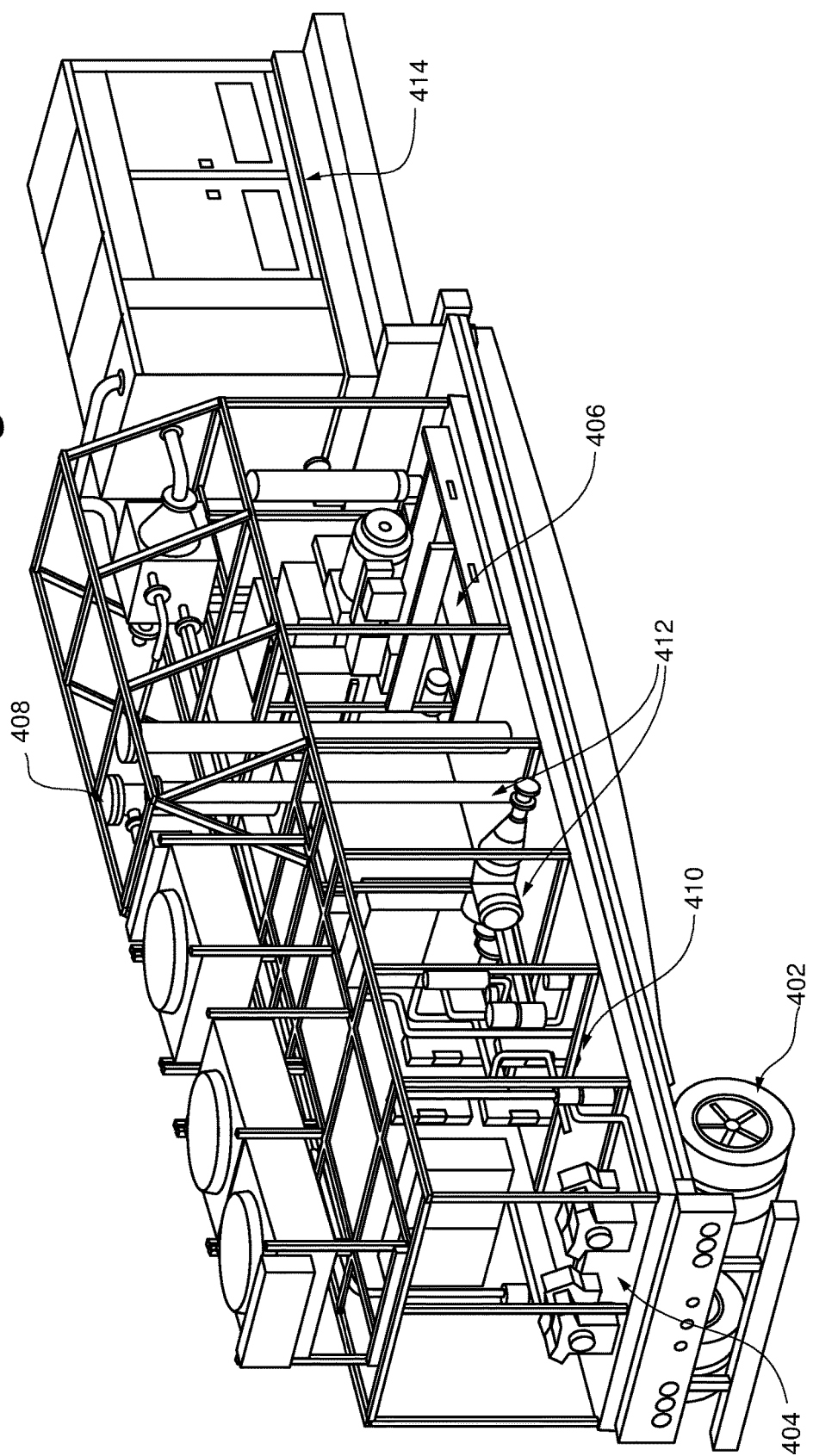
FIG. 6 shows another perspective view of one embodiment of the MAGS.

FIG. 6 shows another side perspective view 600 of one embodiment of the mobile alkane gas separator (MAGS) according to one embodiment of the present invention, with similar modules labeled as in FIG. 4.

In other embodiments of the present invention, the MAGS system is configured and operated so components of the feed natural gas may be separated into more than three product streams or fewer as needed.

In other embodiment, the MAGS system may be configured to be deliverable by sea, air, ship, boat, train, floating off-shore platform, helicopter, car, van, truck, and other methods of air, land, and sea transportation to the desired site.

Process Parameter Selection

The MAGS process takes an un-useable, stranded, raw natural gas stream, and produces three distinct, useable streams in a field environment. This process is unlike what happens at a natural gas plant/refinery, which requires a complete distillation column for each component, resulting in a much larger system and more costly operations. In a natural gas plant/refinery, each component is separated using a de-methanizing column, a de-ethanizing column, de-propanating column, and so forth. This creates a complex, expensive, and cumbersome system that is not portable and would not be useful in the field. In contrast, the MAGS process is able to achieve an efficient separation without using a complex system comprising multiple distillation columns for each component. The inventors were able to achieve this unexpected result by carefully selecting the process operations and process parameters as described in detail in this application.

In summary, the inventors have found that it is possible to achieve this type of efficient separation by running the refrigeration subsystem to achieve a process temperature preferably in the range of approximately −40° C. to approximately −80° C. (and even more preferably −50° C. to −60° C.), at a pressure preferably in the range of approximately 5.5 bar/80 psig to approximately 34 bar/500 psig (and even more preferably under about 17-21 bar/250-300 psig). The inventors also realized that this can be achieved utilizing a novel refrigeration unit. The inventors have discovered that the process parameters described here allow this type of separation to occur at the field scale, something that has not been achieved before in mobile systems. By utilizing these process parameters, the inventors were able to optimize the design of the entire system that utilizes this process, allowing the inventors to simplify the system to the point where it can be made portable. The inventors have found that when one compresses and cools to the temperature and pressure ranges described here, it is possible to achieve this significant separation result in a portable apparatus.

In one embodiment, the process works by reducing a temperature of the raw, dehydrated natural gas stream to an ideal temperature range. Unlike a conventional refrigeration cycle of existing mobile systems, the temperature is colder in order to remove (condense) most of the ethane and higher hydrocarbons. However, it is not so cold (for example, as in LNG processes in natural gas plants) in which the methane itself condenses into the liquid stream and would then have to be removed. The MAGS process temperature and pressure parameters were finely calibrated by the inventors in order to achieve this efficient separation process, making it feasible to make the process work on a portable scale. Because of the ideal cold temperature range which condenses most of the ethane, the C2+ components can be removed in a single column. Existing mobile systems and natural gas plants are either too warm to remove all of the C2+ components in a single separation column, or too cold, and liquefy some of the methane as well, which is undesirable and also requires an additional separation column.

In addition, because of the ideal temperature range, the load on both the compressor and separation column is reduced, reducing system complexity and operating costs. The MAGS process can operate at approximately 14 bar/200 psi (while existing systems typically operate at a higher operating pressure), reducing the compressor load, allowing for a smaller and more compact compressor. In addition, because of the ideal temperature range, instead of a complete distillation column, a much simpler stripping column may be utilized. A stripping column is the bottom half of a distillation column and includes a reboiler, while the top half above the inlet is referred to as a fractionating column and includes an overhead condenser. In a preferred embodiment of the present invention, the system does not utilize a distillation column, nor a fractionating column, but a simpler and less expensive stripping column including a reboiler. (A distillation column is twice as complex as a stripping column.)

The ideal temperature range allows the MAGS process to refrigerate most of the ethane and higher hydrocarbons (C2+) out of the gas stream. The MAGS process condenses much more of the ethane than is typical of existing refrigeration cycles or J-T skids utilizing the J-T effect. This allows the liquid stream to be captured and brought to Y-grade standard with just a single column separator (a stripping column); while the lean gas mixture is ready for power generation equipment without any additional processing, greatly simplifying system complexity and reducing cost.

Figure 7A:
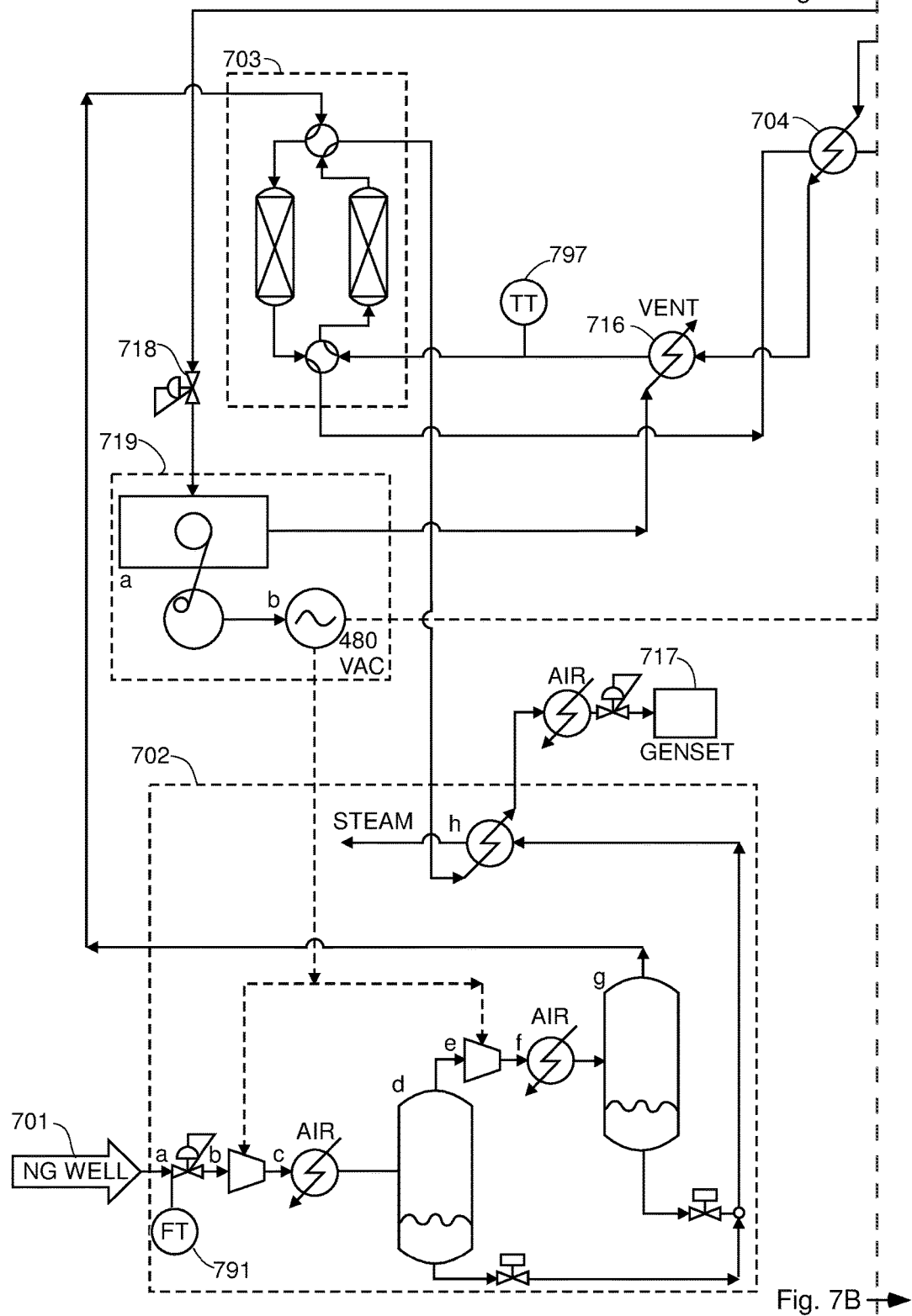
FIGS. 7A and 7B show a piping and instrumentation diagram (PID) of the MAGS according to one embodiment of the present invention.
Figure 7B:
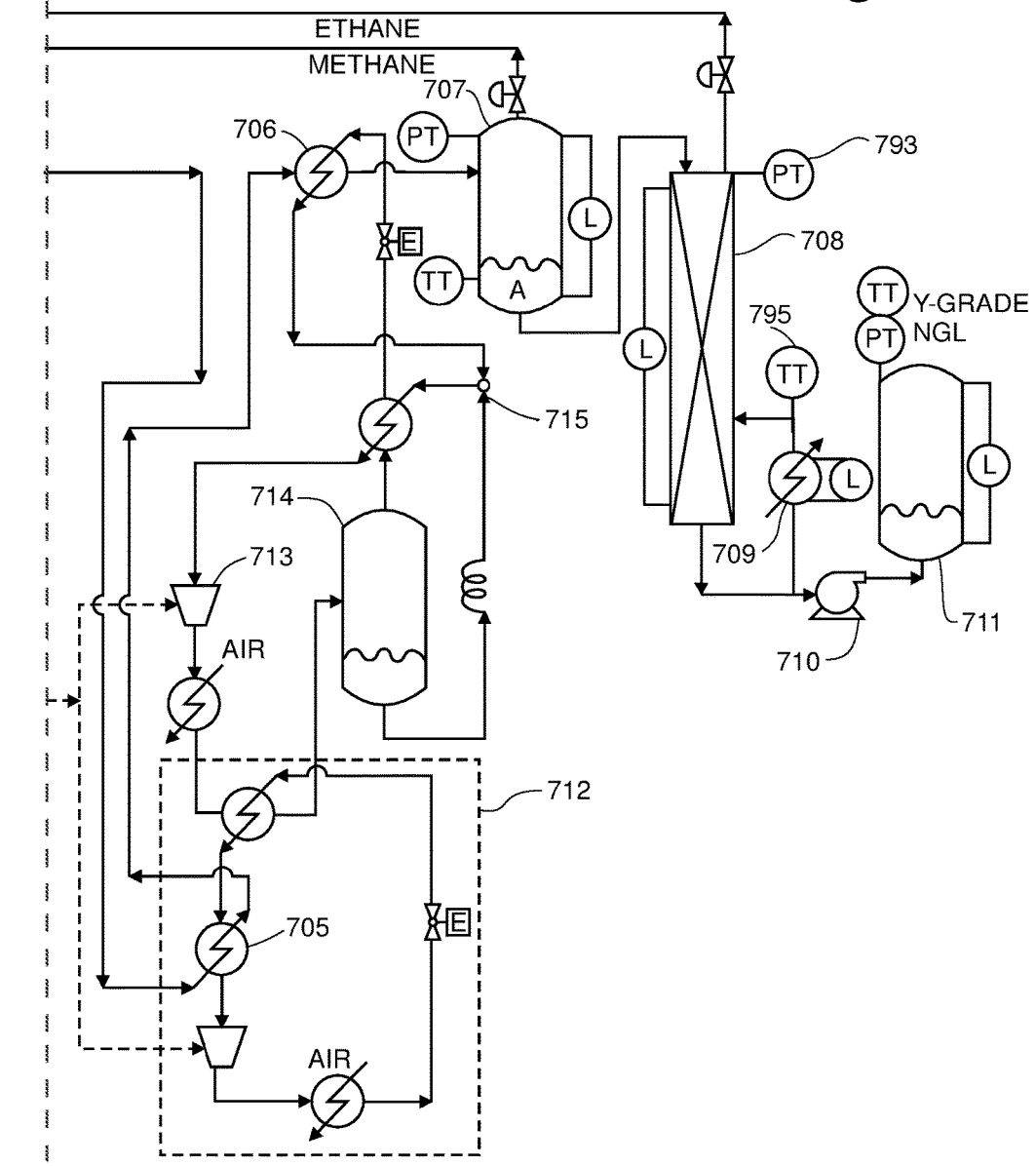

One unique feature of the present invention is an ideal temperature and pressure range of the process stream that leaves the refrigeration unit and enters the separation unit at point 708 in FIG. 7B. This allows the MAGS to perform separation that is efficient into the three streams discussed above. The inventors recognized that refrigeration is less expensive than compression in terms of capital equipment, but more expensive in terms of operating (power) costs; however, they realized that this is greatly beneficial to the MAGS system since the B-gas stream contains surplus power, and the entire system is being operated in an energy-rich flare gas environment. The inventors also recognized that by reducing the temperature of the raw gas stream to a lower temperature range than previously achieved in a mobile scale, a lower compression ratio (and hence operating pressure) is possible while still achieving desirable results. Such a lower operating pressure results in an overall lower capital cost for the entire system because lower-pressure components and subsystems can be utilized.

One of the inventors' many innovations was to realize that by selecting the ideal temperature range to split the incoming raw natural gas stream into two, one that is predominantly methane (A-stream), and the balance (mixture of B-stream and C-stream), which can be separated in only a single column (into B-stream and C-stream, respectively) at point 708 in FIG. 7B. This results in great savings on the capital costs, as it eliminates the cost and complexity of an entire distillation column (a single stripping column is sufficient instead of the typical two or more distillation columns); reduces compression requirements, as typical existing applications would require 3-5 stages of compression (whereas the MAGS process only requires 2 stages of compression, saving on compression equipment costs); reduces the operating pressure, as typical existing systems utilize up to 70 bar/1,000 psi (whereas the MAGS process only requires 5.5-21 bar/80-300 psi), resulting in a simpler and cheaper downstream system that does not need to operate at high pressures.

The ideal temperature and pressure ranges for the MAGS process were selected as follows by the inventors. A most preferred temperature range for the process is −50° C. to −60° C., but temperature ranges from −20° C. to −100° C. are feasible, and more preferably between −40° C. and −80° C., and possibly between −20° C. to −40° C. There would be little benefit to going below −100° C. and a significant cost to go below that temperature, as methane starts to liquefy below −100° C., and it is desirable to avoid liquefying any significant amount of methane. Accordingly, based on the above temperature ranges, a most preferred pressure range is 12-14 bar/175-200 psi, and preferably 10-21 bar/150-300 psi. However, pressure ranges of 5.5-34 bar/80-500 psi are possible in various embodiments of the MAGS process. Higher pressures are also possible in some embodiments. Existing mobile systems utilize significantly higher pressures because they have not been able to achieve such low process temperatures on a mobile scale.

In addition, many existing mobile systems rely on higher compression and expansion cooling via the J-T effect to cool the process gas, and do not perform active refrigeration as in the MAGS process. An example of such a system is a J-T skid. Unexpectedly, the inventors found active refrigeration to offer many advantages, as described here. On a high level, the MAGS processes utilizes compression, refrigeration, and separation. If one were to assume that each of the three sub-processes have been optimized and have equal cost and complexity, what this implies is that by optimizing one of the three sub-processes, it is possible to save on the capital and operating costs of the other sub-processes. The inventors had the insight that by improving the middle of the three processes—namely, refrigeration—it was possible to significantly save on the cost and complexity of the two processes before and after it—namely, compression and separation. After the raw, dehydrated natural gas mixture is compressed and refrigerated to the ideal pressure/temperature ranges described above, there is a simple liquid/vapor separation. The gas stream (A-stream) that leaves the liquid/vapor separator is ready to be used in industrial equipment without further processing. Meanwhile, the remaining liquid stream can be cleaned up in a single stripping column into a NGLs stream (C-stream), and a remaining waste stream (B-stream), which can be used by the system itself for power generation. That is, after compression and refrigeration, the stream components that remain after phase separation and that go to the stripping column are primed for separation in as few as a single stripping column (a stripping column is roughly half the cost and complexity of a distillation column).

In summary, the existing mobile systems are typically able to achieve two-stream separation. The existing mobile systems either produce lean methane and flare the NGLs, or generate NGLs and flare the methane and ethane. By carefully selecting the process parameters and utilizing a novel system design and a unique refrigeration system able to reach very cold temperatures in a mobile plant, the inventors have been able to achieve something on the portable scale that before was thought only possible at a natural gas plant/refinery scale.

In summary, the MAGS offers the following primary value propositions, which separate it from standard natural gas plant/refinery operations and existing mobile systems:
1. Mobility, which is essential for oil field operation.
2. MAGS system approximates refinery output in a compact form that utilizes local energy resources for operations.
3. The system is compact due to use of ideal operating temperatures and pressures, which maintain the footprint of a compact compressor and refrigeration system, while drastically reducing the size of the separation system.
4. Using a novel configuration and application, the inventors are able to use excess energy in the waste product from separation (the ethane-rich stream) to drive a very low temperature refrigeration system, which greatly simplifies separation of the raw natural gas into three useful streams.

5. The MAGS system approximates natural gas plant/refinery output in a pragmatic way: rather than focusing on separation dictated by molecular species, the inventors specify the lean sales gas based on the ability to generate power in unmodified natural gas gensets, and the NGL stream's vapor pressure is dictated by the vapor pressures allowed by existing transportation equipment.

6. The resulting low-quality, low-value ethane-dominant B-gas is consumed by the onboard generator to power the entire operation.

Overall Experimental Results

The inventors have built and tested several embodiments of the present invention. This section presents various experimental results from such tests.

Several random samples of Bakken region wellhead gas quality data is presented in Table 1 (Source: Wocken, C. A.; Stevens, B. G.; Almlie, J. C.; Schlasner, S. M., *End-Use Technology Study—An Assessment of Alternative Uses for Associated Gas*, National Energy Technology Laboratory, Pittsburgh, Pa., April 2013). This high NGLs content typically corresponds with high Wobbe index (higher energy content of 1300-2000 BTU/cf) when compared to residential pipeline gas (~1000 BTU/cf).

Based on the sample Bakken gas data from Table 1 as well as a sample assay provided by a major oil company in the Bakken region, a simulated Bakken gas consisting of 60% methane, 18% ethane, 14% propane, and 8% butane was generated in the lab for testing. Table 2 shows the latest experimental results, using a ~14 mcf/day subscale demonstration unit ("MAGS-0"), where Table 2A shows a predicted results based on computer simulations in HYSYS, and Table 2B shows the actual experimental results on the prototype unit. All flow rates are normalized to 100%. The actual flow rate was 240 L/min (~12.2 mcf/day) of simulated raw feed gas. As can be seen from Tables 2A and 2B, there is excellent agreement between the theoretical predictions and the experimental results of running the prototype unit. A lean methane gas stream of 88% methane was generated (A-gas), which can be utilized in unmodified natural gas engines. The natural gas liquids stream (C-liquid) was also produced having a low enough vapor pressure sufficient for transport in propane tanks. Note that 81% of the propane and 99% of the butane liquids were captured in the NGLs stream. Finally, the ethane-enriched gas stream (B-gas) was produced having a 44% ethane, 50% methane, and some residual propane and butane which can be utilized in the internal MAGS power generation subsystem as described below. Additional theoretical data and experimental results are presented at the end of this disclosure.

TABLE 1

Selected Flare Gas Data from Wellheads in the Bakken Formation

| Wellhead Sample: | Sample 1 | Sample 2 | Sample 3 |
|---|---|---|---|
| Methane, mol % | 70.23 | 48.07 | 73.93 |
| Ethane, mol % | 13.94 | 18.78 | 13.25 |
| Propane, mol % | 6.7 | 14.87 | 5.55 |
| Butane+ (C4+), mol % | 5.5 | 16.38 | 4.32 |
| $CO_2 + N_2$, mol % | 3.44 | 1.72 | 2.87 |
| $H_2S$ | 0.19 | 0.18 | 0.08 |
| Wobbe Index, BTU/scf | 1470 | 1712 | 1454 |
| Methane No. (MN) | 53.2 | 43.5 | 56.1 |

TABLE 2A

Theoretical Predicted Performance using HYSYS, MAGS-0
MAGS-0 Theoretical Predicted Performance, 130 psia, 55° C., ~14 mcf/day (12.2 mcf/day)

| Products | Feed Gas (%) | Gas Product A (%) | Gas Product B (%) | NGL Product C (%) | % of NGL Product Captured | |
|---|---|---|---|---|---|---|
| Methane | 60.0 | 87.5 | 42.9 | 0.9 | Propane | Butane |
| Ethane | 18.0 | 10.6 | 43.2 | 22.2 | 81.8 | 97.2 |
| Propane | 14.0 | 1.7 | 11.6 | 45.8 | Pressure: 180 psia | |
| Butane | 8.0 | 0.2 | 2.3 | 31.1 | Refrigerate Temp.: −55° C. | |
| Total flow rate | 100.00 | 62.30 | 12.70 | 25.00 | Ambient Temp.: 25° C. | |

TABLE 2B

Experimental Results, MAGS-0
MAGS-0 Experimental Results, 130 psia, 55° C., ~14 mcf/day (12.2 mcf/day)

| Products | Feed Gas (%) | Gas Product A (%) | Gas Product B (%) | NGL Product C (%) | % of NGL Product Captured | |
|---|---|---|---|---|---|---|
| Methane | 60.1 | 88.7 | 49.6 | 0.4 | Propane | Butane |
| Ethane | 18.0 | 9.9 | 43.7 | 16.7 | 80.7 | 99.5 |
| Propane | 13.6 | 1.4 | 6.0 | 47.3 | Pressure: 180 psia | |
| Butane | 8.3 | 0.0 | 0.7 | 35.6 | Refrigerate Temp.: −55° C. | |
| Total flow rate | 100.00 | 57.70 | 19.10 | 23.20 | Ambient Temp.: 25° C. | |

Detailed System Schematics

A detailed process flow diagram for the separation of the three products is now described according to one embodiment of the MAGS shown in FIGS. 7A and 7B. The process flow diagram depicts the flow of raw, wet natural gas through the various components of the MAGS process. Gas is obtained from the wellhead after oil, water, and sand have been removed by a heater-treater separation unit (not shown).

The MAGS is designed to receive wellhead natural gas 701 from a remote field location. The MAGS system processes the raw natural gas into three component streams: lean methane-rich dry sales gas (A-gas) intended for client-side power generation 717, high-energy content ethane-rich dry gas (B-gas) to generate power required by the MAGS system 719, and a market-ready Y-grade natural gas liquids (NGLs) product 711 (C-liquid).

The raw natural gas processing begins with compression at 702. The wellhead natural gas 701 received from heater-treater units (not shown) enters the system at moderate pressure and is regulated down to a consistent pressure (~20 psig) at 702a. The first stage of compression 702b achieves a moderate pressure rise (intermediate to the final operating pressure) and is accompanied by an air-cooled inter-cooler 702c and liquid knockout at condenser/dehydrator 702d. The second stage of compression 702e achieves the final operating pressure required (approximately 14 bar/200 psi, in some embodiments) by downstream processing. An after-cooler 702f (to approximately ambient temperatures, or slightly above) and liquid knockout at condenser/dehydrator 702g ensure no liquid condensate enters the downstream process. In this embodiment, two stages of compression are used to bring the raw natural gas to a sufficiently high pressure (approximately 14 bar/200 psi, in some embodiments) to enable separation of the constituent components. Each individual stage of compression is accompanied by an air-cooled heat exchanger to reduce the temperature of the stream (to approximately ambient temperatures, or slightly above) and to condense any humidity present (first stage of dehydration). After cooling, a liquid condensate separator removes the liquid water from the natural gas. In short, compression occurs in two stages, where the gas stream is cooled to approximately ambient temperatures after each compression stage, during which water and heavier hydrocarbons (C6+) will drop out (as liquids), before the final dehydration step (desiccant beds). Most of the water is condensed as a result of the inter-cooler 702c and after-cooler 702f in the first two condensers/dehydrators 702d and 702g, so that most of the water will be removed before the final dehydration step (desiccant beds). Also, most of the hexane, heptane, octane, and higher (C6+) are knocked out during this stage.

The compressed natural gas enters a regenerative pressure-swing adsorption desiccant system 703 for the final dehydration that removes any water remaining after the first two stages of dehydration in the condensers 702d and 702g. The resulting natural gas has an aqueous dew point below −73° C. (lower than the coldest temperature in this embodiment) which reduces the potential for hydrate formation in the remaining portion of the system. The maximum dew point can be adjusted based on the system's operating temperature at its coldest point (after the autocascade). One can see from FIG. 7A that there are two desiccant beds 703 in parallel, allowing one to be regenerated by dry, hot gas from other parts of the process while the other bed is valved into the main process line and is actively drying the raw natural gas.

Once the gas is sufficiently dehumidified (in terms of its dew point being lower than the lowest point achieved in the refrigeration system) and at high pressure (approximately 14 bar/200 psi, in some embodiments), the natural gas is now ready to begin the chilling process to condense out natural gas liquids at the elevated operating pressure. The optimally cold temperature is achieved by a hybrid cascade-autocascade refrigeration subsystem, described previously in greater detail in relation to FIG. 2. The elements shown in FIG. 2 are also illustrated in FIG. 7 but with a different orientation (for example, the phase separator 205 from FIG. 2 corresponds with the phase separator 714 in FIG. 7). First, heat exchanger 704 counter-flows the cold, separated A-gas stream with the raw natural gas stream, as described below. Secondly, the raw natural gas stream is cooled again by heat exchanger 705 located on the high-stage cascade refrigeration loop 712. Thirdly, the raw natural gas stream is brought to the design temperature required for liquefaction of natural gas liquids at the system operating pressure by heat exchanger 706 which is cooled by the low-stage autocascade refrigeration loop.

The first refrigeration stage, the high-stage refrigeration loop 712, incurs load from the low-stage autocascade refrigeration loop as well as the dehumidified raw natural gas at the heat exchanger 705 (corresponding to the flare gas heat exchanger 209 in FIG. 2). This is the first active cooling step for the process gas, after initial pre-cooling in heat exchanger 704. The natural gas is chilled to its lowest process temperature at the second refrigeration stage, the low-stage autocascade loop, at heat exchanger 706 (corresponding to heat exchanger 204 in FIG. 2).

As described previously, the low-stage autocascade refrigeration loop achieves its optimally low temperature by employing a mixture of refrigerants. The refrigerants are compressed by compressor 713 and partially evaporated by the low-stage refrigeration cycle 712. The two-phase mixture enters a phase separator 714 where the vapor exiting is cooled by condensation of the low-vapor pressure refrigerant components as well as heat exchanged with the recombined refrigerant stream 715. This scheme results in the ability to achieve an optimally low temperature at the heat exchanger 706 (corresponding to second flare gas heat exchanger 204 of FIG. 2), permitting a process gas temperature as low as −60° C., or even −100° C. in some embodiments.

An elevated pressure and reduced temperature causes a portion of the higher-hydrocarbon components of the natural gas stream to condense out. The vapor-liquid separator 707 separates the two-phase natural gas stream into a lean methane-dominant sales gas stream (A-stream) and a natural gas liquids stream comprising of C2+ hydrocarbons (what later is separated into the B-stream and C-stream). This vessel prevents entrainment of liquid droplets with the sales gas (A-stream) leaving the top, thus maximizing capture of the higher-vapor pressure components in the NGLs. This vessel also doubles as a feed drum for the stripping column 708, which serves to de-ethanize the stream.

The stripping column 708 is required to lower the vapor pressure of the natural gas liquids product, in order for the C-liquid stream to meet Y-grade standards. The stripping column 708 is a vessel that separates compounds based on their difference in vapor pressures. The column 708 is packed with mass transfer material that facilitates the exchange of components between the liquid and vapor phases. There is a temperature and compositional gradient along the vertical axis of the column. The top of the column is dominated by a low-temperature, low-boiling vapor, while the bottom of the column is at a higher temperature and consists predominantly of high-boiling liquids. The stripping column permits light components to leave the top through a pressure-control valve, while the liquids exit the bottom of the column to a reboiler 709, such as, but not limited to, a kettle reboiler.

The reboiler 709 provides the heating duty necessary to drive the lighter components from the top of the column as a vapor stream. Heat is added to vaporize lower-boiling components which disengage from the liquid product stream (bottom) and reenter the column. Buoyancy forces and packing material facilitate countercurrent heat and mass transfer inside the column between the liquid and vapor phases. This achieves the design goal of obtaining a final natural gas liquids product that meets the Y-grade specification of having a moderate vapor pressure at ambient temperatures. The reboiler 709 also serves as one of the primary degrees of freedom in the control scheme, allowing the system to handle inlet feed gases of varying composition.

The liquid level control pump 710 ensures a liquid level is maintained inside the reboiler 709. The pump 710 also provides a pressure head to pump the NGLs product (C-stream) into liquids storage tank 711. The NGLs (C-liquid stream) can be transferred from storage to truck trailers for transport to market.

The higher energy content natural gas (ethane-rich B-gas stream) that leaves the top of the stripping column 708 is at moderate temperature so no further heat exchange is required. It is simply transported to the fuel pressure regulator 718 and dropped to a low pressure for use in the onboard genset 719. The ethane-rich B-gas is combusted in an internal engine 719a and the mechanical shaft power is transmitted to a 480 VAC internal generator 719b operating at 60 Hz. This power is then available to drive the compressors and electrical components onboard the MAGS system, as shown in dashed lines.

The dry sales gas (lean methane A-gas stream) that leaves the top of the vapor-liquid separator 707 is very cold and at the system pressure, so it is preferable to recapture some of this energy before the gas leaves the system. The A-gas methane stream drops some pressure through the level control valve at the top of phase separator 707 before chilling the dehumidified process gas leaving 703 at heat exchanger 704. The A-gas methane stream is then heated to a significantly elevated temperature by absorbing the energy from the onboard genset exhaust stream at heat exchanger 716. This hot A-gas is then used to regenerate the offline desiccant bed at 703 by removing moisture from the adsorbent material. This A-gas (the sales gas) is then cooled again by exchanging heat with liquid water from the condensers 702d and 702g at heat exchanger 702h. Finally, the A-gas (the sales gas) is cooled again with an air-cooled heat exchanger and its pressure is dropped to an operating pressure suitable for use in the client's existing onsite generators 717.

The lean methane product (A-gas stream) produced by the MAGS process is generator-quality methane of a sufficiently low BTU content to be useable in standard, readily available, unmodified industrial gensets, optimally with a methane number of at least 65. The methane-rich fuel (A-gas) can be burned in an industrial genset 717 to replace the cost of on-site power generation required to run other systems at the wellhead, or for other purposes, such as vehicle CNG, as described later in the present application. The lean methane stream (A-gas) comes out at a positive pressure of up to about 3-7 bar/50-100 psi. This moderate pressure methane stream (A-gas) can be either reduced down to ambient for use in industrial generators, or compressed up to high pressures (140-200 bad/~2,000-3,000 psi) for CNG use.

In some alternative embodiments of the present invention not shown in the drawings, multiple phase separators A, B, C, etc. (not shown in FIG. 7B) may be utilized in addition to the single phase separator A (707) shown in FIG. 7B. For example, the liquid stream leaving a first phase separator A flows through a restriction which drops both the temperature and the pressure as the liquid undergoes adiabatic expansion and Joule-Thompson cooling. The output enters a second phase separator B, where another pair of liquid and vapor phases are separated. As before, the liquid phase is enriched in the heavier, higher-boiling natural gas components, while the vapor is composed primarily of lighter, lower-boiling natural gas components. The exact number and specific conditions of these phase separators is a variable of this process. An additional restriction and a subsequent phase separator C are also possible. The final phase separator C would also serve as a liquid feed accumulator for steady operation of the stripping column 708. If multiple phase separators are utilized, then their output is combined with the output of the stripping column 708 to create a single internal ethane-rich stream (the B-gas).

In alternative embodiments of the present invention not shown in the drawings, the final natural gas liquids product may be delivered to one of two parallel liquid receiver tanks (not shown in FIG. 7B). One is being filled with the low pressure, low temperature product, while the other is being heated to raise its pressure. This allows the offline tank 711 to develop sufficient pressure to be delivered to bulk storage without utilization of the pump 710, saving some energy by eliminating the pumping mechanism at the added cost of having two liquid receiver tanks.

Illustrative Locations of Sensors for Control System

FIGS. 7A and 7B also show illustrative locations of sensors utilized to measure raw sensory data for use by the MAGS Control System. Although every sensor placement is not depicted in FIGS. 7A and 7B, note that there will be temperature and pressure sensors in the MAGS system before and after each piece of equipment, such as, for example, the air-blown condenser/heat exchangers, compressors, expansion valves, phase separator, static mixer, flare gas heat exchanger, interstage condenser, etc.

A flow transducer (FT) 791 measure the input gas flow rate. The FT 791 is illustrated at the inlet to the MAGS, upstream of the input control valve 702a. However, the FT 791 may be located almost anywhere in the system, preferably upstream of the separation subsystem, as would be recognized by one of ordinary skill in the art. For example, FT 791 may also be located on the outlet to the second compressor 702f or the outlet of the liquids drop out tank 702g.

A pressure transducer (PT) 793 measures the system pressure. The PT 793 is illustrated at the top of the stripping column 708. However, the PT 793 may be placed almost anywhere in the system to measure the system pressure, as would be recognized by one of ordinary skill in the art. For example, the PT 793 and the system pressure can also be measured in the cyclone separator.

A temperature transducer (TT) 795 measures the temperature in the reboiler 709. It is used to control the reboiler temperature setpoint. The TT 795 is illustrated at the top of the reboiler 709, but it can be located anywhere in the reboiler as recognized by one of ordinary skill in the art. The control loop for the TT 795 and the reboiler temperature setpoint can be operated in one of three control modes: a) manual, 2) automatic, and 3) cascade. In the cascade mode, two temperature sensors are located in different parts of the reboiler in order to make the control loop more stable and responsive to process changes, or varying input gas compositions/flow rates. That is, an additional temperature sensor is placed in a different location in the reboiler heating element to result in tighter control of the reboiler. With the second temperature sensor, the reboiler control loop can be more responsive, as the second temperature sensor provide an additional predictive data stream to the data from the first temperature sensor.

Finally, an optional temperature transducer (TT) 797 can be used to measure the temperature of the regeneration gas. A control loop can use the TT 797 data to control the temperature of the regeneration gas used to regenerate the dehydration subsystem 703, the regeneration gas being heated using exhaust gas from the power generator 719.

Refrigeration Subsystem Embodiments

In order to achieve the ideal temperature range to achieve the three-stream separation described in this application, a highly novel and original refrigeration system was designed, built, and tested. The refrigeration system allows for efficient, field-portable separation of raw natural gas into the three streams discussed above. In particular, it enables the efficient removal of ethane from both the methane-rich stream (A-stream), where it would interfere with engine performance, as well as from the liquids-rich stream (C-stream), where it would increase the vapor pressure of the NGLs to an unacceptably high pressure.

Since temperatures lower than −40° C. are preferred in this invention, in some embodiments cascade and/or auto-cascade refrigeration systems may be used. In a preferred embodiment of the present invention, a hybrid cascade/autocascade refrigeration system is utilized, as shown and described previously in relation to FIG. 2. In this section, first, embodiments of the simpler cascade refrigeration subsystem design are discussed. Second, embodiments of the autocascade refrigeration subsystem are discussed. Finally, additional features and advantages of the hybrid cascade/autocascade refrigeration subsystem according to the preferred embodiments of the present invention are discussed, along with alternative embodiments.

Cascade Refrigeration Subsystem Embodiments

In a typical refrigeration system, the maximum difference between the warm and cold temperature of a refrigeration cycle is limited by properties of the refrigerant and/or losses associated with the transport of the refrigerant. To achieve larger temperature differences, one has to arrange several refrigeration cycles "above" each other, each cycle spanning a certain temperature difference. According to some embodiments of the present invention, a cascade refrigeration system is made up of separate but connected refrigeration stages, each of which have a primary refrigerant, wherein the refrigerants work in concert to reach the desired temperature. The principal of the cascade refrigeration system is to condense refrigerants that are capable of achieving ultra-low temperatures that would otherwise not be able to condense at room temperature using a lower temperature stage. Two refrigeration stages are needed because a single stage cannot economically achieve the high compression ratios necessary to obtain the proper evaporating and condensing temperatures of the low-stage refrigerant.

According to one embodiment, the cascade refrigeration system comprises two separate stages, each using refrigerants appropriate for its temperature range. The two stages are thermally connected by a cascade condenser, which is the condenser of the low-temperature stage and the evaporator of the high-temperature stage. Refrigerants that may be selected for the high-temperature stage include R-22, ammonia, R-507, R-404a, and so forth. For the low-temperature stage, a high-pressure refrigerant with a high vapor density (even at low temperatures) should be selected, such as ethylene.

According to one embodiment, the condenser of the first stage, called the "high" stage since it operates at a higher temperature than the second stage, is fan cooled by ambient air. In other embodiments, a liquid coolant, such as water, may be used. The evaporator of the first stage is used to cool the condenser of the second stage, called the "low" stage, since it operates at a lower temperature than the first stage. The unit that makes up the evaporator of the first stage and the condenser of the second stage is referred to as the "inter-stage" or "cascade" condenser. The cascade refrigeration embodiment uses two different refrigerants, one in each stage. The two-stage cascade embodiment uses these two refrigeration stages connected in series to be able to achieve the low temperatures required of the present invention.

Auto-cascade Refrigeration Subsystem Embodiments

According to another embodiment of the present invention, an auto-cascade refrigeration subsystem may be utilized, in which a single compressor is used, able to achieve the desired low temperatures. According to some embodiments, the autocascade refrigeration subsystem is a refrigeration system in which multiple stages of cascade cooling effect occur simultaneously by means of vapor-liquid separation and adiabatic expansion of several refrigerants (instead of just one as in each cascade stage). The unique thermodynamics of the system, a series of counterflow heat exchangers, and an appropriate mixture of refrigerants, make it possible for the refrigeration subsystem to reach the desired low temperature. The autocascade refrigeration subsystem uses a single compressor and two or more different refrigerants to reach the desired temperature, wherein the first refrigerant cools the next, and so on. As described in greater detail elsewhere in this application, the components of the autocascade refrigeration subsystem include a vapor compressor, an external air- or water-cooled condenser, a mixture of refrigerants with descending boiling points, and a series of insulated heat exchangers.

In one embodiment, the autocascade refrigeration subsystem uses mixed refrigerants along with internal heat transfer and phase separation to achieve the ideal cold temperature required by the present invention through a single compressor. One illustrative embodiment of the autocascade refrigeration subsystem uses only a single phase-separator and one additional heat-exchanger (compared to the cascade refrigeration subsystem) to mimic the behavior of the two-stage cascade refrigeration subsystem.

In one embodiment, the refrigerant in the autocascade stage is compressed as a gas and then sent through a condenser where heat is removed to liquefy the refrigerant. Because the autocascade refrigerator uses mixed refrigerants of differing vapor pressures, the condensation of the gas is only partial. The refrigerant with the higher vapor pressure remains predominately gaseous, whereas the refrigerant with a lower vapor pressure is liquefied. This two phase flow is then sent to a vessel where the gas and liquid phases are separated. The liquid stream is dropped in pressure to provide a cooling effect which is used—in a heat-exchanger—to further chill and condense the gas stream. The gas stream (now liquefied) is then dropped in pressure to provide the final useful cooling duty desired. In this way, an autocascade stage essentially replaces two stages of the cascade refrigeration subsystem.

The above description is of the simplest thermodynamic cycle of the autocascade refrigeration stage possible according to some embodiments of the present invention. Significantly more complex thermodynamic cycles are possible for use with the present invention. In some embodiments of the present invention, additional "staged" phase-separation steps with their corresponding internal heat transfer cooling afterwards can be used to reach even colder temperatures.

As a result of its multiple refrigerants and unique design, the autocascade refrigeration subsystem can attain colder temperatures in a single stage than possible in the cascade refrigeration subsystem, so much so that a single stage autocascade refrigerator can replace a two-stage (or more) cascade refrigerator. While such an autocascade refrigeration subsystem would not be as energy efficient as a two-stage cascade refrigeration subsystem, it would be simpler and cheaper to build and operate. Because the MAGS typically operates in an energy-rich environment, the trade of reduced capital and operating costs at the expense of increased energy costs offered by the autocascade refrigeration subsystem is highly attractive and may be considered a preferred embodiment.

According to other embodiments, the temperatures reached by the autocascade refrigeration subsystem may be altered by altering a composition of the mix of refrigerants. Depending on the composition of gas at the wellhead, the MAGS system may thus be tuned to reach appropriate temperatures for effective operation with the gas composition at hand by modifying the mix of refrigerants used in the autocascade stage.

Cascade/Autocascade Refrigeration Subsystem Embodiments

In a preferred embodiment, the MAGS refrigeration system is an innovative hybrid cascade/autocascade refrigerator, as discussed previously in relation to FIG. 2. This allows for a more thermodynamic efficient design while keeping the system compact and portable. While the thermodynamic efficiency is not necessarily optimal, because the MAGS operates in an energy-rich environment, it is sensible to trade some thermodynamic efficiency for a more mechanically compact design.

As described previously in relation to FIG. 2, in the hybrid cascade/autocascade refrigeration subsystem, two stages of refrigeration are employed, with the first cascade stage cooling the gas to just above 0° C., and the second autocascade stage being used to chill it to much colder temperatures, typically ranging from −40° C. to −60° C., depending upon the particulars of the design. In the preferred configuration, the first (high-temperature) stage utilizes two evaporators, while the second (low-temperature) stage is of an autocascade design. Both stages utilize air-cooled heat-exchangers to eliminate the need for liquid coolant which may not be available at all operating sites. However, if water is available, the refrigeration cycle can be modified to utilize water instead of air in the after-coolers for enhanced refrigeration performance.

In one alternative embodiment not shown in the drawings, the first stage is similar to the high temperature stage of the cascade refrigeration subsystem (but with two evaporators), and the second, low-temperature stage, is also a cascade design.

In some embodiments, for improved thermodynamic efficiency, both refrigeration loops may be used, in series, to chill and condense natural gas liquids from the natural gas stream. This requires two evaporators on the high-temperature refrigeration stage (the cascade evaporator/condenser heat-exchanger and a second heat-exchanger whose duty chills the natural gas stream as well as provides some superheat to the vapor returning to the refrigeration compressor suction inlet). Various alternative designs can range from a simple, single stage refrigeration cycle to three or more stages of cooling. Further, any stage of a single or multi-stage configuration could be of a cascade design, or alternatively, an autocascade refrigeration stage, or alternatively of the hybrid design according to the present invention.

One of ordinary skill in the art would recognize other alternative embodiments of the refrigeration system useable in the present invention, including but not limited to, various cascade refrigeration designs, various autocascade refrigeration designs, and various hybrid cascade/autocascade refrigeration designs, following the teachings of the present disclosure.

Dehydration Subsystem Embodiments

Dehydration is necessary to remove entrained water moisture and any trace humidity content from the raw natural gas stream before refrigeration to avoid ice formation, which would damage or destroy equipment. Since the very cold temperatures reached by the refrigeration system, as low as −100° C. in some embodiments, it is essential to remove any trace humidity content in the raw natural gas stream. Therefore, a very efficient dehydration system is needed to take the raw natural gas to a humidity equivalent of a dew point as low as −100° C. in some embodiments. (The dehydration system should be tuned to produce processed gas that has a dew point that is lower than the coldest temperature produced by the refrigeration system.) The dehydration subsystem, described below, utilizes two desiccant beds in alternation to be able to remove any trace humidity content that is required by the ideal cold temperature reached by the present invention in the downstream refrigeration subsystem.

Figure 13:
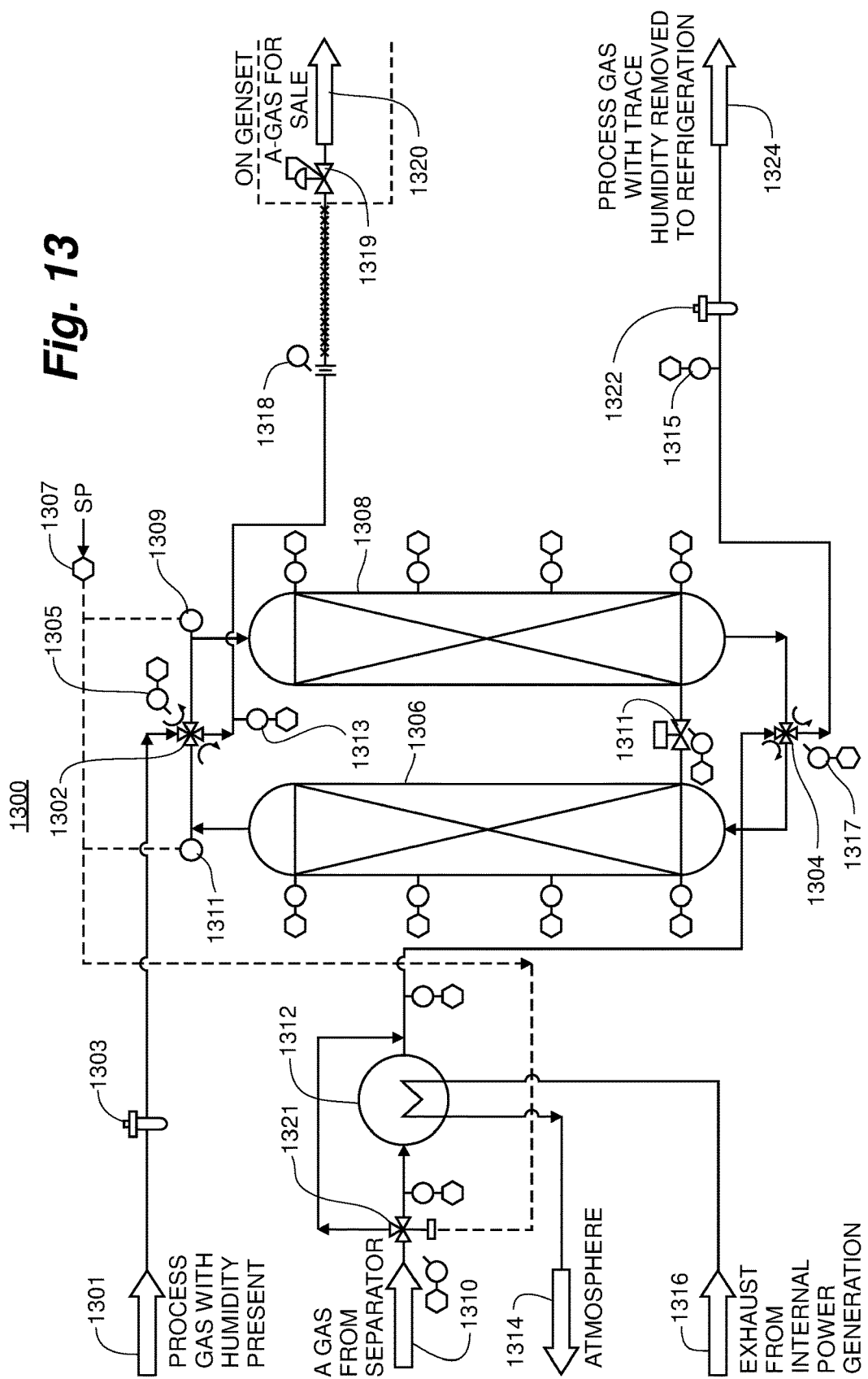
FIG. 13 shows a schematic diagram of one embodiment of a dehydration subsystem useable in one embodiment of the MAGS according to another embodiment of the present invention.

In a preferred embodiment, dehydration occurs first in the after-cooler condensers, where most of the water is removed after compression and air-cooling. Final dehydration occurs in desiccant dryer beds to remove any trace humidity remaining as shown in FIG. 13. Examples of desiccants used in the desiccant beds according to various embodiments include, but are not limited to: silica, alumina, silica alumina, calcium oxide, molecular sieves (such as zeolites), activated charcoal/carbon, and other like materials. Other examples of desiccants which are useable with the present invention include montmorillonite clay, calcium chloride, and calcium sulfate.

In some alternative embodiments, rather than the desiccant bed system described above, the water is removed through the use of additives such as methanol or ethylene glycol, which are sprayed into the natural gas stream to suppress the freezing point of liquid water. However, when these NGLs end up at refinery, the refinery has to remove these additives and the water. By not introducing such additives into the NGLs stream, a preferred embodiment of the process described above produces a more valuable NGLs stream by removing water by dehydration without the use of such additives.

Dehydration is typically carried out in the prior art using a four (4) step process that is less effective operationally, requires larger beds, and necessitates a longer hold time. The beds of the present invention in its preferred embodiment are smaller and more efficient because the inventors have developed a novel 2½ step dehydration process. The prior art four-step process includes: (1) active dehydration, (2) de-pressurization, (3) regeneration, and (4) re-pressurization. If four steps are used, then four beds are needed. But the inventors have developed a novel dehydration process using only two beds by optimizing the cycle into only 2½ steps. The 2½ steps of the dehydration process include: (1) active dehydration, (2) regeneration, and (2.5) a ½-step re-pressurization cycle, which is quick, but enough to operate with only two beds. It is important to mention that the ½-step re-pressurization only works due to the moderate pressures of the system, which is only feasible with the very cold refrigeration temperature. A small two-way valve is used between the two beds at the bottom to equalize the pressure (valve 1311 in FIG. 13). Finally, four-way valves simplify switching between the two beds in the 2½ step process (valves 1302 and 1304 in FIG. 13).

Adsorbent molecular sieves can achieve moisture content as low as 0.1 ppm, thereby mitigating the risk of damaging cryogenic components such as pipes, heat exchangers, and expansion devices by freezing water inside them. The molecular sieve material is typically distributed inside round vessels in a packed bed configuration. Like other desiccants, molecular sieves have limited adsorption capacity and must be replaced or regenerated at given service intervals. For continuous dehydration service, a multi-bed system must be utilized where one bed is in service while the other is being replaced or regenerated, and the beds can be seamlessly switched in and out of service, as described here.

In general, alternating two-bed systems are used where bed "A" is in service and the process stream is dehydrated. At the same time, a dry regeneration gas is flowed through bed "B" in a counter-current direction to remove moisture from the surface of the adsorbent material. Once the regeneration is complete, a set of valves are actuated such that the process gas is directed into bed "B" and the regeneration gas is flowed through bed "A" counter-current to the process flow. This cycle can be repeated indefinitely until the adsorbent exceeds its useful life, usually years.

Typically, the adsorbent beds are sized so that cycle times are on the order of hours. The packed bed diameter is tuned to provide an acceptable superficial velocity, and the height is adjusted to achieve the required holding capacity. The diameter is limited by pressure containment, and the bed height is limited by overall pressure drop and/or crush strength of the adsorbent material. Optimal sizing can be iteratively obtained by balancing the time required for regeneration with the time available to adsorb water before the holding capacity is reached.

In some embodiments, the dehydration subsystem employs a temperature-swing process, where the regeneration gas is externally heated. The regeneration gas must carry enough energy to bring the adsorbent material to an elevated temperature, as well as to provide the heat of desorption of the water mass. Additional heat is required to overcome the thermal losses through the piping, vessel wall, and effluent gas. After the removal of the water at the regeneration temperature, the external heater is taken off line and the regeneration gas cools the bed back to the process temperature.

A standard valving arrangement requires four on-off valves per bed, to allow the process stream and regeneration gas to flow through one bed at a time in a counter-current fashion. During the switchover, all eight valves are actuated simultaneously to swap beds. If a pressure difference exists between the process stream and the regeneration gas, a pressure equalization valve between the two beds is required. Pressure equalization must be done gradually to avoid adsorbent attrition, adding to cycle time. If the process gas is not compatible with the regeneration gas, vent valves and inert purge valves may be required to expel the unwanted gas and condition the beds prior to pressure equalization and/or switchover.

In a preferred embodiment of the present invention, two 4A molecular sieve adsorbent beds are used. The process stream is a heavy hydrocarbon gas mixture containing up to 2% water by volume, at a maximum volumetric flow rate of 230 mcf/day for the MAGS-200. The design inlet conditions are 46° C. and 180 psig; however the unit can operate satisfactorily at off-design conditions. The vessel is sized to provide a maximum superficial velocity of 35 ft/min at flow rates up to 230 mcf/day. The packed height is 2.74 m, resulting in a pressure drop of 3.3 psi and a cycle time of 6 hours at the maximum flow rate. Longer cycles are possible at lower flow rates.

In a preferred embodiment, the regeneration gas is the hot A-gas stream, which is a light hydrocarbon mix at 100 psig and 38° C. The regeneration gas exchanges heat with the system power generator engine exhaust, and is heated to 400° C. before entering the saturated adsorbent bed. The regeneration gas gives up thermal energy to the adsorbent at a rate of 12 kW, leaving the bed at 270° C. After 4.5 hours, the regeneration gas is directed away from the engine exhaust heat exchanger, and the bed is cooled from 260° C. to 38° C. by the regeneration gas in 1 hour. There is 0.5 hour of standby time to execute the switchover between beds, for a total cycle time of 6 hours.

The process gas flows downward through the bed and the regeneration gas flows upward, lifting the adsorbed water from the bed. The system utilizes a simplified valve arrangement based on two 4-way cross-port valves (valves 1302 and 1304 of FIG. 13). The process gas flows through one circuit of the valve while the regeneration gas flows through the other circuit in a counter-current direction. With this configuration, the function of eight simple on-off valves can be replicated by two 4-way valves placed at the entrance and exit of each bed. At the time of switchover, both valves turn simultaneously. Because both the process gas and the regeneration gas are hydrocarbons, no vent and purge step is necessary.

FIG. 13 shows a schematic diagram 1300 of one preferred embodiment of the dehydration subsystem utilizing two desiccant beds, according to one embodiment of the present invention. Process gas with humidity present 1301 from the upstream part of the process (after compression but before the refrigeration) is dehydrated to produce dehydrated process gas 1324, with any trace humidity removed, which is then sent to the refrigeration subsystem downstream. Meanwhile, A-gas 1310 from the separator enters via valve 1321 and is utilized to regenerate the desiccant beds before being sent to a customer's genset as A-gas for sale 1320 via valve 1319. As shown in FIG. 13, two desiccant beds 1306 and 1308 are used, along with two 4-way valves 1302 and 1304 to allow simplified switching between the bed in service 1308 and the bed being regenerated 1306 in this example. The four-way valves 1302 and 1304 direct the process gas 1301 into the bed that is in service 1308 while simultaneously directing the A-gas 1310 to the bed being regenerated 1306. A two-way valve 1311 is used between the two beds at the bottom to equalize the pressure. Also as shown in FIG. 13, exhaust gas 1316 from the MAGS power generator (not shown) exchanges heat with the A-gas 1310 in heat exchanger 1312 before being vented to the atmosphere 1314, in order to increase the temperature of the A-gas 1310 before it is utilized in the regeneration cycle. Also shown in FIG. 13 are multiple temperature and pressure sensors 1309, 1311, 1313, 1315, etc. which are utilized for process control.

In summary, a preferred embodiment of the dehydration subsystem is an alternating two-bed desiccant subsystem, able to dry up to 230 mcf/day of gas in 6 hour cycles for the MAGS-200 unit. The desiccant subsystem has several unique features that save on capital expense and conserve energy: (1) Use of four-way valves instead of two-way, on-off valves simplifies piping and controls, while saving space and expense. (2) Utilization of engine exhaust heat from the internal power generator to drive the regeneration eliminates the need for expensive combustion or electric heat. (3) Use of pressurized hydrocarbon vapor as the regeneration gas eliminates a blower, while making the switchover process faster and more seamless, eliminating a bed cleaning step. (4) Elimination of consumable additives (such as methanol or ethylene glycol) reduce logistical complexity. (5) Finally, the entire subsystem is designed to fit inside the height and width envelope of a standard drop-deck semi-trailer, allowing enhanced mobility to various field sites.

Alternative embodiments of the MAGS dehydration subsystem could employ systems involving more than two beds, and/or use other methods of moisture capture, including alternative desiccants, or water capture using coolers or freezers. All such systems that can achieve the required aqueous dew point, as determined by the coldest point in the refrigeration subsystem, are within the scope of the present invention.

Power Generation Subsystem Embodiments

The MAGS system is mobile, so it can be deployed anywhere, including internationally where AC power standards differ from one another. Therefore, the MAGS needs a consistent onboard power source to operate the system. The inventors realized that one preferred embodiment is to consume the energy content of the lowest value stream, the B-gas stream, which is composed largely of low-value ethane.

Accordingly, the MAGS internal power generation unit can run on a gaseous hydrocarbon stream comprising from 0 to 100% ethane content. However, it is preferable that most of the ethane is in the B-gas stream (the one that powers the system) so it is not in the NGLs product (C-liquid) or in the A-gas (methane-dominated) stream. The result is that much of the ethane is utilized to power the MAGS system itself so that it does not increase the vapor pressure of the NGLs product, nor interfere with engine performance of the lean methane stream. As can be seen from Table 2, about a third (~32%) of the ethane from the raw gas stream ends up in the A-gas stream, about a sixth (~22%) ends up in the C-liquid stream, and about a half (~46%) is used for powering the MAGS itself in the B-gas stream.

In one embodiment, the engine used to power the MAGS system is adapted to use a fuel mixture composed of methane, ethane, and/or propane by using the emissions system to verify stoichiometric operation. The gas engine varies fuel pressure to achieve the proper air to fuel mixture, wherein the unit varies the time the injectors remain open to meet combustion requirements. Most gas engines are not compression ratio limited, as long as the ignition timing can be varied. There would be a 5-15% derating of the engine's power output, depending upon its methane/propane rating. Since ethane's power rating resides between methane and propane, safe operation is expected. The power output limiting factor when changing fuels usually comes down to the engine's compression ratio and fuel injection control scheme.

In one embodiment, the MAGS-200 embodiment utilizes a 150 kW rated, methane-propane dual-fuel gas engine. Since only about 65% power capacity (about 100 kW) is required, so derating of the engine is not a concern. For initial start-up, the unit could be run on the wellhead gas at an additional deration until the MAGS system is fully operational.

In one embodiment, if a particular raw gas stream has too much ethane content, then in some embodiments, some of the B-gas stream that is not consumed to power the MAGS itself can be mixed with the A-gas stream, while still keeping the A-gas stream above the minimum methane number. Alternatively, in some embodiments, any remaining B-gas stream that is not consumed to power the MAGS can be used for other purposes, or flared if absolutely necessary.

MAGS Control System Embodiments

Any chemical process operating in real-time in the real world requires a degree of control to maintain process conditions within acceptable operational constraints determined by economic, practical, and safety requirements. The MAGS system employs a novel control scheme in which both stable operation and agility of response to changes in inlet conditions are achieved with minimal complexity and cost.

The first unit operation in the MAGS system allowing for a degree of process control are the two stages of compression which increase the pressure of the raw natural gas stream. In the preferred configuration, durations of low flow are augmented with recycled vapor from various parts of the downstream process to maintain constant throughput of the compression equipment. In an alternate configuration, variable frequency drives (VFD) can be installed on the compressor motors so the system can track a variable inlet flow from the wellhead. In yet another embodiment, suction pressure control can be employed to control the flow through the system.

Air-cooled heat exchangers rely primarily on convective heat transfer to cool or heat a process stream. Accordingly, the fan speed of each of the five air-cooled heat exchangers in the MAGS process provides a significant degree of control to maintain process streams at desired temperatures. In one embodiment, the MAGS system has variable frequency drives (VFD) under PID control installed on each of the five air-cooled heat exchangers to maintain process gas temperatures at desired set-points. In another embodiment, mechanical louvers can be added to the front of the fan unit to reject or retain heat.

The preferable configuration of the control scheme relies on static control elements, including both sharp-edged orifice plates and capillary tubes, to maintain the ideal temperatures and pressures required for separating the raw natural gas into the three useful product streams as described herein. These static control elements allow for a range of operational capacity since only the liquid levels in the phase separators will vary. However, with orifices on the vapor streams and capillary tubes on the liquid streams, physical flow constraints prevent the vessels from emptying or flooding. This can be confirmed with analog level monitoring.

Alternatively, for systems requiring an even higher degree of turndown, such as those installed in a wellhead with great variability in flow, it is possible to install active control elements. These include pneumatically actuated globe valves for vapor streams and electromechanically actuated expansion valves for liquid stream. Both globe valves and expansion valves share the robust level control characteristics of the static control elements discussed above.

In one embodiment, an innovative control feature of the MAGS process may be utilized to take advantage of the highly efficient use of thermal integration in the process design. The high-methane vapor stream (A-gas) leaving the first phase separator is heated by the engine exhaust from the onboard generator. In order to deal with variable flows through this heat exchanger, the hot engine exhaust can be diverted with a three-way butterfly valve to avoid overheating the high-methane content stream (A-gas) and damaging valving associated with the desiccant subsystem.

The controls system exhibits redundancy to maintain proper communication during all operations. In one embodiment, it is possible to use individual, autonomous pieces of microprocessing hardware to maintain optimal operation of the MAGS systems. The individual control units handle high-level operational control goals, low-level PID loops, communication with both local and remote human operators, and communication with both local and remote MAGS systems, as well as ancillary systems including bulk storage, onboard power generation, and external client-facing power generation.

Communication between hardware is made redundant with backup power supplies, two redundant wired Ethernet networks, and a failsafe wireless network. Local operational highlights are broadcast externally from the field installation via Ethernet radios, cellular modems, and satellite communication to remote operators and monitoring centers, allowing fully remote and autonomous operation of fleets of MAGS units from a single control center.

Other aspects of the MAGS Control System allow any piece of oil and gas equipment of whatever nature to be remotely controlled, monitored, and managed utilizing a graphical user interface (GUI) displayed on any end-user device whatsoever.

According to one embodiment of the present invention, there are multiple layers of control in MAGS. MAGS Control Layer 0 is a layer of automatic safety electromagnetic relay circuits to respond to undesirable conditions on an immediate level when and where any level of a critical subset of the sensors are outside predicted/expected bounds (pre-set), with the result that the system automatically cuts the MAGS machine off. MAGS employs electromechanical and mechanical sensors to cut power to the MAGS and other subsystems.

MAGS Control Layer 1 is a layer of micro-electronic relay devices that interface with the main software control system, on a microprocessor attached to the MAGS. The main function for layer 1 relays is to control the sequence of MAGS operations. For example, when a MAGS operator wants to start or stop the refrigeration system, there are two commands (start/stop). Layer 1 relay circuitry handles the sequencing to correctly turn off the sequence of the MAGS refrigeration operations.

MAGS Control Layer 2 is an analog sensor hardware layer installed on the system to monitor important system process values (including, temperature, pressure, and flow rate) of the input gas stream being processed, the "A" gas stream, the "B" gas stream, the NGLs stream, and possibly the system process values for the refrigerants (i.e., propylene, butane, and ethylene). Layer 2 sensor data provides analog data to the other control layers.

MAGS Control Layer 3 is a layer of embedded controllers/controller hardware. One example is a VFD (Variable Frequency Drive), which is a black box that is smart enough on the inside to control a given setpoint. For example, a reboiler controller is an internal control unit that controls a subsystem and is typically custom-made for the application and gets integrated into the MAGS control system as a black box controller.

MAGS Control Layer 4 is a layer of controls & communication hardware that provides an integration platform to combine all elements from MAGS Control Layers 0-3 and make them available for interaction & modification. Layer 4 communicates at very low bandwidth over remote data & cellular networks, and is encrypted via a secure VPN tunnel. Layer 4 is the layer that communicates with the human operator, and may be known as the HMI (Human Machine Interface).

MAGS Control Layer 5 is the human element, which are the operators who interface with the human-machine interface (HMI) to ensure the process is as close to desired conditions as possible. Engineers dictate setpoints and operating conditions to the operators via simulations and other calculations.

Illustrative Prefered MAGS Control System Embodiment

One embodiment of the MAGS Control System will now be described with reference to FIGS. 14-19. FIGS. 7A and 7B described previously show a schematic diagram of one embodiment showing locations and placements of sensors for use with one illustrative embodiment of the MAGS Control System, according to one embodiment of the present invention.

Figure 14:
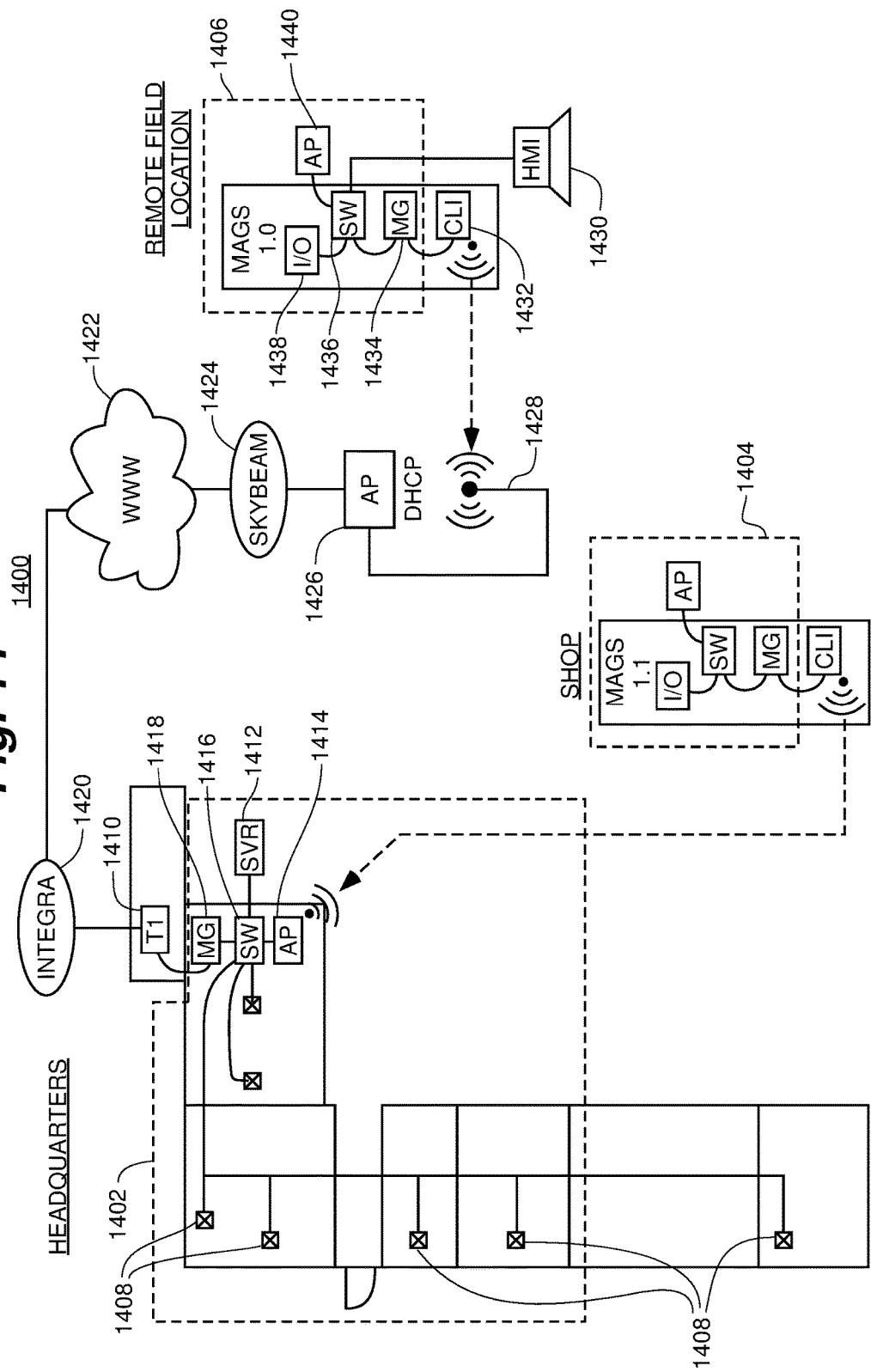
FIG. 14 shows an architectural diagram of one embodiment of a Control System according to one embodiment of the present invention.

FIG. 14 shows an architectural diagram 1400 of one embodiment of a Control System according to one embodiment of the present invention. A main control center 1402 is shown, having a plurality of operator stations 1408, at which one or more human operators may access the graphical user interface (GUI) of the control system. The main control center 1402 may be located anywhere in the world, and communicates with the rest of the world using a dedicated communication channel 1410, such as a T1 Internet connection, and the like. A MAGS, or any other piece of field equipment, which can be located near the main control center as shown illustratively in the shop 1404, can communicate with the main control center 1402 via a wireless communications channel as shown. An client point (CLI) on the piece of equipment located in the shop 1404 communicates with an access point (AP) 1414 in the main control center. The wireless communications channel can utilize any communications technology known in the art, including but not limited to, WiFi, 3G, 4G, LTE, WiMax, and other short-range and long-range wireless communication known to one of ordinary skill in the art.

The main control center 1402 has a server SVR 1412, Ethernet switch SW 1416, and VPN router (MG) 1418, in addition to a wireless access point (AP) 1414. A dedicated communication channel (T1 in this example) 1410 communicates via an ISP (INTEGRA in this example) 1420, which can communicate over the World Wide Web (WWW) 1422, or any other Wide Area Network (WAN), to a plurality of remote field equipment in remote field location 1406.

In one embodiment, another ISP (SKYBEAM in this example) 1424 at the remote field location 1406 is used to communicate with another wireless access point (AP) 1426 using an antenna 1428. The AP 1426 can be enabled with Dynamic Host Control Protocol (DHCP) to obtain dynamic IP addresses for devices connecting to the AP 1426. The AP 1426 can communicate with a plurality of remote field equipment located anywhere in the world. An AP 1426 can be setup for every geographic area that can be reached by the antenna 1428, and can communicate with multiple field equipment via a corresponding client point (CLI) 1432 on each piece of field equipment.

In one embodiment, each piece of equipment at remote field location 1406 has a client access point (CLI) 1432, VPN router (MG) 1434, switch (SW) 1436, a microprocessor (not shown), and input/output means (I/O) 1438, in addition to a wireless access point (AP) 1440. In some embodiments, a local human machine interface (HMI) 1430, which can be wired directly into the switch (SW) 1436 on the field equipment, is available for local diagnostics and control, which can be performed locally, hence by-passing the main control center 1402, whenever necessary or desired. Wireless access point (AP) 1440 allows field technicians to communicate directly with the piece of field equipment over a wireless network, as well as to access other systems or the Internet generally.

Figure 15:
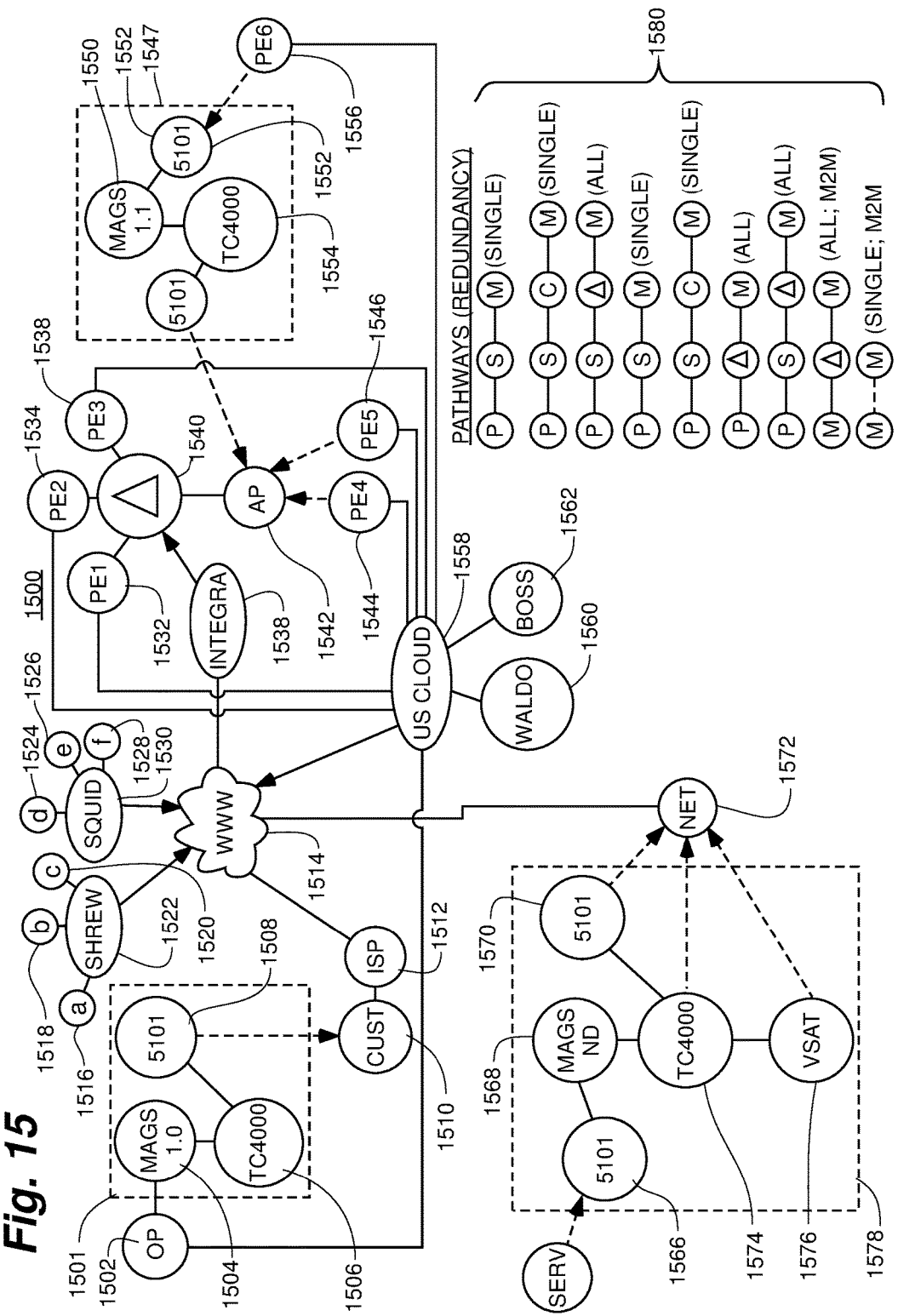
FIG. 15 shows another architectural diagram of one embodiment of the Control System according to one embodiment of the present invention.

FIG. 15 shows another architectural diagram of one embodiment of the Control System according to one embodiment of the present invention. FIG. 15 shows a more abstract representation 1500 of FIG. 14, illustrating the redundancies built into the control system. Pathways (redundancies) 1580 are illustrated, in which every P is a person/operator, every M is a MAGS or other piece of field equipment, and every S and Delta in between are ways of encrypted communication between the person/operator and the MAGS/piece of field equipment. Illustrated are 3 pieces of field equipment (MAGS) communicating with a headquarters in the center of FIG. 15, communicating to the HQ 1540 via the WWW 1514 and cloud 1558. Waldo 1560 and Boss 1562 are people/operators patching into the cloud to access the systems described here.

Remote access is available via software and/or hardware VPN (Virtual Private Networking). A VPN software ("SHREW") 1522, may support multiple connections 1516, 1518, and 1520. A VPN hardware ("SQUID") 1530 can similarly support multiple connections 1524, 1526, and 1528.

A first location 1501 houses a MAGS 1504, a TC4000 connection 1506, and a 5101 client access point 1508, with an operator 1502 located nearby. An internet access point 1510 communicates with ISP 1512, to the WWW 1514, and the cloud 1558.

Similarly, a second location 1578 houses another MAGS 1568, a TC4000 connection 1574, a satellite connection ("VSAT") 1576, and 5101 client access points 1566 and 1570. Access is provided to a network connection 1572, which accesses the WWW 1514 and cloud 1558.

Finally, a third location 1547 houses a MAGS 1550, a TC4000 connection 1554, and 5101 client access points 1547 and 1552. Internet connection ("PE6") 1556 communicates to the WWW 1514 and the cloud 1558.

Lastly, at headquarter 1540, which communicates with the WWW 1514 via another ISP ("INTEGRA") 1538, several computer access points for operators are provided at workstations 1532, 1534, and 1538. A wireless access point (AP) 1542 provides wireless access to additional workstations, laptops, mobile devices, and the like 1544 and 1546.

In some embodiments of the present invention, a third-party data center (DC) can be added that communicates with the MAGS directly, and the DC communicates with the HQ and the operators. This adds an extra layer of redundancy and safety, because the DC generally has many redundant and failsafe communications links to the cloud, as well as redundant power supplies and additional security.

Figure 16:
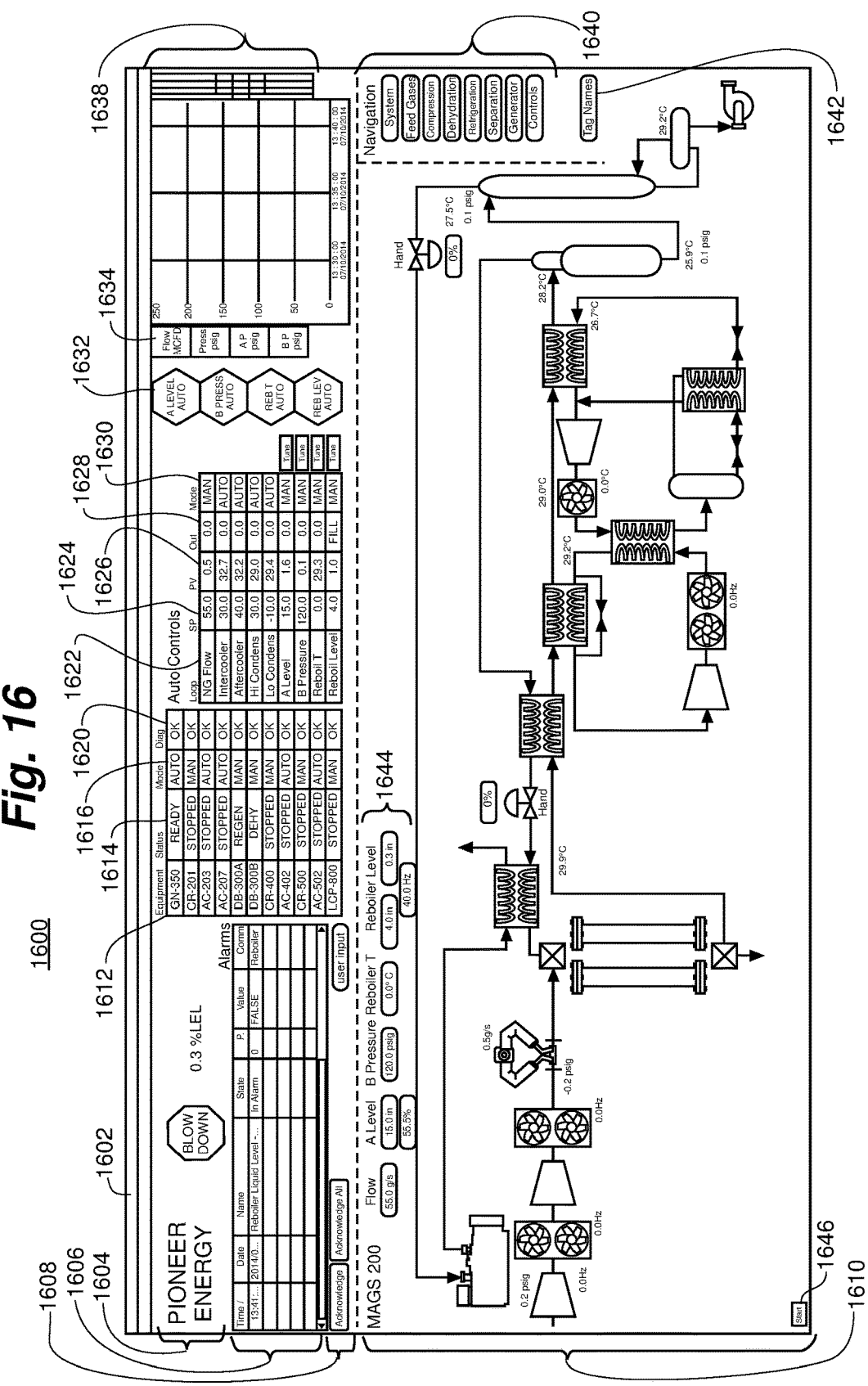
FIG. 16 shows an illustrative graphical user interface (GUI) of one embodiment of the Control System according to one embodiment of the present invention.

FIG. 16 shows an illustrative graphical user interface (GUI) 1600 of one embodiment of the Control System according to one embodiment of the present invention. This screen is used to monitor, control, and operate the remote pieces of field equipment. Several example interface elements are discussed next, but these interface elements are illustrative of but one embodiment of the present invention, and are not intended to be limiting. It is important to note that a visual designer software interface may be used to design, modify, and configure the visual display elements described here that is most appropriate to the configuration of the hardware being monitored and controlled according to the various embodiments of the present invention. A main window 1602 is illustrated, having a corporate logo/label 1604. An alarming section 1606 illustrates a plurality of alarms that might be activated by the control system, illustrating dangerous or warning levels of various controlled and/or monitored parameters in the piece of field equipment. The operator is provided with alarm response buttons 1608, which allow an operator, for example, to acknowledge, silence, confirm, or respond to alarms. A main flow diagram screen 1610 shows all monitored subcomponents of the field equipment being monitored. A major subcomponent screen 1612 shows major subcomponents of the field equipment, typically rotating pieces of equipment, such as compressors, and so on. Status indication 1614 indicates status of each major subcomponent being monitored in major subcomponent screen 1612. Mode indicator 1616 indicates the mode set for each major subcomponent, such as, but not limited to, automatic versus manual control. A diagnostic indicator 1620 indicates the diagnostic status of each piece of major subcomponent. An automatic control element screen 1622 illustrates the automatic control elements for that particular piece of field equipment, including setpoint indicator 1624, process value indicator 1626, controlled output indicator 1628, and mode indicator 1630. Toggle buttons 1632 allow toggling between manual and automatic control loops. Pressure-flow chart 1638, having a legend 1634, is illustrative of process data that may be illustrated to allow operators to see more detailed process information in real-time. Navigation buttons 1640 allow easy and quick navigation among the various subcomponents. Additional buttons 1642 and 1646, and indicators 1644 may be added for various purposes, to perform various operator actions, and/or to display various informational elements.

Figure 17:
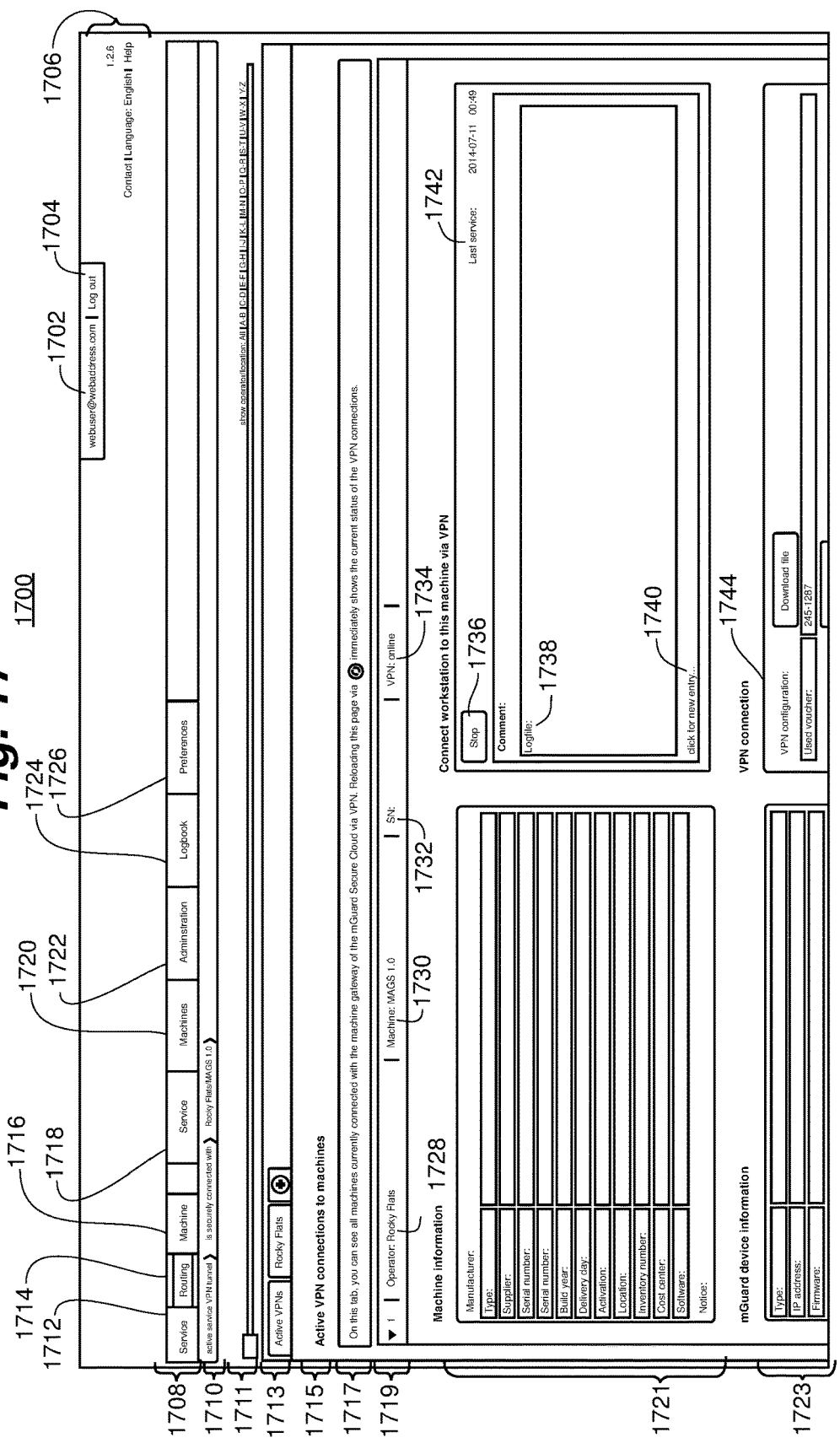
FIG. 17 shows another illustrative graphical user interface (GUI) of one embodiment of the Control System according to one embodiment of the present invention.

FIG. 17 shows another illustrative graphical user interface (GUI) 1700 of one embodiment of the Control System, showing a cloud interface for machine communication using a secure cloud interface, according to one embodiment of the present invention. This screen is used to set various communication interface settings. Several example interface elements are discussed next, but these interface elements are illustrative of but one embodiment of the present invention, and are not intended to be limiting. A username 1702, login/logout button 1704, and various links 1706 are shown. Section 1708 shows service 1712, routing 1714, machine 1716, service 1718, machines 1720, administration 1722, logbook 1724, and preferences 1726 tabs. Section 1710 illustrates the selected piece of field equipment's communication settings being edited. Section 1711 shows a section break. Section 1713 shows various tabs for navigation purposes. Section 1715 shows a label for the current communication interface editing screen. Section 1717 shows illustrative instructions/directions to the operator to assist with communications settings editing. Section 1719 shows various labels, such as operator name 1728, machine name 1730, serial number 1732, and VPN status 1734. Section 1721 illustrates various settings that may be viewed or edited. Section 1723 illustrates additional settings that may be viewed or edited. Section 1742 shows various buttons 1736, log data 1738, and additional detail buttons 1740. Additional sections, such as section 1744, may also be displayed on the screen to facilitated additional data entry, settings editing, display of additional relevant information, and so on.

Figure 18:
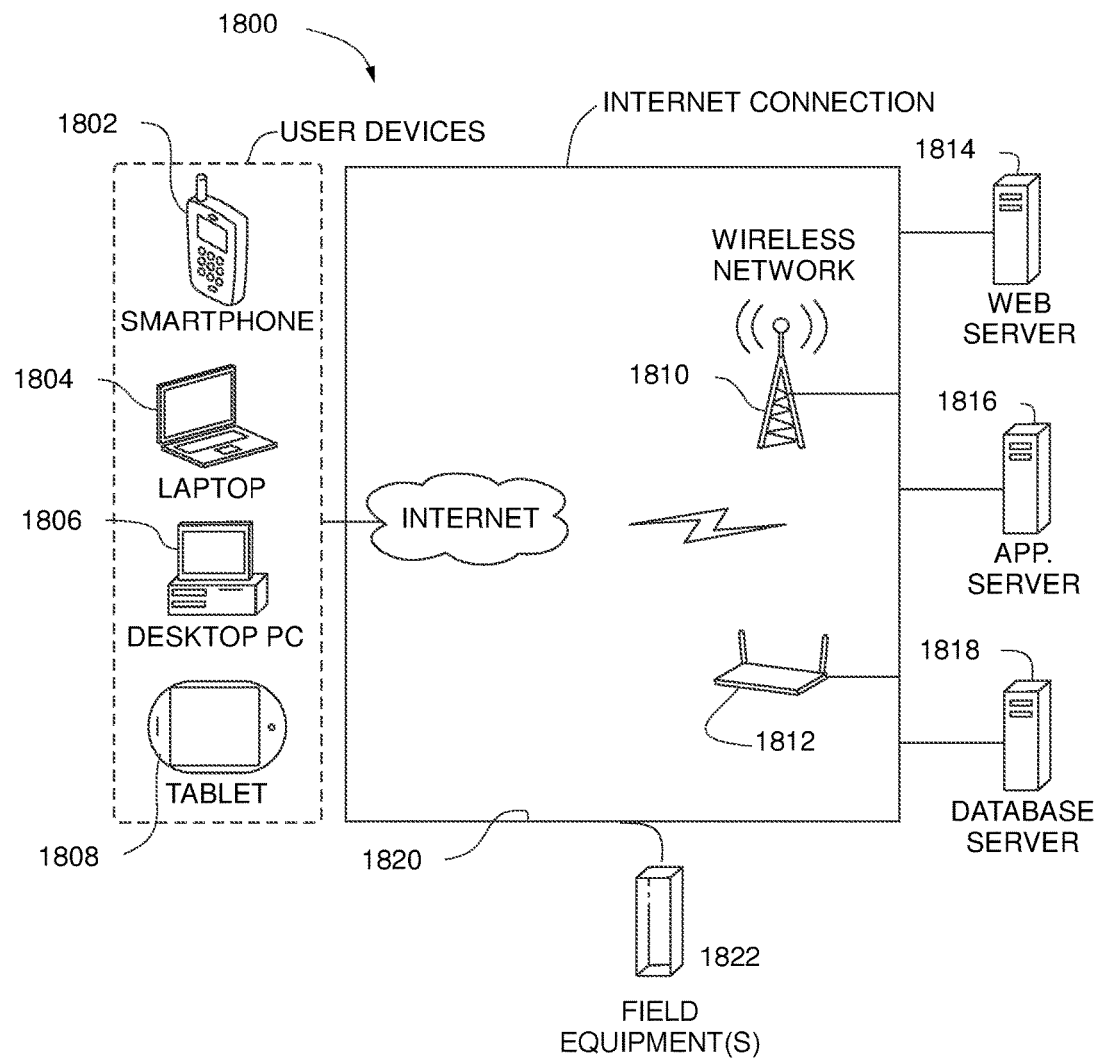
FIG. 18 is a network configuration diagram in which the Control System of the present invention may be practiced.

FIG. 18 shows an illustrative schematic diagram of a network configuration 1800 for practicing embodiments of the present invention. One or more user-device may be connected to the Internet using a wireless network or wired network 1820, or via other means known in the art. A user-device may be a smartphone 1802, laptop 1804, desktop PC 1806, or tablet 1808, or other device known in the art. The wireless network comprises a cellular tower 1810, or a wireless router 1812, or other means known in the art. User-devices communicate to servers comprising, illustratively in some embodiments, a web server 1814, an application server 1816, and a database server 1818. The servers run the application code/program code for implementing the methods of the present invention. One or more pieces of remote field equipment 1822, shown illustratively as a black box, are connected to the wireless or wired network 1820. The pieces of field equipment may be oil and gas field equipment, natural gas processing equipment as described herein, or any other piece of remotely operated, chemical processing equipment that is desired to be controlled and monitored. The servers are connected to the user-devices and the field equipment(s) through the wireless network, or the wired network 1820, or via other means known in the art. The wired network 1820 or the wireless network may employ technologies and protocols comprising Ethernet technology, Local Area Network (LAN), Wide Area Network (WAN), and optical network, and the like.

Figure 19:
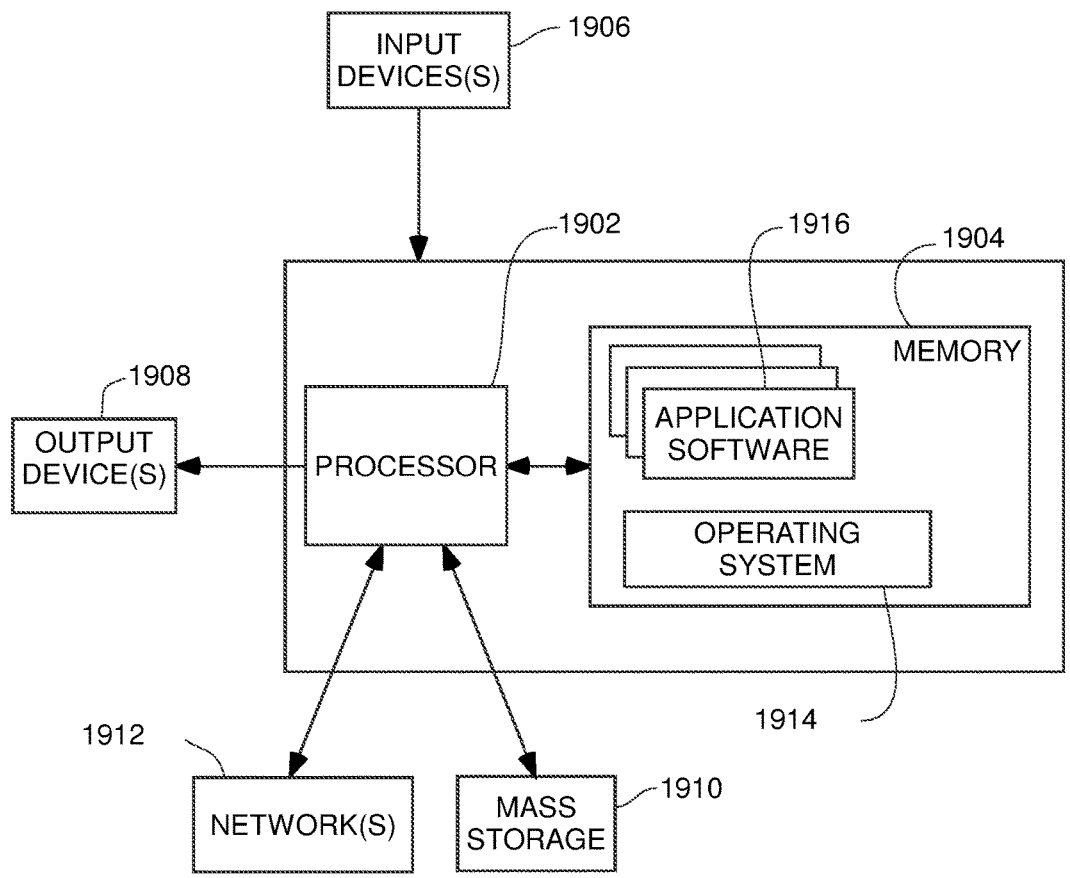
FIG. 19 is a schematic diagram of a computing appliance within which the Control System of the present invention may be embodied, according to one embodiment of the invention.

FIG. 19 is an embodiment of a computing appliance wherein the invention may be practiced. A computing appliance comprises a processor 1902, an operating system 1914, an application software 1916, a memory 1904, at least one input device 1906, at least one output device 1908, a mass storage device 1910, and a network 1912. The network 1912 comprises a wired or wireless network to communicate to remote servers and databases via the Internet. The computing appliance illustrated in FIG. 19 is illustrative of but one embodiment that may be practiced with the present invention, and other configurations of computing appliances usable with the present invention are envisioned by the present inventors.

Figure 20:
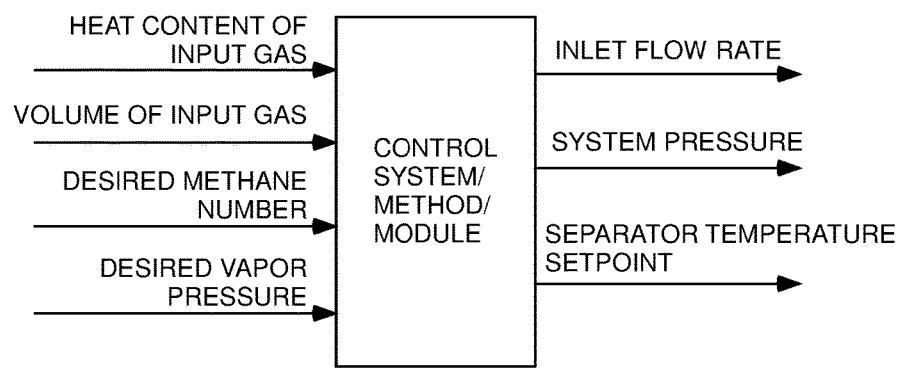
FIG. 20 shows an illustrative block diagram of a control method, or module, according to one embodiment of the present invention.

Finally, FIG. 20 shows an illustrative block diagram 2000 of a control method, control system, or module, according to one embodiment of the present invention. FIG. 20 is shown to illustrate one embodiment of a control method for the MAGS, and is not to be read as limiting the scope of the present invention to the specific control method illustrated. FIG. 20 shows four (4) input parameters to the control method, and three (3) output parameters to the control method. In the example illustrated, the first two input parameters, namely heat content and volume flow rate of the raw natural gas, are determined by the properties of the well. The second two input parameters, namely the desired methane number (minimum desired methane % in the dry gas) and the desired vapor pressure (maximum desired vapor pressure in the NGLs) are determined by the end-user or operator, and is based on the required specifications of the use-case for the dry gas (for example, whether electricity generation, CNG production, etc.) and the NGLs (for example, NGL fractionator requirements, etc.). Finally, the three output parameters, namely the inlet flow rate, the system operating pressure, and the separator temperature setpoint are the output parameters of the control method that control the MAGS system to perform the required separation to achieve the end-user or operator desired parameters for the given well properties. In the embodiment illustrated in FIG. 20, the inlet flow rate output parameter controls the inlet valve and/or the compressors' speed to control the inlet flow rate into the MAGS to the control system's setpoint. The system operating pressure output parameter controls the pressure control valve (in one embodiment, situated on the outlet to the stripping column) to control the system operating pressure to the control system's setpoint. The separator temperature setpoint output parameter controls the temperature setpoint of the separation subsystem to control the separator operating temperature to the control system's setpoint. In one embodiment, the separator temperature setpoint is a reboiler temperature setpoint on a reboiler in the separation subsystem. In one embodiment, the reboiler temperature setpoint is controlled by a black box reboiler controller.

In short, in one embodiment, there is a set of input parameters that are determined by the well, a set of input parameters that are determined by the operator/end-user/application, and a set of output parameters that control the MAGS or other piece of field equipment given the two sets of input parameters.

In the example illustrated in FIG. 20, when the heat content of the input raw natural gas increases, the control system decreases the inlet flow rate, decreases the reboiler setpoint, and optionally increases the system operating pressure. Conversely, when the heat content of the input raw natural gas decreases, the control system increases the inlet flow rate (assuming the volume of the input gas supports this increase), increases the reboiler temperature setpoint, and optionally decreases the system operating pressure.

In the example illustrated in FIG. 20, when the volume flow rate of the input raw natural gas increases, the control system increases the inlet flow rate (assuming the system capacity supports this increase), increases the system operating pressure, and decreases the reboiler temperature setpoint. Conversely, when the volume flow rate of the input raw natural gas decreases, the control system decreases the inlet flow rate, decreases the system operating pressure, and increases the reboiler temperature setpoint.

In the example illustrated in FIG. 20, when the desired methane number (desired minimum methane % in the dry gas stream) is increased, the control system decreases the inlet flow rate, increases the system operating pressure, and increases the reboiler temperature setpoint. Conversely, when the desired methane number is decreased, the control system increases the inlet flow rate (assuming the volume of the input gas supports this increase), decreases the system operating pressure, and decreases the reboiler temperature setpoint.

Finally, in the example illustrated in FIG. 20, when the desired vapor pressure (desired maximum vapor pressure of the NGLs stream) is increased, the control system decreases the inlet flow rate, increases the system operating pressure, and decreases the reboiler temperature setpoint. Conversely, when the desired vapor pressure is decreased, the control system increases the inlet flow rate (assuming the volume of the input gas supports this increase), decreases the system operating pressure, and increases the reboiler temperature setpoint.

As would be understood by one of ordinary skill in the art, all of these increases and decreases in output parameters are kept within the operational limits of the field machine, so that any increase or decrease outside supported operating limits is prohibited. In such a scenario, the machine is either shut off for safety reasons, or the operator is informed that the desired methane number and/or the desired vapor pressure are not attainable given the properties of the well and the desired output conditions, and the operator is given an opportunity to adjust the desired methane number and/or the desired vapor pressure, or alternatively shutdown the machine.

Another Illustrative MAGS Control System Embodiment

In one embodiment, the controls system installed on the MAGS is useful to the design goal to deliver mobile refining capability to the source of variable flow raw natural gas, instead of transporting the raw natural gas to a geographically fixed processing facility of fixed processing capacity. This concept relies on numerous remote hardware installations to achieve an overall economically relevant processing capacity for the project instead of an easily manageable single-site installation of much higher capacity. This operational model requires design innovations which bypass traditional costs and difficulties associated with the complexity of geographically disparate hardware sites. The MAGS controls system addresses this need.

The controls approach on the MAGS allows the hardware to be as infinitely flexible and reconfigurable as possible with current technology, requiring the absolute minimum physical intervention or reconfiguration. This includes additional optional accessories, subsystems, and bolt-on modules.

In one embodiment, on a single system, the MAGS control method and system comprise:
  Selection of hardware and associated components with operational ranges instead of fixed operating points involving valves, regulators, compressors, pumps, fans, variable frequency drives, electrical current-to-pressure (I/P) converters, etc.
  Product specifications provided by the client
    Liquid vapor pressure and methane number for the gaseous fuel
  Computational determination of an operating point comprising of the three main controlled set points
    Inlet flow rate (as a function of inlet gas composition), stripping column pressure, and reboiler liquid temperature
  An electronic communications infrastructure which allows for an unmanned many-to-many network of omnidirectional wired and wireless device connections
    Utilizing various protocols including Modbus, CANbus, TCP/IP, UDP, 3G, 4G LTE, coaxial, IEEE 802.11 a/b/g/n, IEEE 802.15.4, Bluetooth, VPN, IPsec, ISAKMP, near field communication, Fieldbus, 900 MHz radio, high and low-voltage variable frequency electricity, AC electricity, DC electricity, relay circuits, etc.
  A human-machine interface (HMI) management platform which allows for supervisory control and data acquisition (SCADA) by highly trained human operators to implement operational plans and address unexpected conditions and events In one embodiment, the MAGS control method and system comprises for the whole project:
  Widespread, rapid hardware deployment in a fashion that avoids traditional costs and complexities of multiple hardware deployments
    Self-healing wireless hub-and-spoke networking permits mobile hardware requiring zero reconfiguration after relocation
    Operations personnel scaling is exponentially inverse of traditional deployments: one system requiring four personnel vs. four systems requiring one person to operate
    Flexible capacity scaling with multiple deployments on a single site is made possible with machine-to-machine communication and prioritization. This allows a geometric increase in turndown (three 3:1 units allow 9:1 turndown on a single-site for particularly volatile gas availability)

In one embodiment, sequential control of the MAGS system is achieved as follows:
  MAGS Stop Command: Everything is stopped at essentially the same time.
  MAGS Compressor Start Command (and what speed to run): First, the compressor is turned on to introduce pressure into the system. First, maximize the intercoolers to cool the system. Then, the compressor itself is started, the fans are turned on to automatic, and the compressor slowly ramps up to the operating point. Then, the safety valves from layer 1 take over, and automatically turns on the downstream components.
  Entire Startup Sequence: First, the compressor is turned on, and the compressor speed is specified. Then, once it is determined that the hardware has started successfully, the next step engages the pressure control. Once everything is stabilized, the refrigeration system is started. There is generally no need to control the refrigeration system at this level, because it is self-regulating. The process temperature in the refrigeration system is self-regulating, and is handled by the physical characteristics of the refrigeration system. The refrigeration temperature has an impact on the A-gas, and effects the ethane content in the A-gas stream.

Control System Hardware and Software Implementation

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware (e.g., any cache memory in the processor), as well as any storage capacity used as a virtual memory (e.g., as stored on a mass storage device).

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system, and executes various computer software applications, components, programs, codes, libraries, objects, modules, etc. to collectively perform the control techniques described above.

In general, the method executed to implement the embodiments of the invention may be implemented as part of an operating system or a specific application, component, program, object, module or sequence of instructions referred to as "computer program(s)", "program code," or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Detailed Theoretical Analysis

The various embodiments of the MAGS system were analyzed using HYSYS code (a chemical process modeling software manufactured by ASPENTECH CORPORATION). The Version 1 MAGS embodiment employed two sequential flashes to remove ethane and residual methane from the liquid stream after the initial liquefaction step and before final stripping of light fluids in the stripping column. The Version 2 MAGS embodiment sent the liquid stream directly to the stripping column immediately after the liquefaction step without any intermediate flash operations.

The theoretical performance obtainable using each of these designs (Version 1 and Version 2), as predicted by HYSYS, is given in Tables 3 and 4.

TABLE 3

Version 1 Theoretical Predicted Performance from HYSYS
Version 1, 180 psi, −60° C., 200 MCF/day (Case 1)

|  | Feed Gas Stream Specifications | NGL Product (C) | Gas Product (A) | Gas Product (B) | Fraction Captured in NGL (%) |
|---|---|---|---|---|---|
| Flow Rate (MCF/day) | 200 | 54 | 113 | 33 |  |
| Pressure (PSIA) | 33 | 35 | 103 | 35 |  |
| Temperature (° C.) | 40 | −35 | 50 | −50 |  |

TABLE 3-continued

Version 1 Theoretical Predicted Performance from HYSYS
Version 1, 180 psi, −60° C., 200 MCF/day (Case 1)

|  | Feed Gas Stream Specifications | NGL Product (C) | Gas Product (A) | Gas Product (B) | Fraction Captured in NGL (%) |
|---|---|---|---|---|---|
| Gas Composition (%) |  |  |  |  |  |
| Methane | 50.89 | 0.00 | 81.78 | 37.8 | 0.00 |
| Ethane | 21.21 | 22.64 | 13.38 | 53.37 | 28.29 |
| Propane | 13.30 | 42.64 | 1.78 | 6.47 | 84.96 |
| i-Butane | 1.69 | 6.11 | 0.06 | 0.021 | 95.81 |
| n-Butane | 4.33 | 15.88 | 0.09 | 0.031 | 97.19 |
| i-Pentane | 0.82 | 3.06 | 0.00 | 0.001 | 98.89 |
| n-Pentane | 1.08 | 4.04 | 0.00 | 0.001 | 99.13 |
| n-Hexane | 1.50 | 5.62 | 0.00 | 0.00 | 99.29 |
| $CO_2/N_2$ | 5.18 | 0.01 | 2.91 | 2.31 | 0.05 |

TABLE 4

Version 2 Theoretical Predicted Performance from HYSYS
Version 2, 180 psi, −60° C., 200 MCF/day (Case 1)

|  | Feed Gas Stream Specifications | NGL Product (C) | Gas Product (A) | Gas Product (B) | Fraction Captured in NGL (%) |
|---|---|---|---|---|---|
| Flow Rate (MCF/day) | 200 | 53 | 113 | 33 |  |
| Pressure (PSIA) | 33 | 175 | 103 | 175 |  |
| Temperature (° C.) | 40 | 25 | 50 | −20 |  |
| Gas Composition (%) |  |  |  |  |  |
| Methane | 50.89 | 0.01 | 81.78 | 37.57 | 0.01 |
| Ethane | 21.21 | 22.91 | 13.38 | 52.7 | 28.62 |
| Propane | 13.30 | 42.44 | 1.78 | 7.04 | 84.56 |
| i-Butane | 1.69 | 6.07 | 0.06 | 0.3 | 95.18 |
| n-Butane | 4.33 | 15.81 | 0.09 | 0.53 | 96.76 |
| i-Pentane | 0.82 | 3.06 | 0.00 | 0.03 | 98.89 |
| n-Pentane | 1.08 | 4.04 | 0.00 | 0.04 | 99.13 |
| n-Hexane | 1.50 | 5.63 | 0.00 | 0.01 | 99.46 |
| $CO_2/N_2$ | 5.18 | 0.03 | 2.91 | 1.78 | 0.15 |

It can be seen that the Version 2 (Table 4) results are nearly as good as those in Version 1 (Table 3), yet obtained with a significantly simpler system. It would thus be the preferred embodiment of the two. However, both designs are feasible, as are alternatives operating at different temperature and pressure combinations, and utilizing a greater or lesser number of flash tanks, stripping columns, or distillation systems.

Additional Experimental Results

A subscale MAGS unit was built with a capacity of about 14,000 cf/day (~14 mcf/day) of raw natural gas, called "MAGS-0" throughout this specification. Both Version 1 and Version 2 configurations were tested. A simulated liquid-rich raw gas feed was created by combining methane, ethane, propane, and butane in the following proportions: methane 50%, ethane 25%, propane 15%, and butane 10%. This gas was then compressed to 180 psi, after which it was refrigerated to −60° C. using an autocascade system, allowing process stream A to vent. Following this step, the liquid stream was either flashed twice and then sent to the stripping column, as per Version 1, or sent directly to the stripping column, as per Version 2. The process gas was at a pressure of 130 psi and −55° C. at the point of measurement.

The results for Version 1 (case 1, no cyclone) are shown in Table 5, while the results for Version 2 (case 2, with cyclonic separator added) are shown in Table 6.

TABLE 5

Case 1 (Version 1, No Cyclonic Separator) Experimental Results
Version 1 without Cyclonic Separator, 130 psia, −55° C., ~14 MCF/day

|  | Feed Gas Stream Specifications | NGL Product (C) | Gas Product (A) | Gas Product (B) | Fraction Captured in NGL (%) |
|---|---|---|---|---|---|
| Flow Rate (MCF/day) | 13.2 | 2.01 | 10.07 | 1.14 |  |
| Pressure (PSIA) | 125 | 20 | 120 | 20 |  |
| Temperature (° C.) | 30 | −30 | −55 | −60 |  |
| Gas Composition (%) | | | | | |
| Methane | 54.35 | 1.42 | 66.57 | 39.74 | 0.40 |
| Ethane | 18.30 | 5.97 | 17.54 | 46.63 | 4.96 |
| Propane | 16.15 | 43.03 | 11.27 | 11.91 | 40.48 |
| n-Butane | 11.20 | 49.59 | 4.62 | 1.72 | 67.26 |

The results from Table 5 show the machine running in Version 1 mode, without a cyclone to remove natural gas liquid droplets in mist form from the exhaust A stream. The composition of the NGL product, which includes both the liquid itself and the headspace above the liquid, was obtained by mole balance, adjusting Exhaust A flow to obtain methane composition agreement. Gas chromatograph measurements of the liquid portion of the captured NGLs were taken as well. The results were: methane (C1)=1.84%, ethane (C2)=6.82%, propane (C3)=34.13%, and butane (C4)=57.22%, agreeing with Table 5 to within the precision of the measurement.

It can be seen from Table 5, comparing to Table 3, that while the captured liquid was of very high quality, the fraction captured was below theoretical calculations. It was concluded that excessive amounts of liquids were being lost in mist form in the Exhaust A stream. To reduce these losses, a cyclone separator was introduced in addition to testing the machine in Version 2 mode. The results for Version 2 (case 2, with cyclone) are shown in Table 6.

TABLE 6

Case 2 (Version 2, with Cyclonic Separator) Experimental Results
Version 2 with Cyclonic Separator, 160 psia, −55° C., ~14 MCF/day

|  | Feed Gas Stream Specifications | NGL Product (C) | Gas Product (A) | Gas Product (B) | Fraction Captured in NGL (%) |
|---|---|---|---|---|---|
| Flow Rate (MCF/day) | 13.7 | 5.15 | 6.21 | 2.38 |  |
| Pressure (PSIA) | 160 | 150 | 155 | 152 |  |
| Temperature (° C.) | 30 | −10 | −55 | −50 |  |
| Gas Composition (%) | | | | | |
| Methane | 54.36 | 3.57 | 86.46 | 80.69 | 2.46 |
| Ethane | 19.01 | 30.43 | 11.20 | 14.64 | 60.05 |
| Propane | 14.77 | 35.35 | 1.92 | 3.69 | 89.82 |
| n-Butane | 11.87 | 30.66 | 0.43 | 0.99 | 96.94 |

The results in Table 6 illustrate the machine running in Version 2 mode, with a cyclone added to remove natural gas liquid droplets in mist form from the exhaust A stream. The composition of the NGL product, which includes both the liquid itself and the headspace above the liquid, was obtained by mole balance, adjusting Exhaust A flow to obtain methane composition agreement. Gas chromatograph measurements of the liquid portion of the captured NGLs were taken as well. The results were methane (C1)=3.33%, ethane (C2)=24.9%, propane (C3)=39.9%, and butane (C4)=31.9%, agreeing with Table 6 to within the precision of the measurement.

It can be seen that the addition of the cyclonic separator improved NGLs capture, with experimental results achieved closely matching that of theoretical predictions in Table 4. Capture of propane was 89.8% and butane 96.9%, which is highly satisfactory. However, ethane capture in the liquid was potentially higher than desirable, a problem that did not occur in Version 1. This could be remedied in Version 2 by making the stripping column larger. Subsequent to these results, the stripping column was enlarged, leading to the results of the prototype MAGS-0 system shown previously in Table 2B, which corresponds to a Case 2 system (Version 2, no flash tanks, with cyclonic separator) as in Table 6, but with a larger stripping column. Alternatively, the cyclonic separator could be added to the Version 1 system.

For completeness, based on these experimental results, an analysis was made of the projected performance of the Version 1 machine with a cyclonic separator added. The results are shown in Table 7.

TABLE 7

Case 3 (Version 1, with Cyclonic Separator) Projected Performance
Version 1 with Cyclonic Separator, 130 psia, −55° C., 14 MCF/day

|  | Feed Gas Stream Specifications | NGL Product (C) | Gas Product (A) | Gas Product (B) | Fraction Captured in NGL (%) |
|---|---|---|---|---|---|
| Flow Rate (mcf/day) | 13.2 | 3.43 | 7.63 | 2.16 |  |
| Pressure (PSIA) | 125 | 20 | 120 | 20 |  |
| Temperature (° C.) | 30 | −30 | −55 | −60 |  |
| Gas Composition (%) | | | | | |
| Methane | 54.35 | 1.51 | 85.84 | 27.13 | 0.72 |
| Ethane | 18.30 | 9.41 | 11.87 | 55.11 | 13.35 |
| Propane | 16.15 | 48.55 | 1.73 | 15.57 | 78.05 |
| n-Butane | 11.20 | 40.53 | 0.55 | 2.19 | 93.95 |

It can be seen from Table 7 that these results approximate those predicted by HYSYS, with the exception that a slightly larger fraction of the propane was lost in exhaust stream B. This is due to liquid propane mist escaping with the gas stream, an effect that was accentuated by the small size of the subscale MAGS-0 experimental unit. Both the quality of the NGLs produced and the NGLs capture fraction are considered excellent by the inventors.

Sulfur Removal Subsystem Embodiments

If necessary, and in some embodiments, a desulfurization subsystem can be added in order to remove any sulfur from the raw gas stream. The desulfurization subsystem could be applied to the gas stream either upstream of the entire MAGS process, or after the compressor and liquid drop-out (condensers), but before the refrigeration. Several sulfur treatment and removal methods are possible according to various embodiments of the present invention. Dry sorbents may be used to capture sulfur in the feed gas. Calcium oxide, magnesium oxide, and sodium carbonate are example dry sorbents that are capable of trapping sulfur gases in solid form (as sulfates or sulfites, depending on the relative oxidation conditions). A fine sorbent can be injected into the feed gas, with resulting sulfur-containing solids then collected. In other embodiments, sulfur may also be removed by using a wet scrubber subsystem. Wet scrubbers can be configured in venturi, packed-column, or tray-type systems in which the feed gas is contacted with a scrubbing solution or slurry. The resulting scrubber solution or slurry must then be disposed.

That is, for sour flare gas that is rich in $H_2S$, the raw gas can be cleaned in a compact, modular unit before further processing. Based on the inventor's calculations, a rough total cost of $50 to $100 per day (amortized capital and operating costs) would be expected for treatment of 500 mcf/day of raw flare gas. For sulfur concentrations less than about 500 ppm, a disposable, solid iron-based sorbent would be optimal (low capital costs). The solid sorbent produces a recyclable iron sulfide waste. For higher sulfur concentrations, a liquid-based iron-chelate process would be appropriate. The liquid iron-chelate process produces an elemental sulfur filter cake by-product. Either by-product can be recycle or disposed off site.

Modular System Design

The present invention may also be configured as a modular system, which may be created from modular units (for example, but not limited to, 200 mcf units). Each unit can run in parallel autonomously without interference. These units may be combined together at the field depending on the particular application, and the requirements of a particular user. Depending on the gas processing needs of a particular site, multiple units may be combined to provide the necessary processing power. Similarly, as production declines or gas gathering lines are added, units can be removed and moved to new production locations.

Various Use Cases of the Present Invention

Several alternative use cases of the present invention are now presented. These use cases are illustrative of the possible applications of the present invention and are not meant to be exhaustive or limiting.

Figure 8:
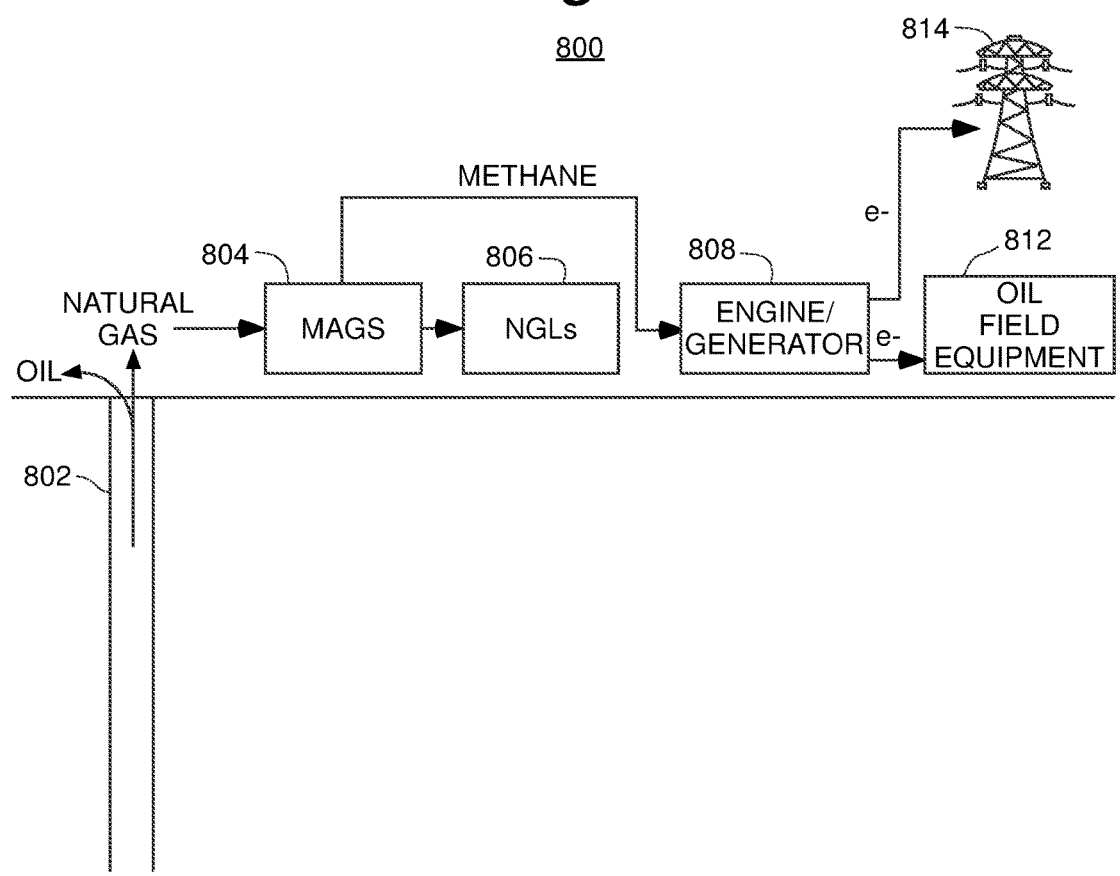
FIG. 8 illustrates an example of a use case of the MAGS in which the NGLs are transported and the $CH_4$ stream is used for electricity production.

FIG. 8 illustrates an example of a use case 800 of the mobile alkane gas separator (MAGS) in which the NGLs are transported and the $CH_4$ stream is used for electricity production. As shown in FIG. 8, oil and associated gas (which is normally flared) is produced from well 802, which may be a well fracked with hydraulic fracturing as practiced in North Dakota. The flare gas is taken to MAGS unit 804, where it is separated into NGLs 806 and lean methane, which can be utilized to power an engine/electric generator combo 808. The produced electricity may be used on-site to power various oil field equipment 812, or transmitted to the grid 814.

Figure 9:
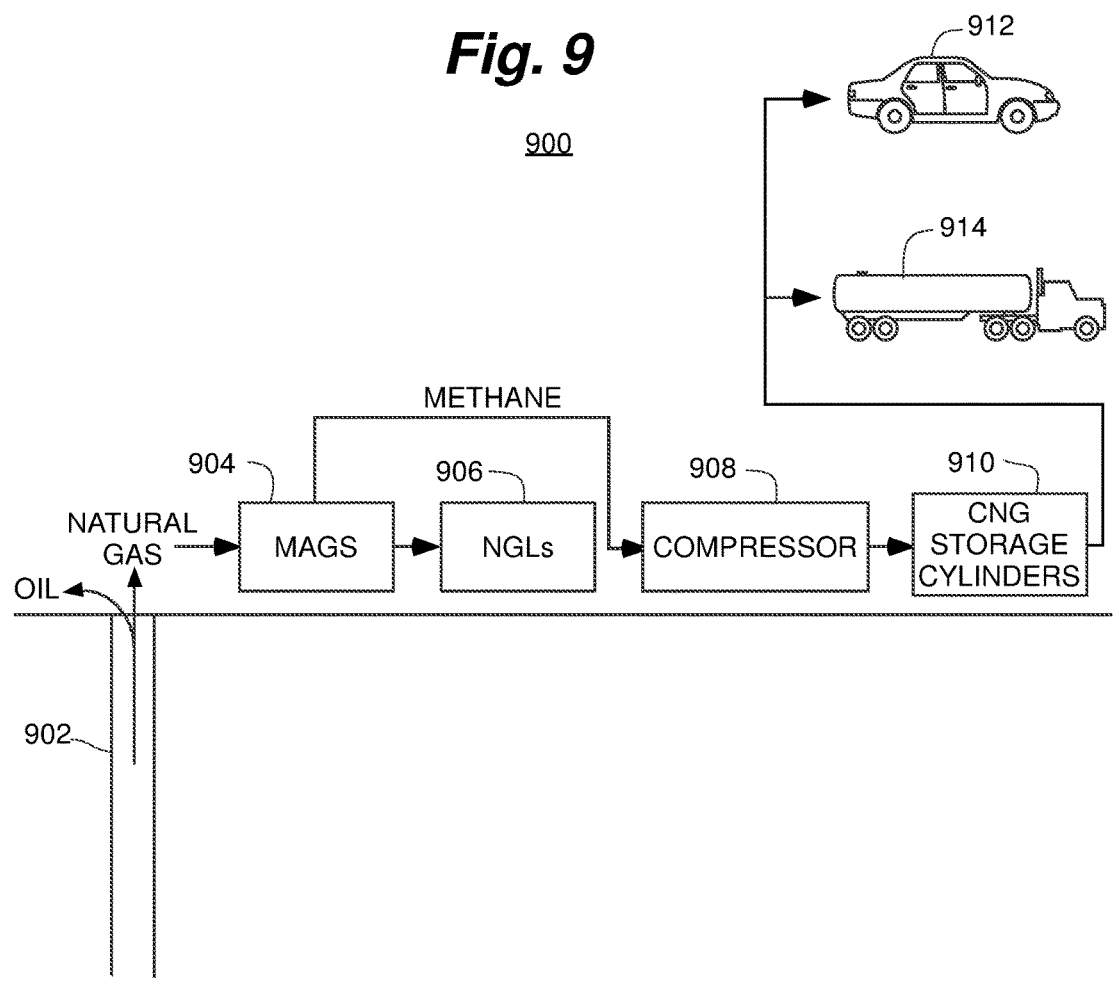
FIG. 9 illustrates another example of a use case of the MAGS in which the NGLs are transported and the $CH_4$ stream is compressed into Compressed Natural Gas (CNG).

FIG. 9 illustrates another example of a use case 900 of the mobile alkane gas separator (MAGS) in which the NGLs are transported and the $CH_4$ stream is compressed into CNG, and used as vehicle fuel or transported to a remote location to power remote gensets. As shown in FIG. 9, oil and associated gas (which is normally flared) is produced from well 902. The flare gas is taken to MAGS unit 904, where it is separated into NGLs 906 and lean methane, which can be compressed with compressor 908 to fill CNG storage cylinders 910. The stored CNG may be off-loaded directly to CNG vehicle tanks 912 for use in vehicle transportation, or loaded into CNG transport tankers 914, which may be transported to remote locations (for example, to fuel CNG fleets or provide CNG to drilling rigs).

Figure 10:
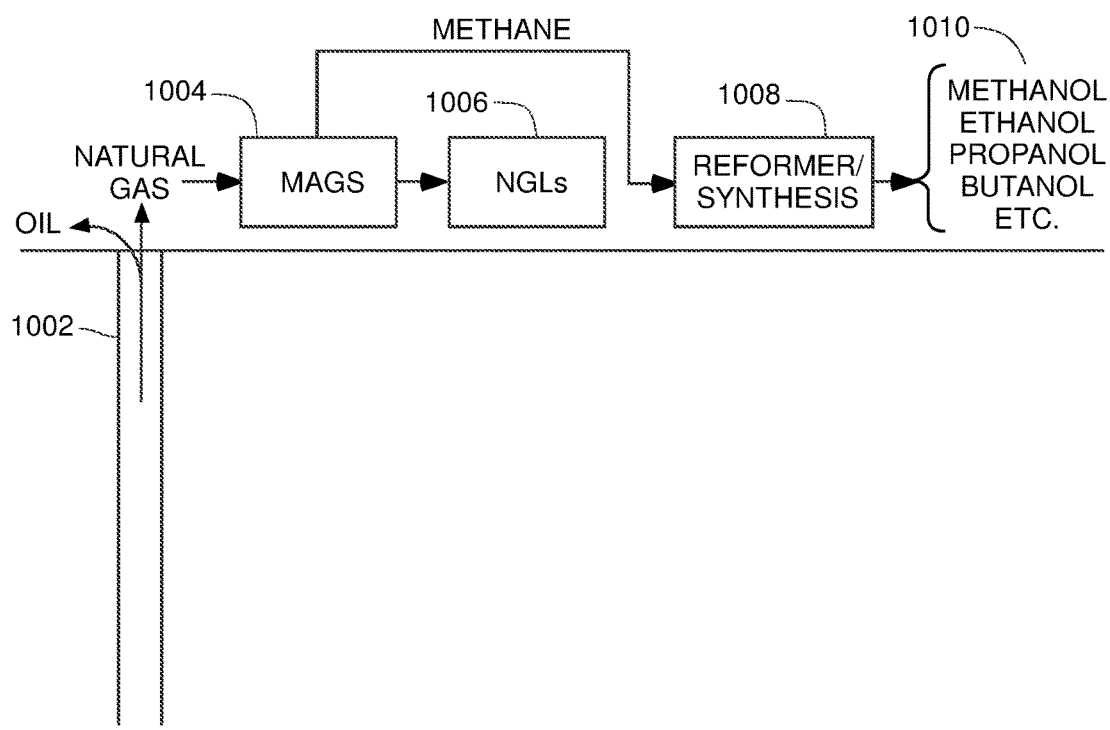
FIG. 10 illustrates yet another example of a use case of the MAGS in which the NGLs are transported and the $CH_4$ stream is converted to liquid fuels for easy transport to a remote site.

FIG. 10 illustrates yet another example of a use case 1000 of the mobile alkane gas separator (MAGS) in which the NGLs are transported and the $CH_4$ stream is converted to liquid fuels for easy transport to a remote site. As shown in FIG. 10, oil and associated gas (which is normally flared) is produced from well 1002. The flare gas is taken to MAGS unit 1004, where it is separated into NGLs 1006 and lean methane. The methane may then be upgraded to various liquid fuels 1010, including methanol, dimethyl ether, ethanol, propanol, butanol, etc. via reformer/synthesis unit 1008. The reformer/synthesis unit 1008 may include a reformer which produces syngas, followed by a synthetic fuel production subsystem (see, for example, U.S. Pat. No. 8,450,536, issued on May 28, 2013, to Emily B. White, et al., and entitled "Methods of Higher Alcohol Synthesis," which shows one exemplary system and method for converting synthesis gas, which can be derived from natural gas by steam reforming (see below for discussion on how to produce synthesis gas on-site), into liquid fuels comprising methanol, dimethyl ether, ethanol, propanol, and butanol, and higher hydrocarbons, the entirety of which is hereby incorporated by reference herein). Other liquid fuels and butanol synthesis pathways are within the scope of the present invention. In one preferred embodiment, the lean methane A-gas stream is converted into methanol, with the methanol delivered by truck to sites of $CO_2$ or $CH_4$ availability, and then the methanol is upgraded to a higher alcohol fuel, such as butanol (see, for example, U.S. Patent Application Publication No. 2013/0118063 to John Henri, et al., entitled "Synthesis of High Caloric Fuels and Chemicals," which shows several exemplary systems and methods for converting synthesis gas, methanol, or acetic acid into butanol, the entirety of which is hereby incorporated by reference herein). The liquid fuels 1010 may be collected on-site in storage containers and transported from the oil site using truck-trailers in the same manner as the oil is transported from the site. One advantage of the embodiment shown in FIG. 10 is that the liquid fuels produced, such as methanol, dimethyl ether, etc. can be more easily transported from the oil site than the original lean methane stream.

Figure 11:
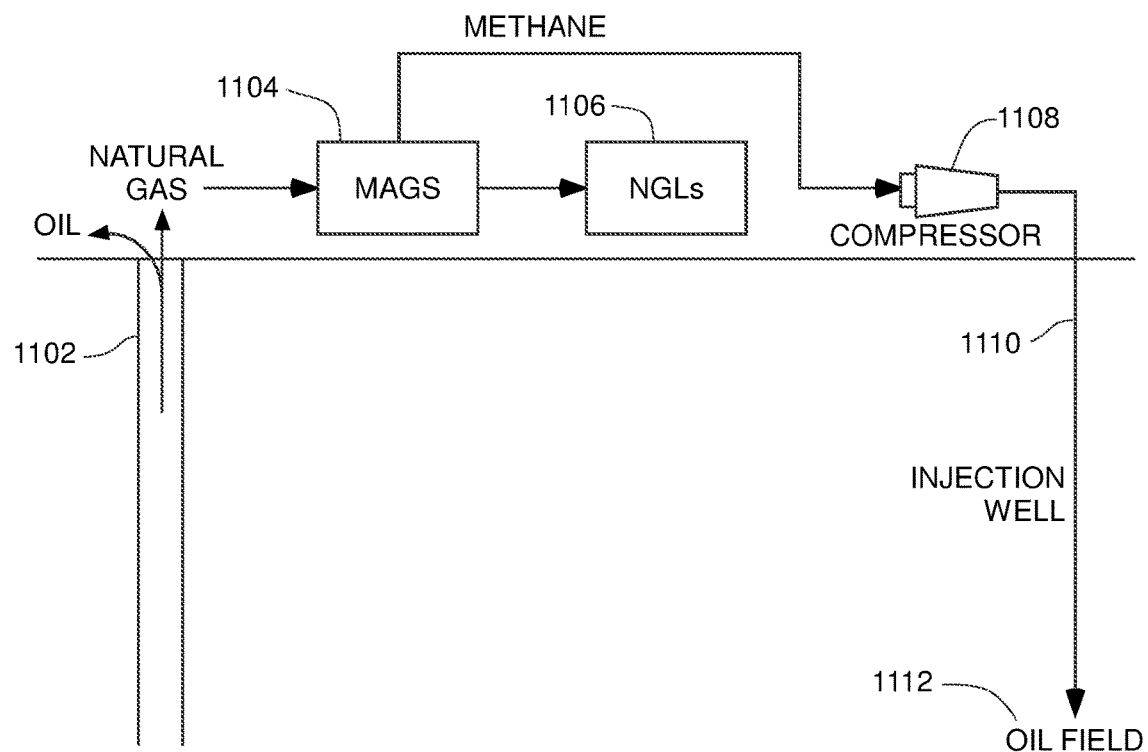
FIG. 11 illustrates yet another example of a use case of the MAGS in which the NGLs are transported and the $CH_4$ stream is used to create an artificial gas cap or for enhanced oil recovery.

FIG. 11 illustrates yet another example of a use case 1100 of the mobile alkane gas separator (MAGS) in which the NGLs are transported and the $CH_4$ stream is used to create an artificial gas cap or for enhanced oil recovery. As shown in FIG. 11, oil and associated gas (which is normally flared) is produced from well 1102. The flare gas is taken to MAGS unit 1104, where it is separated into NGLs 1106 and lean methane. The methane may be compressed via compressor 1108 and re-injected into the same or nearby petroleum formation 1112 via an injection well 1110 to create or re-establish an artificial gas cap.

Figure 12:
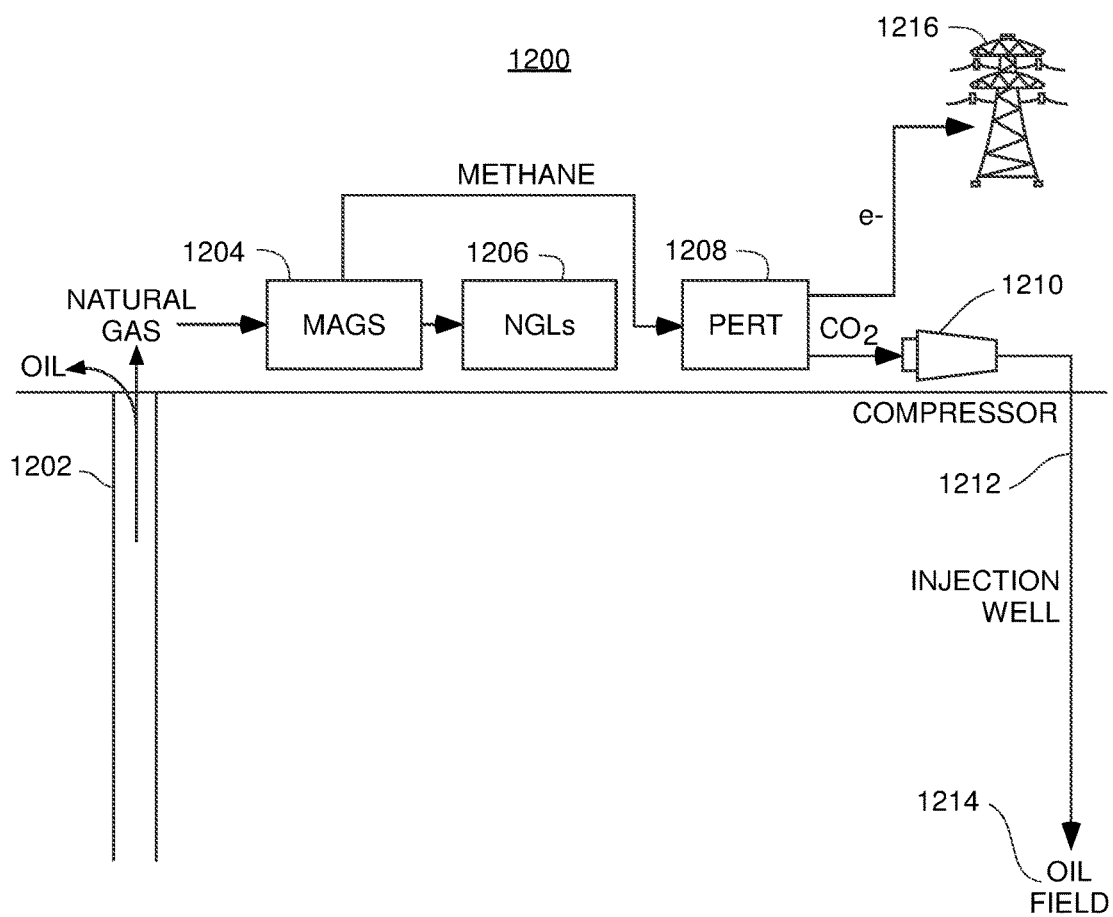
FIG. 12 illustrates yet another example of a use case of the MAGS in which the NGLs are transported and the $CH_4$ stream is converted to $CO_2$ for enhanced oil recovery and $H_2$ for electricity.

FIG. 12 illustrates yet another example of a use case 1200 of the mobile alkane gas separator (MAGS) in which the NGLs are transported and the $CH_4$ stream is converted to $CO_2$ and $H_2$, which are then used for enhanced oil recovery and electricity production, respectively. As shown in FIG. 12, oil and associated gas (which is normally flared) is produced from well 1202. The flare gas is taken to MAGS unit 1204, where it is separated into NGLs 1206 and lean methane. The methane may be used to power a Portable Enhanced Recovery Technology (PERT) system 1208, which steam reforms the natural gas into $CO_2$ and $H_2$ (see, for example, U.S. Pat. No. 7,918,906, issued on Apr. 5, 2011, to Robert M. Zubrin, et al., and entitled "Compact Natural Gas Steam Reformer with Linear Countercurrent Heat Exchanger," which shows one exemplary system and method for reforming natural gas into $CO_2$ and $H_2$ using a portable apparatus brought to an oil field for use in EOR, the entirety of which is hereby incorporated by reference herein; the same PERT system may also be used to manufacture synthesis gas (CO and $H_2$) needed for liquid fuel production on the site of a flare well as described in relation to FIG. 10.) The $CO_2$ is compressed via compressor 1210 and injected into the same or nearby petroleum formation 1214 via injection well 1212 for enhanced oil recovery ($CO_2$-EOR). The $H_2$ may be utilized for electricity production 1216, or for other purposes, such as hydrogenation of the produced oil. The $CO_2$ may also be used for waterless $CO_2$-fracking to re-fracture the same well or to fracture a nearby well.

Potential Macro-Environmental and Macroeconomic Impact

Previously, the impact of the technology on a single user was discussed, to show that it would be highly profitable. This is the key to the propagation of the technology to a large number of fields. In this section, the macro-environmental and macroeconomic effect of the technology is discussed once it has been put into broad use, showing that it could have a major impact in both increasing NGLs utilization, meeting expanded electricity needs of drillers, and reducing carbon emissions.

In early 2014, in North Dakota alone, 340,000 mcf per day (340 mmcf/day or 340 million cubic feet per day) of natural gas was being flared, approximately 60% of which is coming from wells producing 200 mcf per day or more each. That is sufficient market, in North Dakota alone, for 1,020 MAGS-200 units. If there was 50% market penetration by MAGS-200, then almost 5,500 metric tons of wasted $CO_2$-equivalent emissions would be avoided per day in North Dakota alone. This translates to about 2 million tons of $CO_2$-equivalent (~2 Mt) emissions avoided per year in the single state of North Dakota. Meanwhile, an economic gain of USD$370 million to USD$920 million per year (almost USD$1 billion/year) is expected from the sale of the NGLs and utilization of the methane for electricity production in North Dakota alone.

In 2011, the United States oil and gas industry annually flared approximately 7.1 billion cubic meters (bcm), or 250 billion cubic feet (bcf). If 20% of this flaring was avoided through the use of MAGS, then ~2.8 Mt of $CO_2$-equivalents would be avoided per year in the United States. This represents not just a significant environmental benefit, but a significant economic opportunity for the United States. These numbers would be even larger in 2014 with the widespread increase in fracking for oil.

Meanwhile, it is estimated that in 2011, Canada flared 2.4 billion $m^3$ per year (Source: Global Gas Flaring Reduction Partnership, *Estimated Flared Volumes from Satellite Data, 2007-2011*, 2013.) If 45% of this flaring was avoided through the use of MAGS in Canada (Canada's flare sites are more concentrated), then an additional ~2 Mt of $CO_2$-equivalents would be avoided per year in Canada. This represents not just a significant environmental benefit, but a significant economic opportunity for Canada as well.

As in the U.S. and Canada, the rest of the world is also seeing a great increase in flaring in recent years (Source: Global Gas Flaring Reduction Partnership, *Estimated Flared Volumes from Satellite Data, 2007-2011*, 2013.) Through the use of the MAGS, the entire world could achieve greater energy abundance by maximizing NGLs capture and simultaneously reducing greenhouse gas emissions from the worldwide oil and gas sector.

Long-Felt, Unsolved Need for Cost-Effective on-Site Gas Separation—North Dakota and World Bank Case Study As stated by a recent study, around 34% of North Dakota's produced associated gas is flared, nearly 340 million cubic feet per day (340 mmcf/day) in 2014, nearly double the 2011 flaring estimates of 190 million cubic feet per day (190 mmcf/day) (Source: Wocken, C. A.; Stevens, B. G.; Almlie, J. C.; Schlasner, S. M., *End-Use Technology Study—An Assessment of Alternative Uses for Associated Gas*, National Energy Technology Laboratory, Pittsburgh, Pa., April 2013, incorporated by reference in its entirety herein.)

This U.S. Department of Energy study demonstrates the long-felt and unsolved need for mobile technology to address this issue. This study also shows that no existing technology can simultaneously produce a lean methane stream as well as remove NGLs from flare gas, one innovation of the present invention.

Similarly, the World Bank Flare Gas Reduction Partnership has been established to address the needs of flaring around the world. No system is currently available on the market or in the published literature exists that can perform the sophisticated three-way separation described in this patent application.

This discussion is merely illustrative and exemplary, and is not intended to limit the scope of the present invention or its application or uses.

Latest Field Experimental Results

The present inventors have developed a novel method, apparatus, and system for separating a raw natural gas stream into a useable NGLs stream that can be easily transported by truck, and a lean methane stream that can be utilized for power generation or for other purposes in existing equipment, and/or compressed into compressed natural gas (CNG), meeting all CNG specifications. The inventors have designed, built, and tested a natural gas separator that is compact, portable, and modular, and which can be easily and quickly delivered to, as well as removed from, stranded gas and flare gas sites.

The inventors have completed the construction of a full-scale, MAGS-200 portable unit according to one of many embodiments of the present application, and have recently completed field testing at a large oil fracking operator in the Bakken (North Dakota, U.S.) in Q4 2014/Q1 2015. In the field trial, 9,440 gallons of NGLs were produced (adjusted to 60° F. SG) and contained less than 3 mol % ethane (about 2.8 mol % ethane), which is a high quality NGLs stream that exceeds all Y-grade standards.

Performance data from the field unit taken at a testing facility, using a simulated gas stream matching those typically found in the Bakken is shown in Tables 8-12, with flare gas processed at −60° C. and 9 bar. Table 8 shows the simulated inlet gas feed composition, matching those assays of typical Bakken gas wells. Table 9 shows the "A" gas composition, corresponding to the lean methane stream that is used to make CNG. Table 10 shows the "B" gas composition, corresponding to the internal ethane-rich stream that is utilized to power the MAGS itself. Table 11 shows the "C" NGLs liquid composition, corresponding to the Y-grade natural gas liquids stream. Finally, Table 12 shows the flare gas inlet mass flow rates.

If one were to compare the predictions in the tables above to the actual results in the tables below, one would see that they are remarkably close. The only significant difference is in the hexane+ composition in the NGLs stream, and that is explained because some of the hexane+ is removed after initial compression and sent to a drip gas tank, and so never makes it to the NGLs.

TABLE 8

Flare gas inlet composition (HHV dry)

| Flare Gas Sample | 1 | 2 | 3 | Sample# Btu/ft3 at 60° F. 14.73 psia |
|---|---|---|---|---|
| | 1501 | 1520 | 1614 | |
| mole % nitrogen | 2.61% | 3.38% | 2.57% | |
| carbon-dioxide | 0.62% | 0.53% | 0.56% | |
| methane | 54.78% | 55.21% | 50.88% | |
| ethane | 22.66% | 20.48% | 22.05% | |
| propane | 12.63% | 11.88% | 13.89% | |

TABLE 8-continued

Flare gas inlet composition (HHV dry)

| Flare Gas Sample | 1 | 2 | 3 | Sample# Btu/ft3 at 60° F. 14.73 psia |
|---|---|---|---|---|
| | 1501 | 1520 | 1614 | |
| i-butane | 1.32% | 1.26% | 1.48% | |
| n-butane | 3.34% | 4.11% | 4.77% | |
| i-pentane | 0.50% | 0.74% | 0.85% | |
| n-pentane | 0.68% | 1.09% | 1.24% | |
| hexane+ | 0.86% | 1.31% | 1.71% | |
| gas temperature | 23 | 80 | 70 | F |
| gas pressure | 30 psia | 40 psig | 30 psig | |
| NGLs captured | 300 | 300 | 250 | Mscfd |
| | 1670 | 1831 | 1840 | gal/day at 20° C. (15% ethane) |

TABLE 9

"A" gas composition

| "A" gas composition | 1 | 2 | 3 | Sample # |
|---|---|---|---|---|
| nitrogen | 3.85% | 4.98% | 4.20% | |
| carbon-dioxide | 0.72% | 0.62% | 0.67% | |
| methane | 76.81% | 77.48% | 77.97% | |
| ethane | 16.33% | 14.75% | 14.99% | |
| propane | 2.13% | 2.00% | 2.00% | |
| i-butane | 0.06% | 0.06% | 0.06% | |
| n-butane | 0.09% | 0.11% | 0.10% | |
| i-pentane | 0.00% | 0.01% | 0.01% | |
| n-pentane | 0.00% | 0.01% | 0.01% | |
| hexane+ | 0.00% | 0.00% | 0.00% | |
| flow rates | 201.3 | 201.4 | 150.70 | Mscfd |
| | 197.5 | 196.1 | 146.4 | kg/hr |
| | 10.05 | 10.05 | 7.521 | kgmole/hr |
| thermal energy of gas LHV | 2504 | 2451 | 1849 | kW |
| shaft power estimate | 1002 | 980 | 740 | hp |
| diesel gallon equivalent | 1596 | 1563 | 1179 | gallon/day |
| Cummins fuel quality MN | 69.8 | 71.5 | 71.4 | methane-number |

TABLE 10

"B" gas composition

| "B" gas composition | 1 | 2 | 3 | Sample # |
|---|---|---|---|---|
| nitrogen | 0.21% | 0.30% | 0.25% | |
| carbon-dioxide | 1.03% | 1.00% | 1.06% | |
| methane | 23.76% | 26.71% | 26.28% | |
| ethane | 64.83% | 62.18% | 62.67% | |
| propane | 9.24% | 8.73% | 8.70% | |
| i-butane | 0.32% | 0.31% | 0.30% | |
| n-butane | 0.55% | 0.68% | 0.65% | |
| i-pentane | 0.03% | 0.04% | 0.04% | |
| n-pentane | 0.03% | 0.05% | 0.05% | |
| hexane+ | 0.01% | 0.01% | 0.01% | |
| flow rates | 40.82 | 35.95 | 37.04 | Mscfd |
| | 57.944 | 50.227 | 51.852 | kg/hr |
| | 2.037 | 1.794 | 1.848 | kgmole/hr |
| heating value LHV | 46790 | 46800 | 46780 | kJ/kg |
| thermal energy of gas LHV | 753 | 653 | 674 | kW |
| electric power potential | 188 | 163 | 168 | kWe |

TABLE 11

"C" NGLs liquid mass flow rates

| | 1 | 2 | 3 | Sample# |
|---|---|---|---|---|
| "C" NGLs liquid mass flows | | | | |
| nitrogen | 0.00 | 0.00 | 0.00 | kg/hr |
| carbon-dioxide | 0.00 | 0.00 | 0.00 | |
| methane | 0.00 | 0.00 | 0.00 | |
| ethane | 12.95 | 14.08 | 13.99 | |
| propane | 65.63 | 62.62 | 62.70 | |
| i-butane | 10.76 | 10.33 | 10.17 | |
| n-butane | 27.88 | 34.41 | 33.47 | |
| i-pentane | 5.31 | 7.95 | 7.60 | |
| n-pentane | 7.32 | 11.67 | 11.09 | |
| hexane+ | 11.07 | 16.91 | 18.35 | |
| total flow rate | 140.92 | 157.98 | 157.40 | kg/hr |
| Capture efficiency | | | | |
| C3 | 78.7% | 79.9% | 82.0% | |
| C4 | 95.3% | 95.8% | 96.2% | |
| C5 | 98.9% | 99.0% | 99.1% | |
| C3+ | 86.6% | 88.9% | 90.2% | |
| Butane capture efficiency | | | | |
| i-butane | 93.7% | 94.1% | 94.8% | |
| n-butane | 96.0% | 96.3% | 96.7% | |

TABLE 12

Flare gas inlet mass flow rates (kg/hr)

| Flare gas inlet mass flows | 1 | 2 | 3 | Sample # |
|---|---|---|---|---|
| nitrogen | 10.959 | 14.174 | 8.985 | kg/hr |
| carbon-dioxide | 4.091 | 3.518 | 3.081 | |
| methane | 131.560 | 132.603 | 101.869 | |
| ethane | 101.998 | 92.190 | 82.729 | |
| propane | 83.367 | 78.404 | 76.430 | |
| i-butane | 11.485 | 10.981 | 10.736 | |
| n-butane | 29.043 | 35.736 | 34.623 | |
| i-pentane | 5.377 | 8.036 | 7.681 | |
| n-pentane | 7.389 | 11.773 | 11.184 | |
| hexane+ | 11.079 | 16.926 | 18.370 | |
| total flow rate | 396.347 | 404.341 | 355.687 | kg/hr |

CONCLUSIONS

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A system for remotely monitoring and controlling a separation process of a raw natural gas stream into two controlled product streams comprising a methane stream and a natural gas liquids (NGLs) stream and a third uncontrolled ethane-rich stream, to control ethane content in the two controlled product streams, the system comprising:
   a plurality of remote field equipment for performing the separation process that are adapted to be responsive to electromagnetic signals resulting in control of a plurality of process parameters;
   a server comprising a hardware processor and a non-transitory digital storage medium storing executable program code;
   a communications-link between said server and said piece of remote field equipment; and a plurality of program code embodied on said non-transitory digital storage medium, said plurality of program code which when executed causes said hardware processor to execute a process performing the steps of:
   establishing an equipment-server connection between said piece of remote field equipment and said server;
   establishing a client-server connection between a user device and said server;
   providing an interface to allow a user to display the plurality of process parameters on said user device;
   receiving a set of separation process input parameters corresponding to parameters of an input stream of the raw natural gas;
   receiving a set of desired process output parameters corresponding to desired parameters of an output chemical stream comprising a methane stream and a natural gas liquids (NGLs) stream and a third uncontrolled ethane-rich stream, to control ethane content in the two controlled product streams;
   controlling a set of separation process control parameters to achieve the desired chemical process output parameters given the separation process input parameters and the desired separation process output parameters;
   wherein the controlling comprises monitoring a methane number of the methane stream to determine ethane content in the methane stream, wherein a higher methane number of the methane stream indicates a lower ethane content in the methane stream;
   monitoring a vapor pressure of the NGLs stream to determine ethane content in the NGLs stream, wherein a lower vapor pressure of the NGLs stream indicates a lower ethane content in the NGLs stream;
   receiving a desired minimum methane number (MMN) and a desired maximum vapor pressure (MVP);
   determining an inlet flow rate for the separation process, wherein the inlet flow rate is controllable by an inlet control valve of the plurality of remote field equipment;
   determining a system operating pressure for the separation process, wherein the system operating pressure is controllable by a pressure control valve;
   determining a temperature setpoint for the separation process, wherein the temperature setpoint is controllable by a temperature setpoint controller; and
   adjusting the inlet flow rate by the inlet control valve, the system operating pressure by the pressure control valve, and the temperature setpoint by the temperature setpoint controller to maintain the desired minimum methane number (MMN) and the desired maximum vapor pressure (MVP) by separating ethane from the two controlled product streams into the third uncontrolled ethane-rich stream; and
   providing a human-machine interface (HMI) adapted to allow supervisory intervention and specification of operating points to allow an operator to manually control the set of separation process control parameters.

2. The system of claim 1, wherein the separation process is separating a raw natural gas stream into at least one output product stream to control an ethane content in the at least one output product stream.

3. The system of claim 1, wherein the separation process is separating a raw natural gas stream into at least two output product streams to control an ethane content in each of the two output product streams.

4. The system of claim 3, further comprising program code, which when executed causes said hardware processor to perform steps to:
   controlling an inlet flow rate of the raw natural gas stream to a track a predetermined flow rate;
   controlling a system operating pressure to track a predetermined system operating pressure; and
   controlling a temperature setpoint of a separation subsystem to track a predetermined temperature setpoint,
      wherein the inlet flow rate, the system operating pressure, and the temperature setpoint are controlled to maintain a minimum methane number of a dry gas output stream and a maximum vapor pressure a natural gas liquids stream (NGLs), and
      wherein the inlet flow rate, the system operating pressure, and the temperature setpoint are determined by a heat content and a well flow rate of the raw natural gas stream.

5. The system of claim 1, wherein the equipment-server connection utilizes a communication protocol selected from the group consisting of Modbus, CANbus, TCP/IP, UDP, 3G, 4G, LTE, coaxial, IEEE 802.11a/b/g/n, IEEE 802.15.4, Bluetooth, VPN, IPsec, ISAKMP, near-field communication, Fieldbus, 900 MHz radio, and combinations thereof.

6. The system of claim 1, further comprising program code, which when executed causes said hardware processor to perform a process of controlling separation of a raw natural gas stream into at least two useable streams comprising a dry natural gas stream (NG) having a desired minimum methane number and a natural gas liquids stream (NGLs) having a desired maximum vapor pressure, the program code causing the processor to perform steps comprising:
   controlling one or more process parameters, the one or more process parameters selected from the group consisting of an inlet flow rate of a raw natural gas stream, a system operating pressure, and a temperature setpoint of a separation subsystem,
   wherein the one or more process parameters are controlled to maintain the desired minimum methane number and the desired maximum vapor pressure.

7. The system of claim 6, wherein the inlet flow rate, the system operating pressure, and the temperature setpoint are determined by one or more input parameters selected from the group consisting of a heat content of the raw natural gas stream, a volume flow rate of the raw natural gas stream, the desired minimum methane number, and the desired maximum vapor pressure.

8. The system of claim 6, wherein the inlet flow rate is controlled by controlling an inlet control valve or a compressor speed on one or more compressors.

9. The system of claim 6, wherein the inlet flow rate is between about 120 mcf per day to about 1200 mcf per day.

10. The system of claim 6, wherein the system operating pressure is controlled by controlling a pressure control valve in the separation subsystem.

11. The system of claim 6, wherein the system operating pressure is between about 6 bar to about 35 bar.

12. The system of claim 6, wherein the temperature setpoint of the separation subsystem is a reboiler temperature setpoint of a reboiler in the separation subsystem.

13. The system of claim 12, wherein the reboiler temperature setpoint is controlled by a reboiler controller.

14. The system of claim 12, wherein the reboiler temperature setpoint is between about 0 degrees C. to about 120 degrees C.

15. The system of claim 6, wherein a composition of a third stream, comprising an ethane-rich stream, is allowed to vary in composition.

16. The system of claim 6, wherein the desired minimum methane number of the dry natural gas stream corresponds to a methane content selected from the group consisting of 60% methane, 65% methane, 70% methane, 75% methane, 80% methane, 85% methane, 90% methane, and 95% methane.

17. The system of claim 6, wherein the desired maximum vapor pressure of the NGLs stream is no more than 17 bar at 38° C.

18. The system of claim 6, wherein the desired maximum vapor pressure of the NGLs stream is between about 5 bar and about 20 bar at 38° C.

19. The system of claim 6, wherein the heat content of the raw natural gas stream is between about 1100 BTU to about 1800 BTU.

20. The system of claim 6, wherein the volume flow rate of the raw natural gas stream is between about 100 mcf per day to about 5000 mcf per day.

* * * * *